United States Patent
Stowell et al.

(10) Patent No.: US 11,472,233 B2
(45) Date of Patent: Oct. 18, 2022

(54) TUNED RADIO FREQUENCY (RF) RESONANT MATERIALS

(71) Applicant: Lyten, Inc., Sunnyvale, CA (US)

(72) Inventors: Michael W. Stowell, Sunnyvale, CA (US); Bruce Lanning, Littleton, CO (US); Bryce H. Anzelmo, Mountain View, CA (US); Karel Vanheusden, Woodside, CA (US); Sung H. Lim, Mountain View, CA (US); Carlos Montalvo, Cambria, CA (US)

(73) Assignee: Lyten, Inc., San Jose, CA (US)

( * ) Notice: Subject to any disclaimer, the term of this patent is extended or adjusted under 35 U.S.C. 154(b) by 242 days.

(21) Appl. No.: 16/829,385

(22) Filed: Mar. 25, 2020

(65) Prior Publication Data

US 2021/0008932 A1     Jan. 14, 2021

Related U.S. Application Data

(60) Provisional application No. 62/985,550, filed on Mar. 5, 2020, provisional application No. 62/979,215, filed
(Continued)

(51) Int. Cl.
*B60C 11/24* (2006.01)
*C08K 3/04* (2006.01)
(Continued)

(52) U.S. Cl.
CPC .............. *B60C 11/24* (2013.01); *B60C 11/00* (2013.01); *B60C 11/0008* (2013.01);
(Continued)

(58) Field of Classification Search
CPC ..... B60C 11/24; B60C 11/00; B60C 11/0008; B60C 11/243; B60C 11/246;
(Continued)

(56) References Cited

U.S. PATENT DOCUMENTS 6,525,105 B1    2/2003   Udagawa et al.
6,667,092 B1   12/2003   Brollier et al.
(Continued)

FOREIGN PATENT DOCUMENTS

CN     207737077 U    8/2018
EP      1419476 A1    5/2004
(Continued)

OTHER PUBLICATIONS

International Search Report and Written Opinion dated May 31, 2022, issued in PCT Appl. No. PCT/US2022/019623; 13 pages.
(Continued)

*Primary Examiner* — Eric Blount
(74) *Attorney, Agent, or Firm* — Paradice & Li LLP

(57) ABSTRACT

This disclosure provides a tire formed of a body having multiple plies and a tread that surrounds the body. In some implementations, the plies and/or the tread include a resonator that generates a resonant signal in response to being activated by locally generated power or by an externally generated excitation signal. Multiple resonators formed of carbon-containing materials are distributed in the plies and/or tread to respond to changes to the tire by altering a characteristic of the resonant signal. Such alterations include frequency shifting of the resonant signal and/or attenuation of the resonant signal. The resonator can be configured to resonate at a first frequency when a structural characteristic of a respective ply or tread is greater than a level, and to resonate at a second frequency different than the first frequency when the structural characteristic of the respective ply or tread is not greater than the level.

25 Claims, 59 Drawing Sheets

Related U.S. Application Data on Feb. 20, 2020, provisional application No. 62/824,440, filed on Mar. 27, 2019.

(51) Int. Cl.

| | |
|---|---|
| *B60C 23/04* | (2006.01) |
| *B60C 11/00* | (2006.01) |
| *H01Q 1/22* | (2006.01) |
| *H01Q 1/32* | (2006.01) |
| *C01B 32/182* | (2017.01) |
| *B60C 23/06* | (2006.01) |
| *B60C 19/00* | (2006.01) |

(52) U.S. Cl.
CPC .......... *B60C 11/243* (2013.01); *B60C 11/246* (2013.01); *B60C 23/0493* (2013.01); *B60C 23/064* (2013.01); *B60C 23/068* (2013.01); *C01B 32/182* (2017.08); *C08K 3/042* (2017.05); *H01Q 1/2241* (2013.01); *H01Q 1/32* (2013.01); *B60C 2019/004* (2013.01); *C08K 2201/011* (2013.01)

(58) Field of Classification Search
CPC . B60C 23/0493; B60C 23/064; B60C 23/068; B60C 2019/004; B60C 1/0016; B60C 23/0428; B60C 23/0449; B60C 23/0452; B60C 23/0464; C01B 32/182; C08K 3/042; C08K 2201/011; H01Q 1/2241; H01Q 1/32
USPC .......................................................... 340/438
See application file for complete search history.

(56) References Cited

U.S. PATENT DOCUMENTS

| | | | |
|---|---|---|---|
| 6,885,291 B1 | 4/2005 | Pollack et al. | |
| 7,057,562 B2 | 6/2006 | Forster et al. | |
| 7,204,135 B2* | 4/2007 | Robert ................. | B60C 11/243 73/146 |
| 7,581,439 B2 | 9/2009 | Rensel et al. | |
| 7,847,697 B2 | 12/2010 | Bannerjee et al. | |
| 8,045,947 B2 | 10/2011 | Mandal et al. | |
| 9,884,715 B2 | 2/2018 | Hoofman et al. | |
| 9,944,131 B2 | 4/2018 | Wei et al. | |
| 10,920,035 B2 | 2/2021 | Rogojina et al. | |
| 10,943,076 B2 | 3/2021 | Stowell et al. | |
| 11,014,413 B2* | 5/2021 | Räsänen ............... | B60C 11/246 |
| 2003/0201044 A1 | 10/2003 | Schick | |
| 2005/0110277 A1 | 5/2005 | Adamson et al. | |
| 2007/0175555 A1* | 8/2007 | Myatt ................... | B60C 11/24 73/146 |
| 2007/0295069 A1* | 12/2007 | Mancosu ........... | B60C 23/0411 73/146 |
| 2009/0072951 A1 | 3/2009 | Alberth, Jr. et al. | |
| 2009/0267761 A1 | 10/2009 | Georgescu et al. | |
| 2010/0073142 A1 | 3/2010 | Kim | |
| 2010/0126263 A1* | 5/2010 | Brusarosco ......... | B60C 23/0411 73/146 |
| 2013/0150516 A1 | 6/2013 | Lettow | |
| 2015/0118492 A1 | 4/2015 | Sitharaman et al. | |
| 2015/0317896 A1 | 11/2015 | Planton et al. | |
| 2016/0300240 A1 | 10/2016 | Bright et al. | |
| 2017/0022045 A1 | 1/2017 | Ray et al. | |
| 2017/0070204 A1 | 3/2017 | McIntyre et al. | |
| 2017/0178059 A1 | 6/2017 | Gibson et al. | |
| 2018/0072553 A1 | 3/2018 | Lyons et al. | |
| 2018/0143062 A9 | 5/2018 | Gurumohan et al. | |
| 2018/0346684 A1 | 12/2018 | Polyzos et al. | |
| 2019/0190154 A1 | 6/2019 | Stowell | |
| 2020/0101797 A1* | 4/2020 | Ojala ................... | B60C 11/246 |
| 2021/0005854 A1 | 1/2021 | Thompson et al. | |
| 2021/0008931 A1 | 1/2021 | Stowell et al. | |
| 2021/0293521 A1 | 9/2021 | Stowell et al. | |

FOREIGN PATENT DOCUMENTS

| | | | | |
|---|---|---|---|---|
| EP | 1798070 A1 * | 6/2007 | ............ | B60C 11/24 |
| EP | 2118965 B1 | 5/2011 | | |
| WO | 99/29523 A1 | 6/1999 | | |
| WO | WO-2013192335 A1 * | 12/2013 | ............... | B81B 3/00 |
| WO | WO-2019122507 A1 * | 6/2019 | ......... | B29D 30/0061 |
| WO | 2020/198451 A1 | 10/2020 | | |
| WO | 2022/086611 A1 | 4/2022 | | |

OTHER PUBLICATIONS

Extended European Search Report for EP Appl No. 19846725.0, dated Apr. 4, 2022; 13 pages.

\* cited by examiner

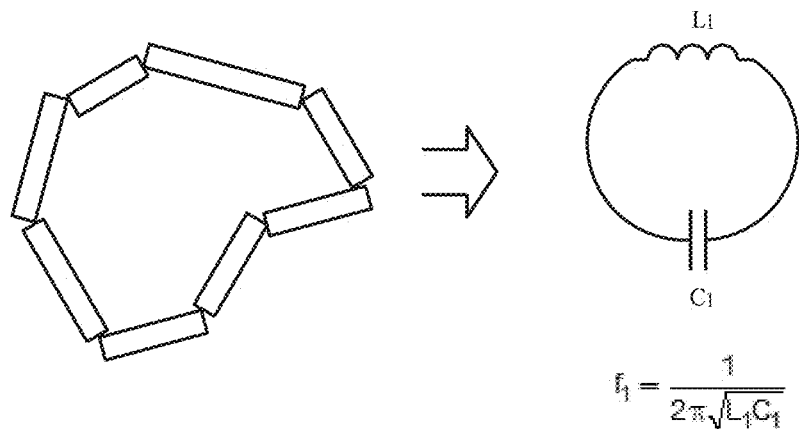
*Figure 2B1*
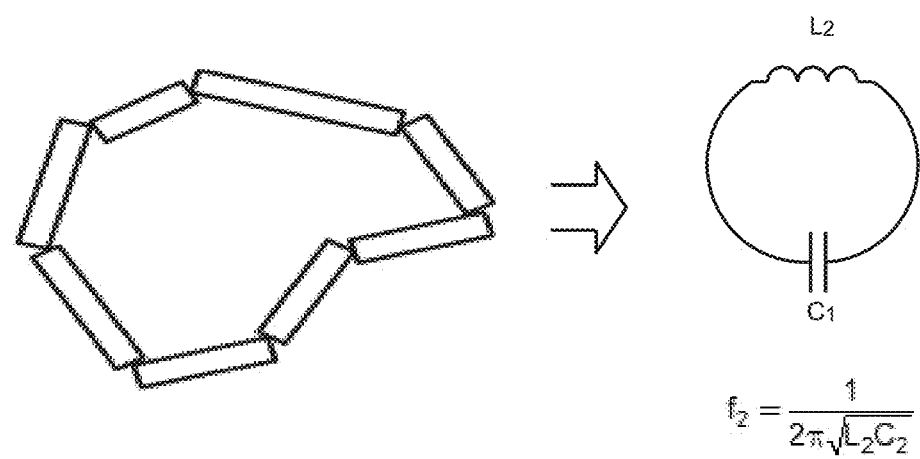
*Figure 2B2*

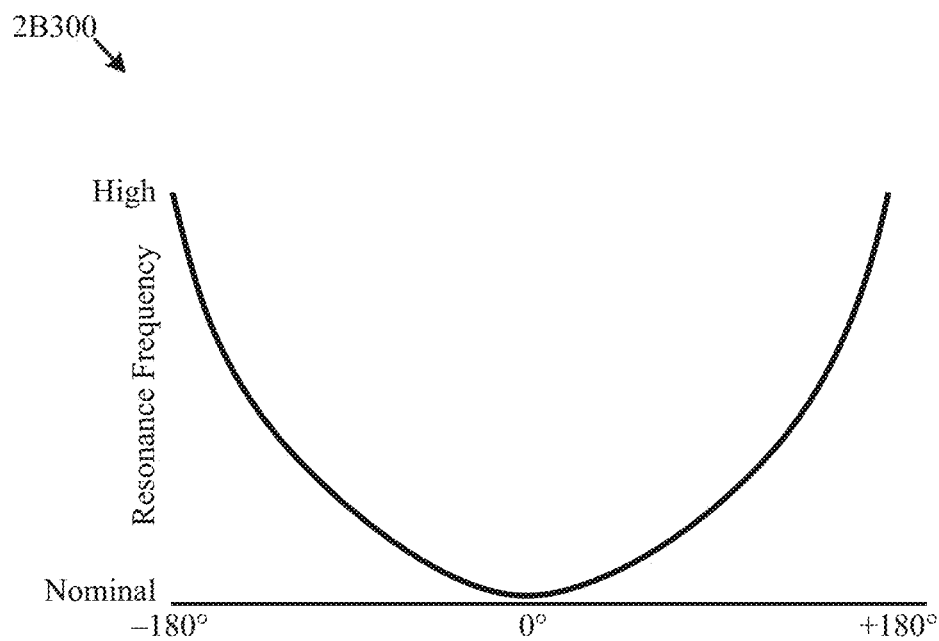
*Figure 2B3*
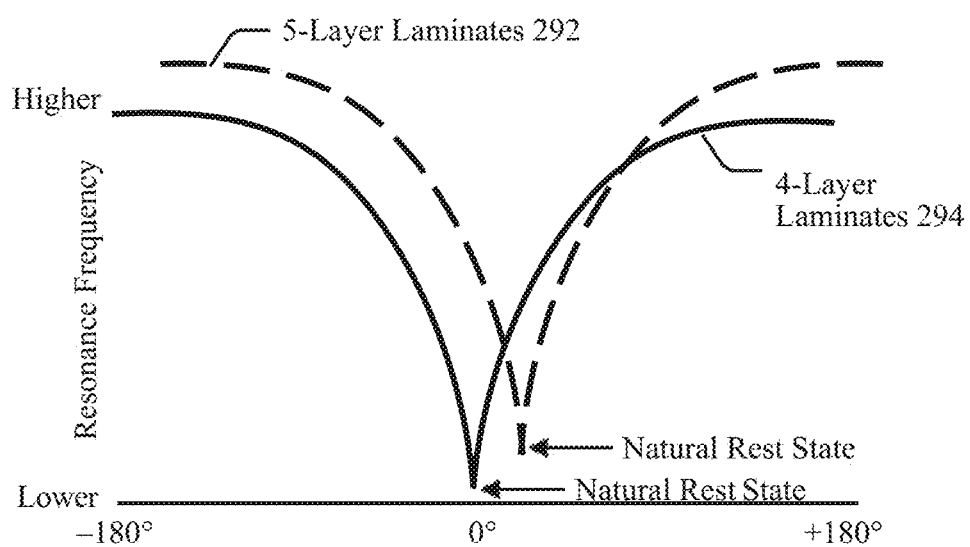
*Figure 2B4*

2E00

| | 2011 | % | 2021 | % | MAIN TYPE |
|---|---|---|---|---|---|
| Heavy industrial | 400 | 10 | 983 | 90 | Regenerative braking |
| Buses | 18.8 | 5 | 142.2 | 90 | Regenerative braking |
| Light industrial/commercial | 210 | 5 | 399 | 20 | Regenerative braking |
| Mobility for the disabled | 1,300 | 0 | 3,070 | 0 | - |
| Two-wheel and allied | 25,184 | 20 | 33,000 | 30 | Regenerative braking |
| Cars | 1,637 | 30 | 9,900 | 95 | Regenerative braking Photovoltaic Shock absorbers |
| Golf car and motorised caddy | 265 | 20 | 270 | 40 | Regenerative braking Photovoltaic |
| Military | 21.6 | 20 | 83 | 95 | Regenerative braking Photovoltaic Shock absorbers |
| Marine | 64 | 15 | 100 | 90 | Photovoltaic Regenerative trailing of propeller |
| Aircraft & Other | 1,500 | 2 | 3,260 | 15 | Photovoltaic Maybe thermoelectric |
| Total | 30,582 | | 51,207 | | |

| Microwatts to milliwatts per vehicle Wireless sensors and actuators reduce weight and increase space | Milliwatts to watts per vehicle Autonomous electrics such as lighting reduce weight and increase space | Watts to tens of kilowatts per vehicle Charge traction battery increasing range |
|---|---|---|
| Capacitive Magnetostrictive | Piezoelectric Thermoelectric | |
| Photovoltaic | | |
| | Electrodynamic | Shock absorbers Regenerative braking Kite generators Wave power |

*Figure 2F*

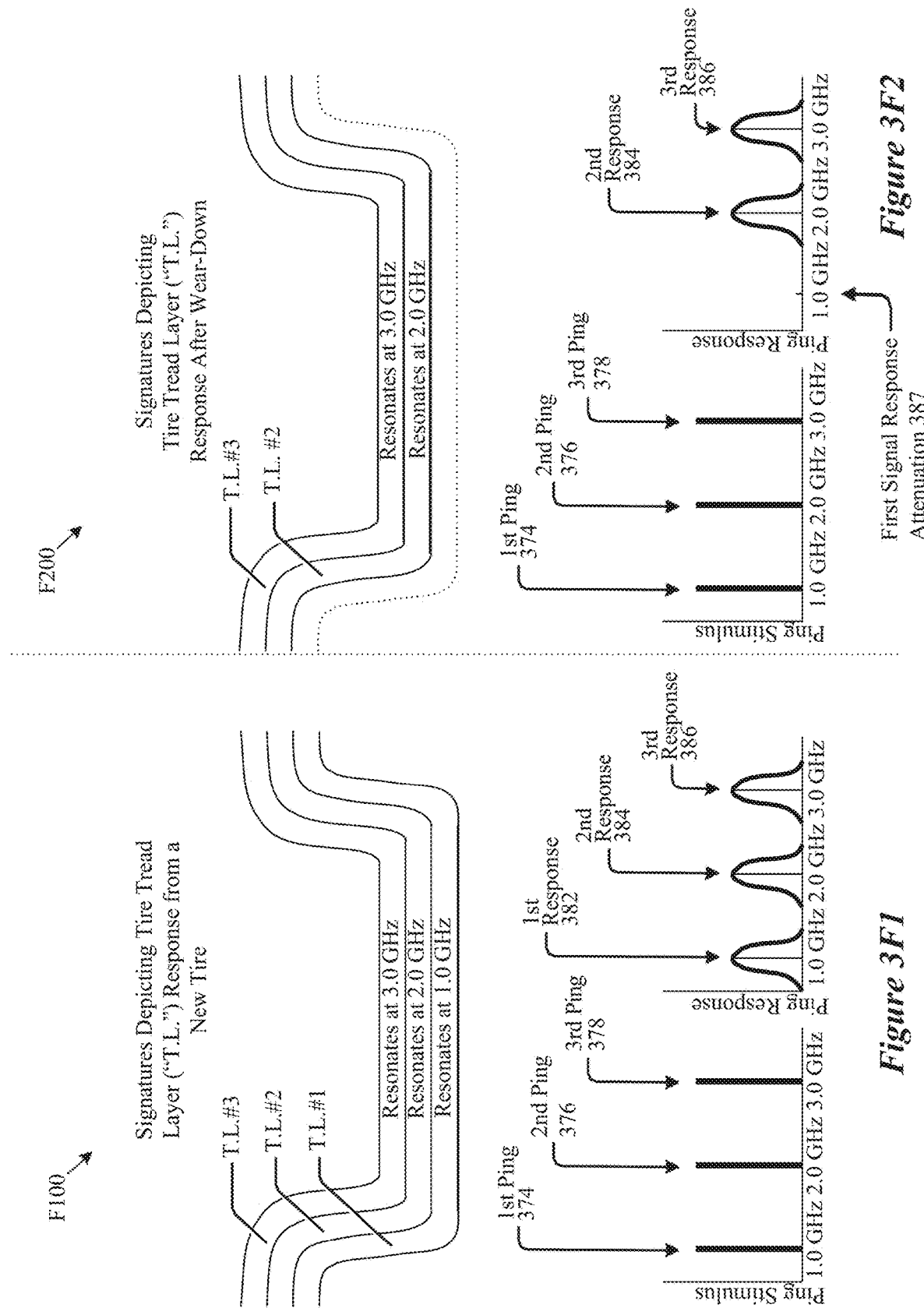

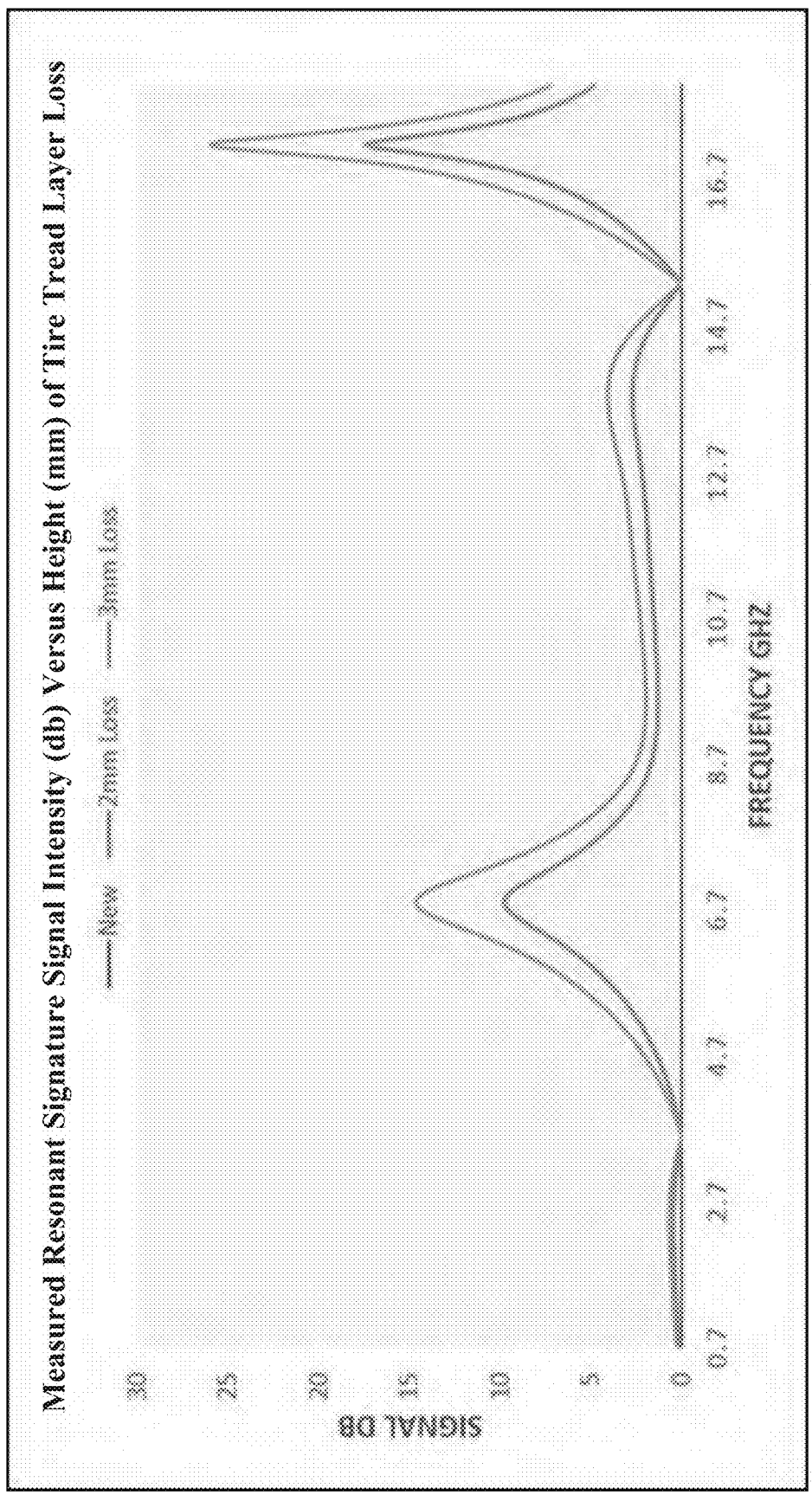
*Figure 3F3*

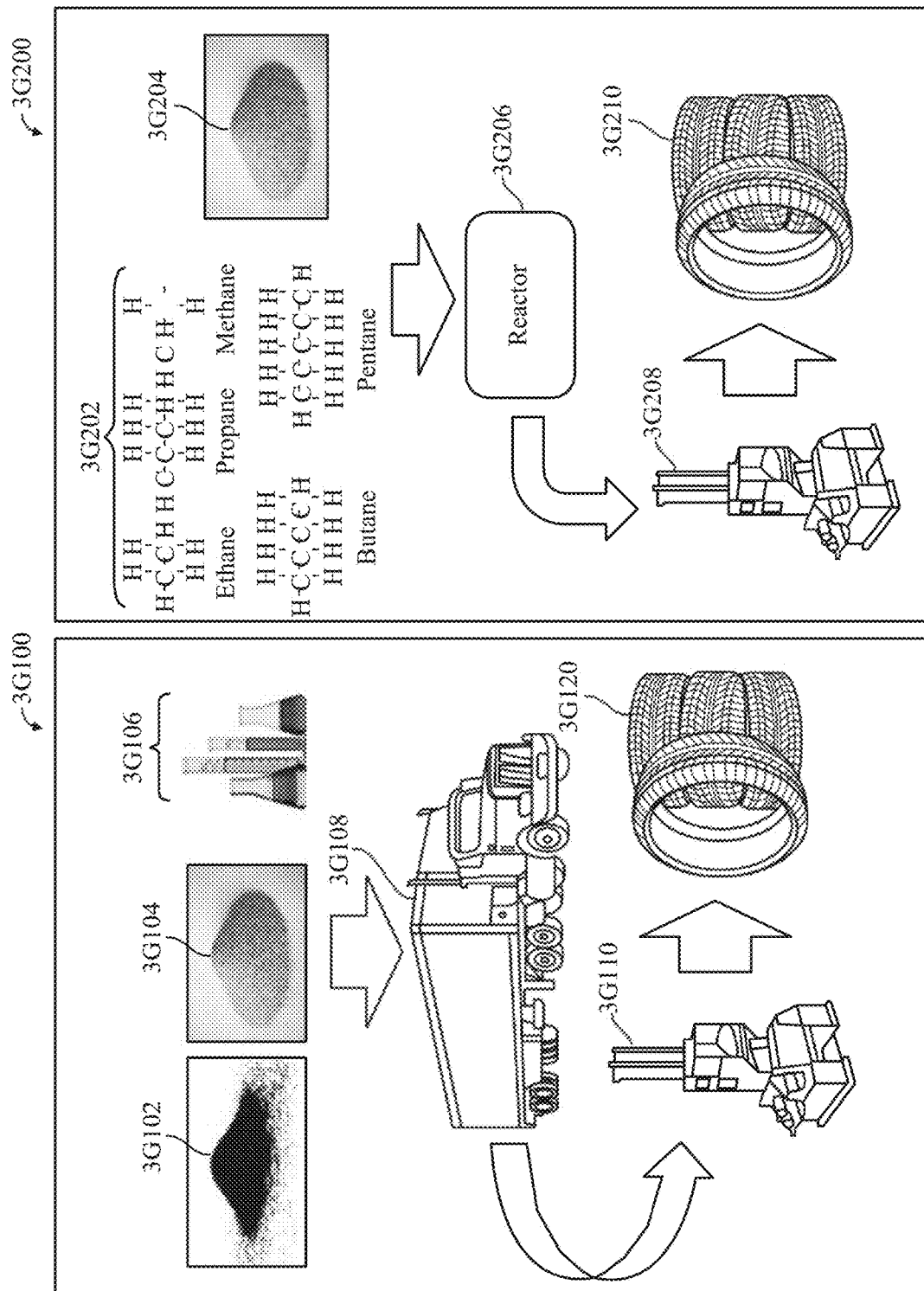
Figure 3G2
Figure 3G1

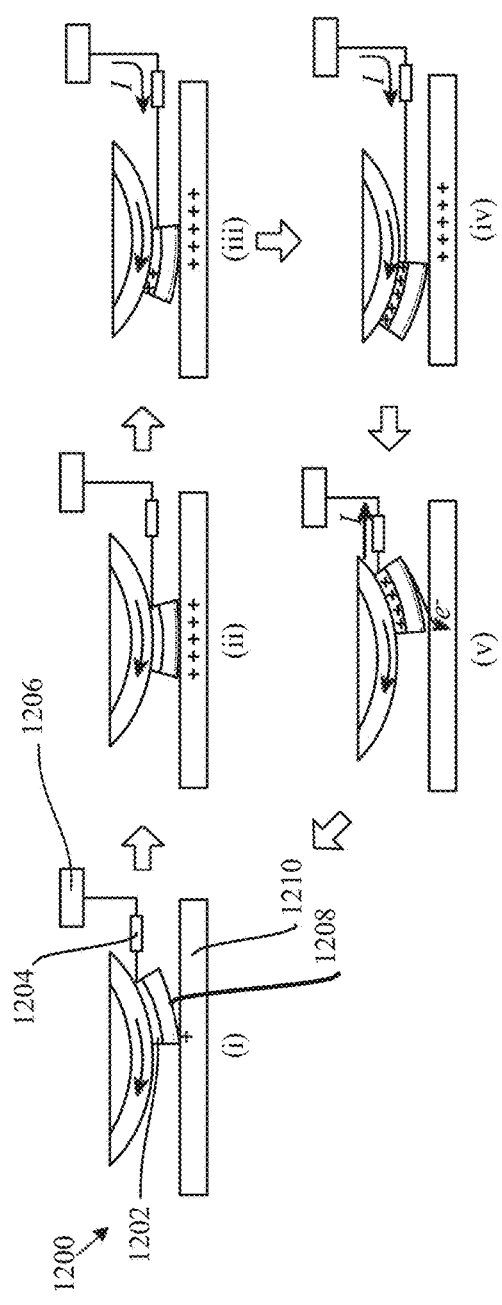
*Figure 12A*
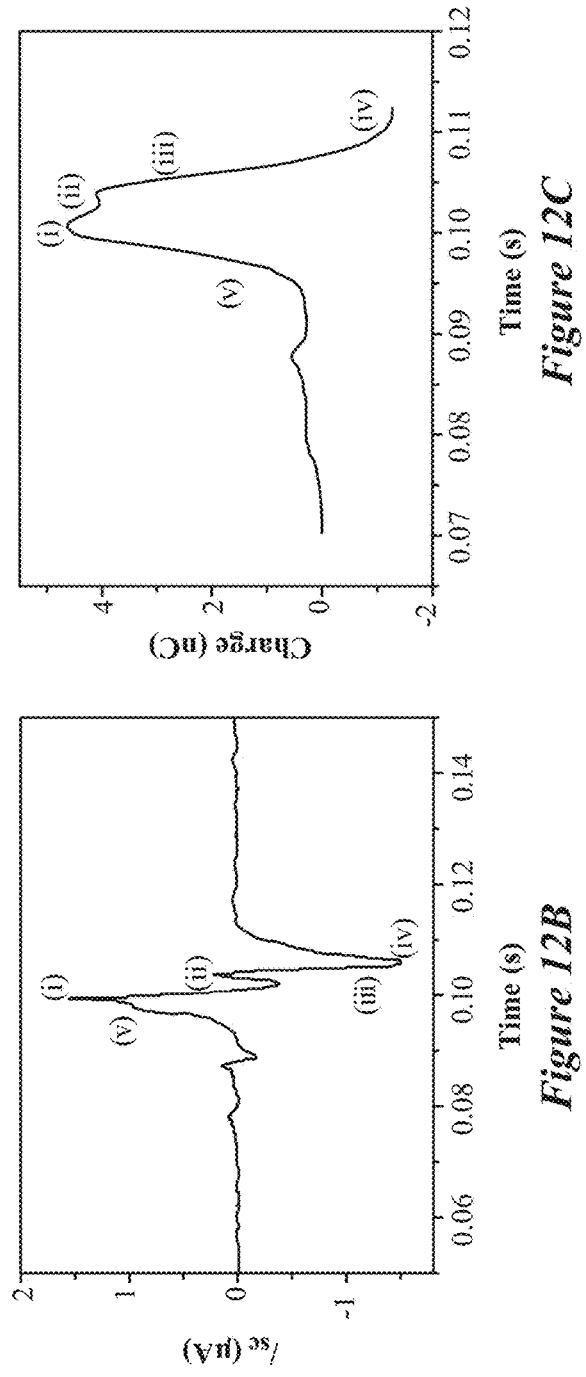
*Figure 12B*
*Figure 12C*

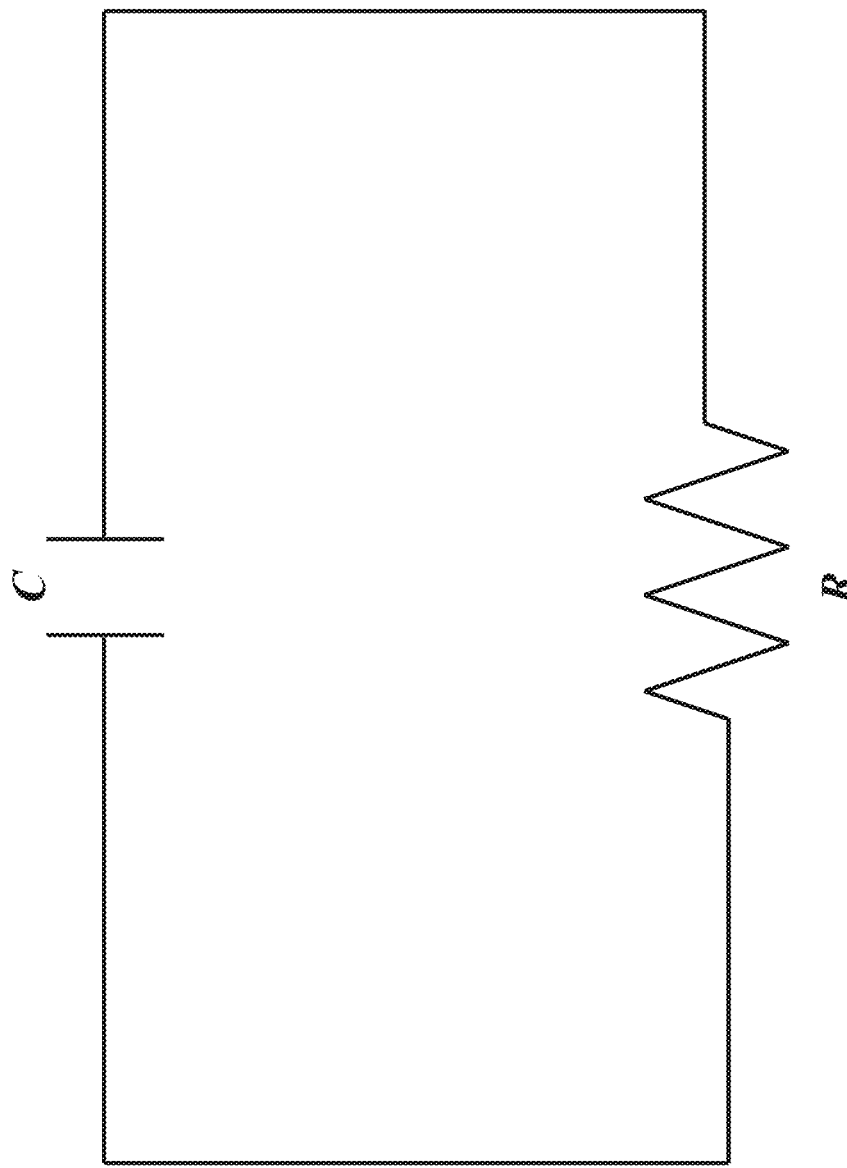

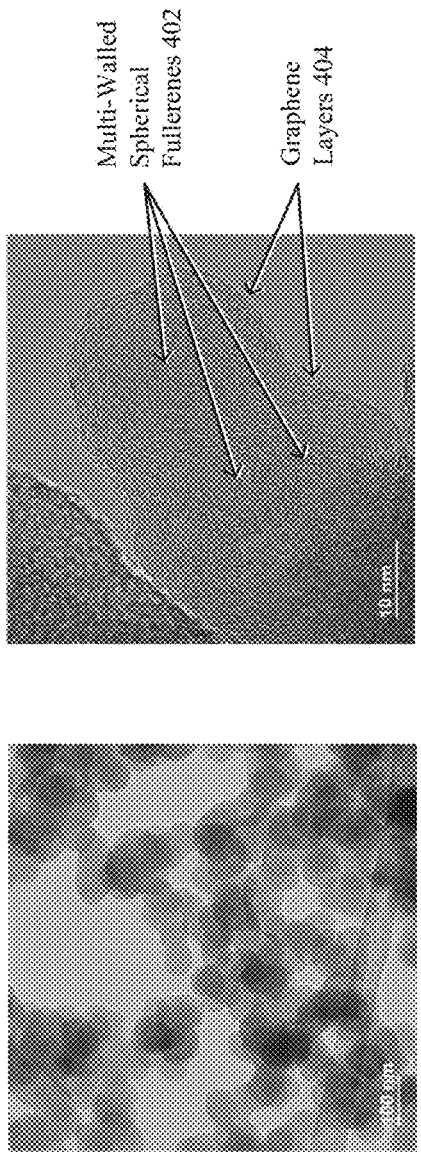
*Figure 22A*
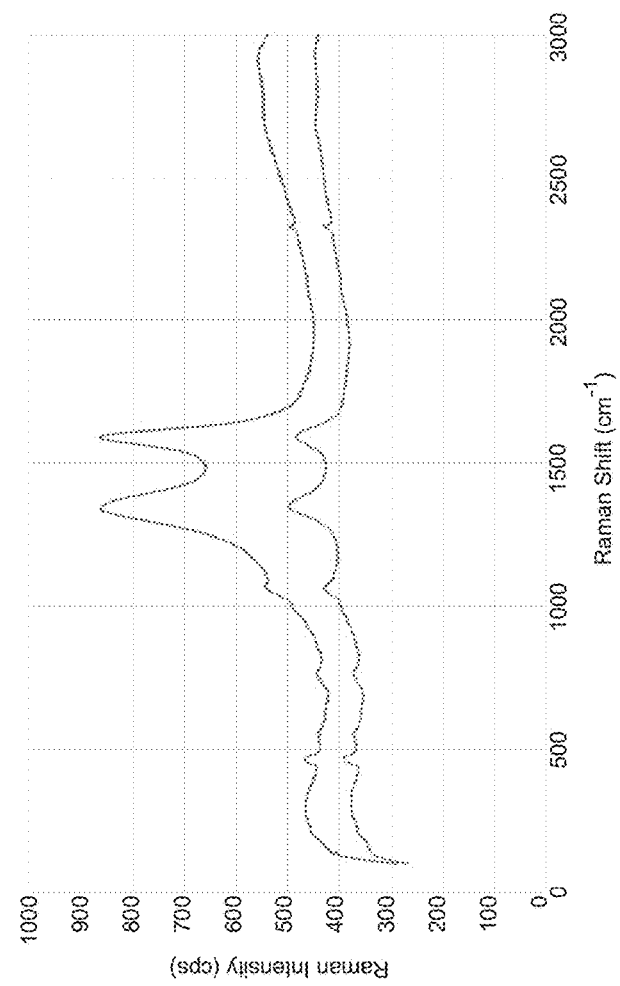
*Figure 22B*
*Figure 22C*

TUNED RADIO FREQUENCY (RF) RESONANT MATERIALS

CROSS-REFERENCE TO RELATED APPLICATIONS

This Patent Application claims the benefit of priority to U.S. Provisional Patent Application No. 62/824,440, entitled "TUNING RESONANT MATERIALS FOR VEHICLE SENSING" and filed on Mar. 27, 2019, to U.S. Provisional Patent Application No. 62/979,215, entitled "WASTE ENERGY HARVESTING AND POWERING IN VEHICLES" and filed on Feb. 20, 2020, and to U.S. Provisional Patent Application No. 62/985,550, entitled "RESONANT SERIAL NUMBER IN VEHICLE TIRES" and filed on Mar. 5, 2020, all of which are assigned to the assignee hereof; the disclosures of all prior Applications are considered part of and are incorporated by reference in this Patent Application.

TECHNICAL FIELD

This disclosure relates to sensors for detecting changes in material presence, composition and/or performance as reflected in, for example, component wear, deformation (referring tension, torsion, etc.) or degradation during normal or demanding vehicle use, and more particularly to techniques for sensing wear as demonstrated by predictable radio frequency (RF) signal resonance behavior (referring to frequency shift) and/or attenuation by carbon-containing materials incorporated within one or more plies and/or tread of a vehicle tire and/or other surfaces, such as engine covers, doorsills, trunk lids, etc.

DESCRIPTION OF RELATED ART

Advances in vehicle power types, including hybrid and electric-only systems, have created an opportunity for further technological integration. This is true especially as modern vehicles transition into fully autonomous driving and navigation, where technology (as opposed to trained and capable humans) must routinely monitor vehicle component performance and reliability to ensure continued vehicle occupant safety and comfort. Traditional systems, such as tire pressure monitoring systems (TPMSs), may fail to provide the high degree of fidelity required for high-performance (such as racing) or fully autonomous driving applications. Such applications can present unique challenges, such as rapid vehicle component (such as tire) wear encountered in demanding driving or racing or failing to have a human driver present capable of checking tire performance during vehicle operation. Component (such as tire) degradation can be made worse upon exposure to harsh weather climates, such as snow or sleet, which can damage delicate conventional electrical circuits, such as utilizations of radio frequency identification devices (RFIDs), and/or other sensing devices that utilize integrated circuits (ICs), which are incorporated within or placed onto the surfaces of tire layers, over time. Some components cannot survive even for a few minutes, where others will likely deteriorate over a few seasons. It would be desirable for newly developed electronics to employ more robust technology defined by simpler designs to quickly and accurately detect changes in vehicle component performance without necessarily requiring human involvement (such as that done by manually checking pressure of a tire). Such design concepts should not require advanced IC circuit components, thus resulting in low cost and viable solutions capable of convenient realization in industry and elsewhere in the real world.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented as a tire formed of at least a body including a plurality of plies. At least one ply of the plurality of plies can include a resonator configured to generate a resonant signal in response to a signal. A carbon-containing material can be distributed in one or more portions of the ply and configured to alter at least one characteristic of the resonant signal. In some aspects, In some implementations, altering the at least one characteristic can include one or more of shifting a frequency of the resonant signal or attenuating the resonant signal proportionately to an amount of wear of one or more of the plurality of plies, which can be configured to attenuate the resonant signal by shielding. An amount of attenuation can be based on a thickness of one or more plies of the plurality of plies. An amplitude of the attenuated resonant signal can be indicative of tire wear.

In some implementations, the resonator can be configured to resonate at a first frequency when a structural characteristic of a respective ply of the plurality of plies is greater than a level, and can be configured to resonate at a second frequency different than the first frequency when the structural characteristic of the respective ply is not greater than the level. The resonator can be configured to oscillate at a frequency based on a rotational speed of the tire.

In some implementations, an oscillation of the resonator can be initiated upon receiving a charge from a charge generation device, which can be embedded within a respective ply of the plurality of plies. In some aspects, the charge generation device can include any one or more of a tribological component and a carbon-hexagonal triboelectric energy generator (CH-TENG).

In some implementations, the resonator can include a plurality of three-dimensional (3D) aggregates formed of graphene sheets, which are coupled together to create a 3D hierarchical open porous structure. In some aspects, the tire can include a sensor formed by the carbon-containing material such that the sensor can be embedded within an inner liner of the tire.

In some implementations, the plurality of plies can include at least a first ply comprising a first resonator configured to resonate at a first frequency, a second ply comprising a second resonator configured to resonate at a second frequency different than the first frequency, and a third ply comprising a third resonator configured to resonate at a third frequency different than the first and second frequencies. In some aspects, the first ply can form an outer layer of the tire. An attenuation of the first frequency can be indicative of wear or degradation of the first ply. The second ply can be disposed on the first ply, and the third ply is disposed on the second ply. Any one or more of the first ply, the second ply, and the third ply can be in contact with each other.

Another innovative aspect of the subject matter described in this disclosure can be implemented in a tire including a body with a plurality of plies. Each ply of the plurality of plies can include a charge generation device, and a resonator electrically coupled to the charge generation device within at least one of the plurality of plies. The resonator can be configured to generate a resonant signal in response to a charge generated by the charge generation device. A tread surrounds the body.

In some implementations, at least a portion of each ply of the plurality of plies can be configured to attenuate the resonant signal generated by a corresponding resonator. An amount of attenuation can be indicative of wear or deterioration of the respective ply. At least one ply of the plurality of plies can be configured to attenuate a corresponding resonant signal by shielding. In some aspects, at least one ply of the plurality of plies can be configured to change a frequency of a corresponding resonant signal based on degradation of the at least one ply.

Details of one or more implementations of the subject matter described in this disclosure are set forth in the accompanying drawings and the description below. Other features, aspects, and advantages will become apparent from the description, the drawings and the claims.

BRIEF DESCRIPTION OF THE DRAWINGS

Implementations of the subject matter disclosed herein are illustrated by way of example and are not intended to be limited by the figures of the accompanying drawings. Like numbers reference like elements throughout the drawings and specification. Note that the relative dimensions of the following figures may not be drawn to scale.

FIG. 2B1 and FIG. 2B2 depict, respectively, two example configurations of frequency-shifting phenomena as demonstrated by a sensing laminate including carbon-containing tuned RF resonance materials, according to some implementations.

FIG. 2B3 is a graph depicting idealized changes in RF resonance as a function of deflection, according to some implementations.

FIG. 2B4 is a graph depicting changes in RF resonance for 4-layer and 5-layer laminates, according to some implementations.

FIG. 2E illustrates a table for various numerical values relating to energy harvesting for vehicles, according to some implementations.

FIG. 2F illustrates a table for various properties relating to energy harvesting for vehicles, according to some implementations.

FIG. 3F1 depicts a second set of example condition signatures that are emitted from new tires formed of layers of carbon-containing tuned RF resonance materials, according to some implementations.

FIG. 3F2 depicts a third set of example condition signatures that are emitted from tires after wear-down of some of the carbon-containing tuned RF resonance materials, according to some implementations.

FIG. 3F3 depicts a graph of measured resonant signature signal intensity (in decibels, db) against height (in millimeters, mm) of tire tread layer loss, according to some implementations.

FIGS. 3G1 and 3G2 depict schematics of example conventional carbon material production chains, according to some implementations.

FIG. 12A through FIG. 12C illustrate schematic diagrams of charge generation on a rolling wheel (equipped with a single electrode and a copper-laminated polydimethylsiloxane, PDMS, patch, according to some implementations).

FIG. 14D through FIG. 14G show various schematic diagrams relating to a non-contact ultrasonic electric resistor-condenser parallel circuit integrated on a steel wire belt of within the body of a tire, according to some implementations.

DETAILED DESCRIPTION

Figure 1A:
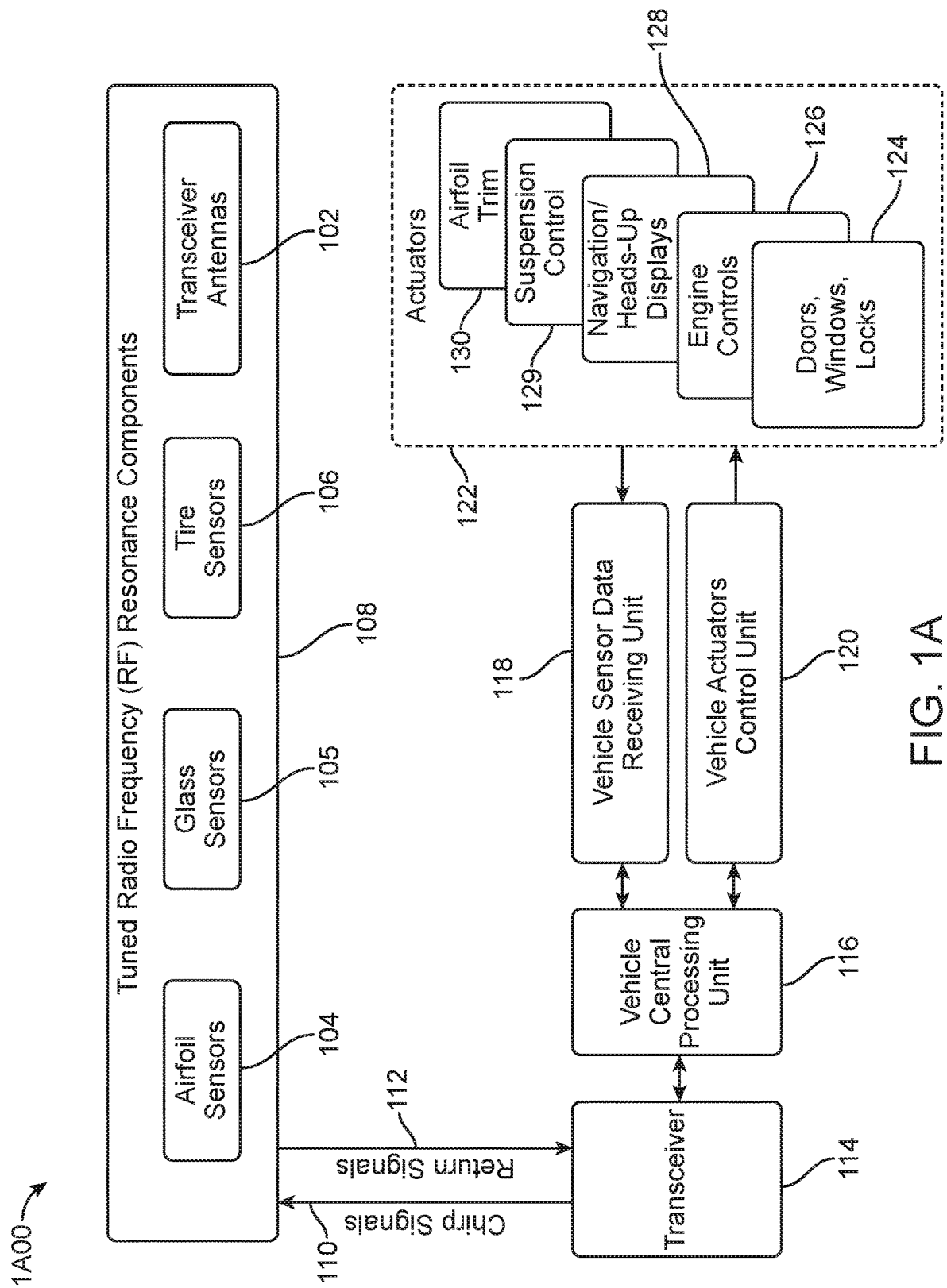
FIG. 1A presents an in-situ vehicle control system including various sensors formed of carbon-containing composites tuned to demonstrate desirable radio frequency (RF) signal resonance and response upon being pinged, according to some implementations.

Various implementations of the subject matter disclosed herein relate generally to deploying durable sensors comprising carbon-based microstructures in vehicle components, such as within the plies of the body of a conventional, currently commercially available pneumatic (referring to air, nitrogen or other gas-filled) tire, as well as next-generation air-less solid tires. Configurations also exist where such sensors with carbon-based microstructures can be (as an alternative to tire ply implementations, or in addition thereto) incorporated within portions of tire tread, referring to the rubber on its circumference that makes contact with the road or the ground. As tires are used, the tread is worn off, limiting its effectiveness in providing traction, and also resulting in at least some of the carbon-containing sensors degrading and being worn off such that the absence of the sensors can be detected by appropriately equipped componentry.

The referred-to carbon-based or carbon-containing microstructure materials (available for implementation in either of the two aforementioned discussed scenarios, including: (1) within the tire ply; and/or, (2) within the tire tread) can be tuned during in-flight synthesis (such as within a chemical reactor or reaction vessel) to achieve specific expected radio frequency (RF) signal shift (referring to frequency shift) and signal attenuation (referring to the diminishment of signal magnitude) behavior relative to RF signals emitted, such as by a transceiver mounted within one or wheel wells of a vehicle equipped with the disclosed systems and/or by a inductor-capacitor (LC) circuit, also referred to (interchangeably) as a tank circuit, LC circuit or resonator.

The disclosed configurations function independently of moving parts, such as those often required for conventional tire pressure monitoring systems (TPMSs), thus are less susceptible to wear and tear resultant of routine road usage and may be configured to communicate or otherwise electronically cooperate with pre-existing vehicle electronic components, such as those implemented in an automobile for detection and communication of tire-related wear. Target RF resonance frequency values of disclosed composite materials made from carbon microstructures can be further tuned by control of mechanisms responsible for carbon-on-carbon synthesis, also referred to as "growth", within a reaction chamber or a reactor. Disclosed carbon microstructures and other materials can demonstrate interaction to yield target performance characteristics and behaviors suitable for similar or dissimilar end-use application areas, such as knobby, low-pressure off-road tires compared to racetrack only slicks without tread.

OVERVIEW

Introduction

Advances in materials science and engineering have enabled the fine-tuning, including at the molecular structure, of carbon-based microstructural materials to resonate, demonstrate frequency shifting behaviors, and/or to attenuate (referring to, in physics and wireless telecommunications, extinction of a signal through the gradual loss of flux intensity through a medium) at specified radio frequencies (RF) (such as from 0.01 GHz to 100 GHz) that can be further refined to fit the needs of various end-use application areas. Carbon-based microstructures can be self-assembled or "grown" in a reactor from a carbon-containing gaseous species to generate ornate three-dimensional hierarchical carbon-based structures, which can be embedded as sensors within one or more plies and/or tread of the body of a vehicle tire, or some other intended vehicle-related surface, component, and/or part, etc.

Changes in the environment surrounding the vehicle equipped with the disclosed materials and systems can affect the resonance, frequency shifting, and/or signal attenuation behavior of the carbon-based structures such that even the most minute aberrations in vehicle tire performance, longevity, likelihood of degradation at a high-wear area, and so on and so forth, can be detected and communicated to the driver, passenger, or vehicle occupants more generally for fully autonomous (driver-less) vehicles in real-time (referring to as such changes occur). That is, signals may be attenuated to a certain extent by the carbon-containing microstructures embedded at certain concentration levels within one or more plies and/or treads of the tire such that the presence of that ply, or tread, layer can be accurately and repeatedly determined. Should a tread (and/or a layer within the tread) exposed to contact with a road surface, such as pavement, be eventually worn away due to repeated contact with the pavement (as experienced during driving), then the response of that tread layer (as demonstrated by attenuation or lack thereof) to emitted signals can indicate the presence or absence of that tread layer, as well as the degree of wear. Abrupt or gradual transitions in weather or other environmental conditions can cause variations in the physical characteristics of the disclosed tuned carbon-based microstructures, which is detectable through observing alterations in frequency shifting and/or attenuation behavior.

Changes in RF range resonant frequencies of the materials (such as those on the surface of or embedded within one or more tread layers) can be detected by stimulating the RF resonant material with a signal (having a known frequency) further emitted by patterned resonant circuits (referred to herein as "resonators", which can be 3D printed onto the tire body plies) in response to signal stimulation from a transceiver (potentially mounted within one or more wheel wells) to then observe a frequency shift of that emitted signal as caused by the carbon-containing microstructures, or to observe the extent of signal attenuation (also as caused by the carbon-containing microstructures). Characteristics of the signal can be electronically observed and analyzed to gauge current environmental conditions, as well as changes in weather conditions, such as heavy rain transitioning to sleet, making road surfaces slick and extremely dangerous. Also, implementations outside of vehicle tire plies are envisioned. For instance, as air pressure changes while flowing over sections of vehicle bodywork, including ground-effects such as splitters, canards, bumpers, side skirts, rear wings, spoilers and/or the like while the vehicle is moving, the air pressure can cause slight deformations (or repositioning) of at least some sections of the vehicular bodywork, which can thus corresponding changes in the RF resonance of formative carbon-based materials used to form the airfoil. Such changes in the RF resonant frequency (or frequencies) can be observed and compared to known and discrete calibration points to determine, with a very high degree of fidelity and accuracy (not otherwise achievable through conventional techniques), the air pressure as measured at one or more defined detection points on the vehicle's bodywork at a given moment in time.

Materials (including composite materials made up of multiple constituent substances or materials) can be tuned to accommodate the specific operational needs of tires (on and off-road variants) implemented in a vehicle. During operation of a vehicle, its tires often experience extremes in terms of physical stress, strain and deformation, as well as vibration. Tires can be constructed to include a body with one or more internal layers (referred to as a "ply" or "plies", surrounded by treads protruding from the body), both the tire plies and treads (inclusive of one or more tread layers within each tread) being formed of materials that can be tuned to particular RF resonant frequencies. Conventional use of tires, such as that encountered during on-road driving for most road tires, or off-road (such as in mountainous or other uneven terrain) for off-road tires, can cause slight deformations of portions of the tire, which can cause a change in the RF resonant frequency (at the time of detection of that material, such as by being 'pinged' by a RF signal) any given material used to form the tire. Such changes in the resonant frequencies (as demonstrated by either frequency-shifting and/or attenuation of emitted signals) as associated with any one or more of the presently disclosed carbon-based microstructural materials can be detected and later compared to known calibration points to definitively determine conditions inside the tire, such as increased wear in certain regions, as well as environmental conditions (outside the tire) potentially affecting the tire.

Functionality

Regarding overall system operational functionality, methods, apparatuses, and materials are disclosed herein relating to an entire system for sensing changes to vehicle components. As outlined above, items are shown for constructing such a vehicle sensing system capable of both: (1) sensing changes (due to environmental exposure, for example, or over-use); and, (2) reporting-out using, for example, surface-implanted carbon-based microstructural material sensors (as used anywhere on the body of a vehicle) and/or embedded sensors (e.g., as used in tires).

Theoretical underpinnings are then presented on how even a miniscule amount of deflection (such as due to air pressure on a vehicle skin, or due to any external application of forces in/on a tire) can be detected by 'pinging' (referring to the emitting and later observation and analysis of RF signals) for then processing the "signature" of a given tire ply and/or tread layer (or other so-equipped surface or region) as demonstrated by, for example, frequency domain return. Various mechanisms for calibrating an observed signal signature (in a test setting) and processing a return signature (in an operational setting) are discussed.

Methods (and related apparatuses) for fabrication of a tire with passive embedded sensors in the form of tuned carbon structures that interact with the elastomer are also presented. The nature of a return signature upon pinging an embedded tire sensor is discussed, as is the mechanism for making a tire from multiple plies—each of which employs a different tuned carbon having a different tuned microstructure. These carbon-based microstructures can be in the micron-sized scale, or alternatively in any one or more of the nanometer, micro and even meso-particle sizes up to the millimeter (mm) level.

Further observations that can be exploited in tire (and potentially other areas as well) sensing are also explored, including: (1) self-powered signatures from resonance in the GHz and MHz range as made possible by tribological power generators to generate electric current upon, for example, rotation of a vehicle tire and its repeated friction and/or contact with the pavement or ground. Such tribological components can be integrated or otherwise incorporated within multiple steel belts in between elastomer layers in one or more vehicle tire plies.

Notably the tribological (referring to the study and application of the principles of friction, lubrication, and wear as related to the generation of energy to create usable electric current or power) effect is available for usage through, for example, a pattern for a conductive path (that may be at least partially carbon-based) to accommodate charge movement. Doing so leads to the creation of an electric charge generator (as provided by the discussed triboelectric componentry), to then direct that charge into an appropriately equipped resonator (also referred to as a resonant circuit, etc.), which has a tunable natural frequency when it is discharging. This natural frequency, as used herein, is in the MHz range (or lower). Accordingly, the resonator can be charged (and/or powered) by the triboelectric generator for the resonator to resonate (and thus emit RF signals) and discharge. The resonator can be configured to accommodate repeated charge-discharge cycles and be in any one or more of a variety of shapes and/or patterns, including ovals that have an inherent resonant value or properties (based on its formative materials and/or construction).

Changes in the shape or orientation of the resonator may result in a corresponding change of any associated resonation constants. As a result, any change in tire physical properties due to deformation (such as under static conditions like internal tire pressure, or under dynamic conditions such as those encountered while running over Bots Dots, can change the shape or orientation of the resonator. Different patterns can be used to respond with greater sensitivity to one type of deformation over another (such as referring to lateral deformation encountered while moving around a curve compared to vertical motion encountered while running over gravel or a rough surface).

Individual components in an equipped vehicle can demonstrate one or more unique "signatures" defined by the carbon-containing microstructural materials, where such signatures result from exposure to RF signals in the KHz (or lower) range. Disclosed configurations include where dynamic operational properties can be sensed using an embedded sensor (such in a tire body ply and/or tread layer). Nevertheless, placement of the aforementioned triboelectric charge generators in tire plies near the tread can allow for digital observations of oscillations as the tire rotates. Such oscillations are in the low hertz range and can be used for dynamic sensing like revolutions per minutes (RPM), as well as relatively more static testing, such as sending indications for treadwear.

Disclosed carbon-based microstructural materials can support wear indication by both: (1) an externally-originating 'ping' signal emission and/or transmission for frequency-shift and/or signal attenuation detection capabilities, such as those offered by a digital signal processing, DSP, computer chip and/or transducers placed within the wheel well, or even within the rim, of a wheel; as well as with (2) an intra-tire, self-powered, self-pinging capability facilitated by tribological power generators embedded within, for example, tire plies to provide charge and/or electric power to resonators. Option (1) as indicated above can use an external transceiver (a semiconductor chip) for both stimulus and response; while, option (2) can take advantage of tuned intra-tire resonant circuits that are constantly resonating in a manner that can be picked up by an external receiver (such as a semiconductor chip again—but without necessarily the need for separately-supplied transmission power).

Appropriately equipped and/or prepared receivers, transceivers and/or the like can discriminate between the many different signatures to very precisely and accurately identify (pin-point) a particular type of wear observed at a specific region, such as deterioration of the interior-facing sidewall of the right front tire due to aggressive cornering on a racetrack featuring elevation changes, etc.).

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration, and not necessarily to serve as a desirable model representing the best of its kind. Therefore, any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". Unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive, meaning lacking connection or expressing a choice between two mutually exclusive possibilities, for example "or" in "she asked if he was going or staying". The articles "a" and "an" as used in this application and the appended claims should generally be construed to mean "one or more" unless specified otherwise or is clear from the context to be directed to a singular form.

Various implementations are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed implementations—they are not representative of an exhaustive treatment of all possible implementations, and they are not intended to impute any limitation as to the scope of the claims. In addition, an illustrated implementation need not portray all aspects or advantages of usage in any particular environment. The disclosed implementations are not intended to be limiting of the claims.

System Structure

FIG. 1A shows a block diagram of a vehicle condition detection system 1A00 (intended to be equipped onto the vehicle). The vehicle condition detection system 1A00 may include sensors, such as tuned RF resonance components 108 composed of multiple carbon-based microstructural materials, aggregates, agglomerations, and/or the like such as those disclosed by Stowell, et al., in U.S. patent application Ser. No. 16/785,020 entitled "3D Self-Assembled Multi-Modal Carbon-Based Particle" filed on Feb. 7, 2020 (referred to herein in the collective as "carbon-based microstructure"). The tuned RF resonance components 108 can be incorporated into any one or more of airfoil sensors 104, glass sensors 1051, tire sensors 106, and transceiver antennas 102 on a vehicle, such as a conventional driver-driven automobile or a fully-autonomous transport pod or vehicle capable of operating to move vehicle occupants without a human driver.

The tuned RF resonance components 108 can be configured to electronically and/or wirelessly communicate, such as by measurement of signal frequency shift or attenuation, with any one or more of a transceiver 114, a vehicle central processing unit 116, a vehicle sensor data receiving unit 118, a vehicle actuators control unit 120, and actuators 122 including doors, windows, locks 125, engine controls 126, navigation/heads-up displays 128, suspension control 129, and an airfoil trim 130. The various tuned RF resonance components 108 can cause a shift in observed frequencies of emitted RF signals (referred to as a "frequency-shift", implying any change in frequency) via emitted "chirp" signals 110 and/or "returned" chirp signals 112 with the transceiver 114. Reference to a "returned" chirp signal of the chirp signal 110O can refer to the electronic observation or detection of frequency shift or attenuation of emitted chirp signals 110 relative to one or more of the tuned RF resonance components 108 integrated into any one or more of the airfoil sensors 104 and/or the like (rather than an actual reflection or return of a signal from a sensor). The chirp signals 110 and the returned chirp signals 112 can be in communication with (and therefore also assessed by) any one or more of the vehicle central processing unit 116, the vehicle sensor data receiving unit 118, the vehicle actuators control unit 120, and/or the actuators 122. The vehicle condition detection system 1A00 can be implemented using any suitable combination of software and hardware.

Any one or more of the depicted various sensors of the vehicle condition detection system 1A00 can be formed of carbon-based microstructures tuned to achieve a specific RF resonance behavior upon being "pinged" (referring to being hit or otherwise contacted by) emitted RF signals. The vehicle condition detection system 1A00 (or any aspect thereof) can be configured to be implemented in any conceivable vehicle use application, area, or environment, such as during inclement weather conditions including sleet, hail, snow, ice, frost, mud, sand, debris, uneven terrain, water and/or the like.

The tuned RF resonance components 108 can be disposed around and/or on the vehicle (such as within the cabin, engine compartment, or the trunk, or on the body of the vehicle). As shown in FIG. 1A, the tuned RF resonance components can include airfoil sensors 104, glass sensors 105, tire sensors 106, and transceiver antennas 102, any one or more of which can be implemented in modern vehicles during their production, or (alternatively) retro-fitted to pre-existing vehicles, regardless of their age and/or condition. The tuned RF resonance components 108 can be formed, in part, using readily available materials such as fiberglass (such as, for airfoils) or rubber (such as, for tires) or glass (such as, for windshields). These conventional materials can be combined with carbon-based materials, growths, agglomerates, aggregates, sheets, particles and/or the like, such as those self-nucleated in-flight in a reaction chamber or reactor from a carbon-containing gaseous species and formulated to: (1) improve the mechanical (such as tensile, compressive, shear, strain, deformation and/or the like) strength of a composite material in which they are incorporated; and/or, (2) to resonate at a particular frequency or set of frequencies (within the range of 10 GHz to 100 GHz). Variables that dominate RF resonance properties and behavior of a material can be controlled independently from the variables responsible for control of material strength.

Radio Frequency (RF) based stimulation (such as that emitted by the transceiver 114 or emitted by a resonator) can be used to emit RF signals to the tuned RF resonance components 108, the actuators 122 (and/or the like, such as sensors implemented in or on the tuned RF resonance components 108) to detect their respective resonance frequency or frequencies, as well as frequency shifts and patterns observed in the attenuation of emitted signals (which may be affected by internal or external conditions). For example, if a tuned RF resonance component (such as the tire sensors 106) has been specially prepared (referred to as being "tuned") to resonate at a frequency of approximately 3 GHz, then the tire sensors 106 can emit sympathetic resonance or sympathetic vibrations (referring to a harmonic phenomenon wherein a formerly passive string or vibratory body responds to external vibrations to which it has a harmonic likeness) when stimulated by a 3 GHz RF signal.

These sympathetic vibrations can occur at the stimulated frequency as well in overtones or sidelobes deriving from the fundamental 3 GHz tone. If a tuned resonance component (of the tuned RF resonance components 108) has been tuned to resonate at 2 GHz, then when the tuned resonance component is stimulated by a 2 GHz RF signal, that tuned resonance component will emit sympathetic vibrations as so described. These sympathetic vibrations will occur at the stimulated frequency as well as in overtones or sidelobes (in engineering, referring to local maxima of the far field radiation pattern of an antenna or other radiation source, that are not the main lobe) deriving from the fundamental 2 GHz tone. Many additional tuned resonance components can be situated proximally to an RF emitter. An RF emitter might be controlled to first emit a 2 GHz ping, followed by a 3 GHz ping, followed by a 4 GHz ping, and so on. This succession of pings at different and increasing frequencies is referred to as a "chirp".

Adjacent tire plies (such as those in contact with each other) within a tire body, such as that generally shown by FIGS. 3F1-3F2, can have varying concentration levels or configurations of carbon-based microstructures to define sensors incorporated within that (referring to the respective) tire body ply and/or tread layer to resonate at varying distinct frequencies that are not harmonic with one-another. That is, non-harmonic plies can ensure a distinct and easily recognizable detection of a particular tire body ply and/or tread layer (or other surface or material) relative to others with minimal risk of confusion due to signal interference caused by (or otherwise associated with) harmonics.

The transceiver 114 (and/or a resonator, not shown in FIG. 1A) can be configured to transmit chirp signals 110 to any one or more of the tuned RF resonance components 108 to digitally recognize frequency shift and/or attenuation of the chirp signals 111 (referred to as the returned signals 112 in FIG. 1A) from any one or more of the tuned RF resonance components 108. Such "returned" signals 108 can be processed into digital information that can be electronically communicated to a vehicle central processing unit 116, that interacts with a vehicle sensor data receiving unit 118 and/or a vehicle actuators control unit 120, which send further vehicle performance related signals based on sensor data received. The returned signals $112_0$ can at least partially control the actuators 122. That is, the vehicle actuators control unit 120 can control the actuators 122 to operate any one or more of the doors, windows, locks 124, the engine controls 126, the navigation/heads-up displays 128, the suspension control 129, and/or the airfoil trim 130 according to feedback received from the vehicle sensor data receiving unit 118 regarding vehicle component wear or degradation as indicated by the tuned RF components in communication with the transceiver 114.

Detection of road debris and inclement weather conditions upon monitoring behavior (such as frequency shift and/or attenuation) of the chirp signal 111 can, for example, result in the actuators 122 triggering a corresponding change in the suspension control 129. Such changes can, for example, include softening suspension settings to accommodate driving over the road debris, while later tightening suspension settings to accommodate enhanced vehicle responsiveness as may be necessary to travel during heavy rain (and thus low traction) conditions. The variations of such control by the vehicle actuators control unit 120 are many, where any conceivable condition exterior to the vehicle can be detected by the transceiver (as demonstrated by frequency shifting and/or attenuation of the chirp signals 110 and/or the returned signals 112).

Any of the tuned RF resonance components 108 forming the described sensors can be tuned to resonate when stimulated at particular frequencies, where a defined shift in frequency or frequencies (as caused by the carbon-based microstructures) can form one or more signal signatures indicative of the material, or condition of the material, into which the sensor is incorporated.

Time variance or deviation (TDEV) (referring to the time stability of phase x versus observation interval τ of the measured clock source; the time deviation thus forms a standard deviation type of measurement to indicate the time instability of the signal source) of frequency shifts in the returned signals 112 (such as that shown in a signal signature) can correspond to time variant changes in the environment of the sensor and/or time variant changes in the sensor itself. Accordingly, signal processing systems (such as any one or more of the vehicle central processing unit 116, the vehicle sensor data receiving unit 118, and/or the vehicle actuators control unit 120, etc.) can be configured to analyze signals (such as chirp signals 110 and returned signals 112) associated with the sensors according to TDEV principles. Results of such analysis (such as a signature analysis) can be delivered to the vehicle central processing unit 116, which (in turn) can communicate commands to the vehicle actuators control unit 120 for appropriate responsive action. In some configurations such responsive action by the actuators 122 can involve at least some human driver input, while in other configurations the vehicle condition detection system 1A00 can function entirely in a self-contained manner allowing for a so-equipped vehicle to address component performance issues as they arise in an entirely driverless setting.

Figure 1B:
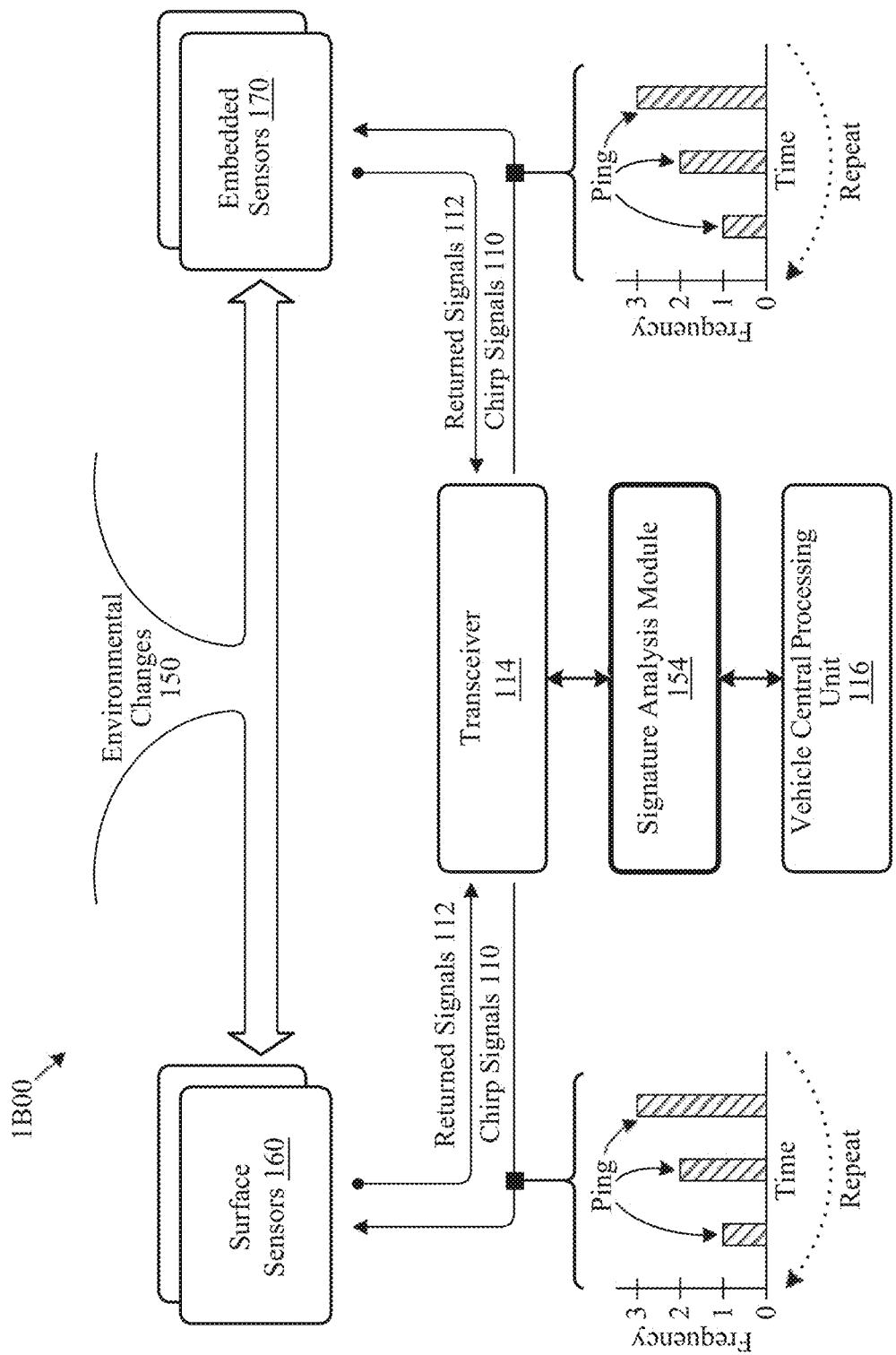
FIG. 1B illustrates a signal processing system that analyzes chirp signals that are frequency-shifted and/or attenuated by sensors formed of carbon-containing tuned RF resonance materials, according to some implementations.

FIG. 1B shows a block diagram of a signal processing system 1B00, which can include surface sensors 160 and embedded sensors 170, any one or more of which may electronically communicate with the other concerning environmental changes 150 for a so-equipped vehicle (referring to a vehicle equipped with the surface sensors 160 and the embedded sensors 170). The signal processing system 1B00 may also include a transceiver 114, a signature analysis module 154, and a vehicle central processing unit 116, any one or more of which is in electronic communication with the other.

The signal processing system 1B00 functions to analyze a signal signature (defined by digitally observing frequency shifting and/or attenuation of any one or more of chirp signals 111 and/or chirp signals 110 as indicated in corresponding "returned" signals 112) once sensors formed of carbon-based microstructures have been stimulated. As a result of stimulation with a chirp signal sensor that resonate at one of the chirp/ping frequencies "respond" by resonating at or near its corresponding tuned frequency, shifting the emitted frequency, and/or attenuating the amplitude of the emitted signal. When an environmental change (such as that resulting in the wear of a tire body ply and/or tread layer) occurs while the chirp/ping is emitted, "returned" signals can monitored for variations in modulation—either higher or lower than the tuned frequency. Accordingly, the transceiver 114 can be configured to receive "returned" signals 112 that are representative of the surfaces that they are pinged on or against, etc.

The foregoing chirp/ping signals can be emitted (such as by non-audible RF signal, pulse, vibration and/or the like transmission) by the transceiver 114. Also, the "return" signals can be received by the same (or different) transceiver 114. As shown, chirp signals can occur in a repeating sequence of chirps (such as, chirp signals 110). For example, a chirp signal sequence might be formed of a pattern comprising a 1 GHz ping, followed by a 2 GHz ping, followed by a 3 GHz ping, and so on. The entire chirp signal sequence can be repeated in its entirety continuously. There can be brief periods between each ping such that the returned signals from the resonant materials (returned signals 112) can be received immediately after the end of a ping. Alternatively, or in addition, signals corresponding to ping stimulus and signals of the observed "response" can occur concurrently and/or along the same general pathway or route. The signature analysis module can employ digital signal processing techniques to distinguish signals of the observed "response" from the ping signals. In situations where the returned response comprises energy across many different frequencies (such as, overtones, sidelobes, etc.), a notch filter can be used to filter the stimulus. Returned signals that are received by the transceiver can be sent to the signature analysis module 154, which in turn can send processed signals to vehicle central processing unit 116. The foregoing discussion of FIG. 1B includes discussion of sensors formed of carbon-containing tuned resonance materials and can also refer to sensing laminates as well.

Figure 1C:
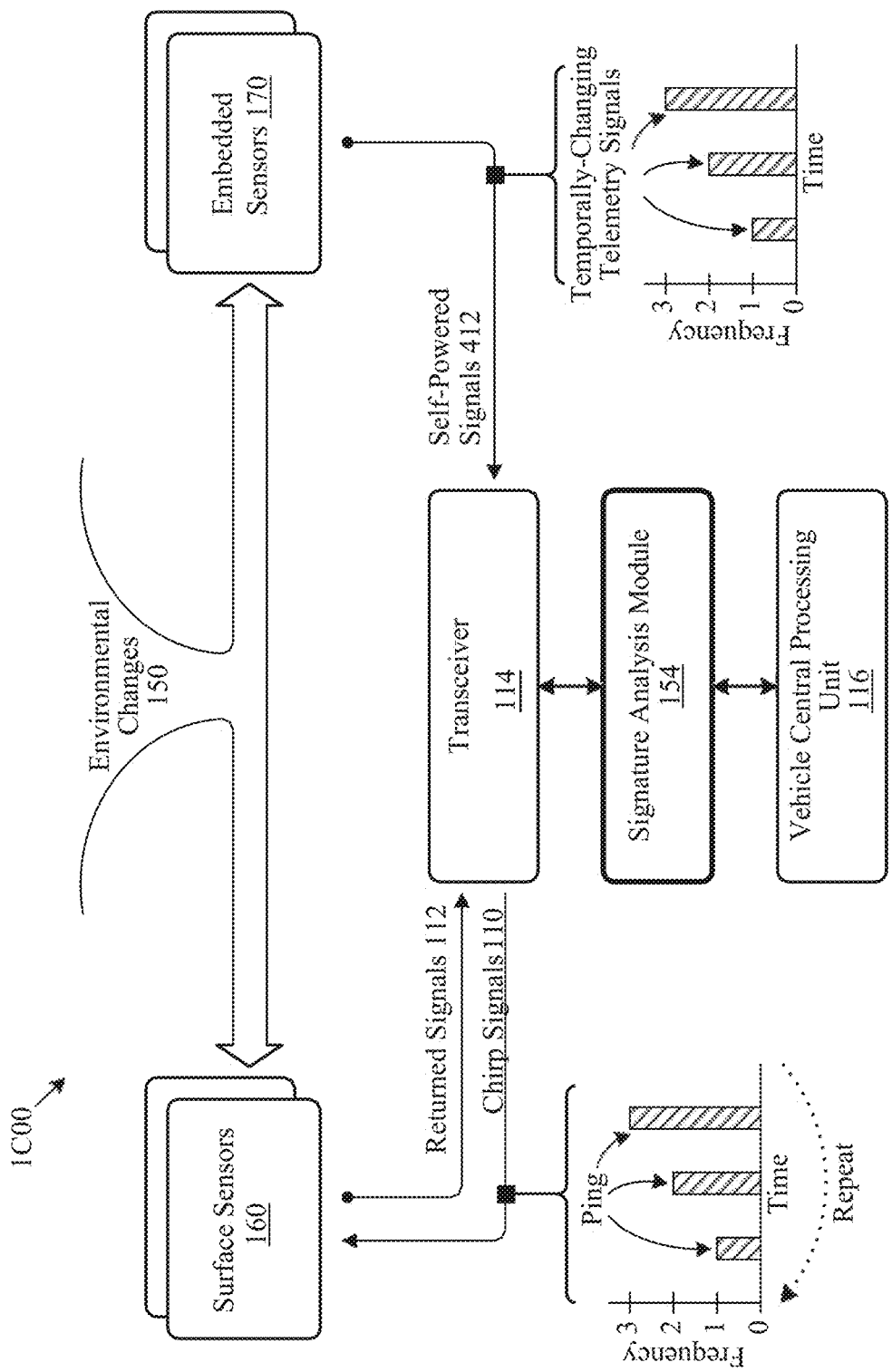
FIG. 1C illustrates a signal processing system that analyzes temporally-changing telemetry signals generated by (or otherwise associated with) self-powered telemetry, the signals being frequency-shifted and/or attenuated by sensors formed of carbon-containing tuned RF resonance materials, according to some implementations.

FIG. 1C shows a block diagram of a signal processing system 1C00, which is substantially similar to the signal processing system 1B00 shown in FIG. 1B, such that a redundant description of like features is omitted. Environmental changes 150, such as that referring to precipitation like rain, snow, hail, sleet and/or the like, can be indicated by surface sensors 160 and/or embedded sensors 170. Unlike surface sensors 160, embedded sensors 170 (which can be embedded within materials such as tire plies) can employ and/or be powered by self-powered telemetry including tribological energy generators (not shown in FIG. 1C) also incorporated within the material enclosed the respective sensor. Accordingly, the tribological energy generators can generate usable electric current and/or power by harvesting static charge buildup between, for example, a rotating tire or wheel and the pavement it contacts, to power a resonant circuit (to be described in further detail herein), which can then resonate to emit a RF signal at a known frequency. As a result, an externally-mounted transceiver unit (such as that mounted within each wheel well of a vehicle) can emit RF signals which are further propagated by the resonant circuits that are tribologically-powered and embedded in the plies of a tire body in this configuration. Frequency shifts and/or attenuation of the magnitude of the emitted signals are likewise received and analyzed, for example, by a signature analysis module 154 and/or a vehicle central processing unit 166.

Self-powered telemetry (referring to collection of measurements or other data at remote or inaccessible points and their automatic transmission to receiving equipment for monitoring) can be incorporated in vehicle tires. Self-powering telemetry, as referred to herein, includes exploiting tribological charge generation inside a tire, storage of that charge, and later discharge of the stored charge to or through a resonant circuit, to make use of the "ringing" (referring to oscillation of the resonant circuit responsible for further emission of RF signals) that occurs during discharge of the resonant circuit (referring to an electric circuit consisting of an inductor, represented by the letter L, and a capacitor, represented by the letter C, connected together, used to generate RF signals at a particular frequency or frequencies).

Ping stimulus can be provided, generally, in one of two possible configurations of the presently disclosed vehicle component wear detection systems, including:

Reliance on signals or 'pings' generated by a stimulus source, such as a conventional transceiver, located outside the tire (or other vehicle component intended for monitoring regarding wear from ongoing use) such as being incorporated within each wheel well of a so-equipped vehicle; or Usage of an intra-tire (referring to also being embedded in the tire plies, similar to the sensors having carbon-based microstructures) tribological energy generation devices that harvest energy resultant from otherwise wasted frictional energy between the rotating wheel and/or tire and the ground or pavement in contact therewith. Tribology, as commonly understood and as referred to herein, implies the study of the science and engineering of interacting surfaces in relative motion. Such tribological energy generation devices can provide electrical power to intra-tire resonance devices which in turn self-emit tire property telemetry.

Either of the above-discussed two 'ping' stimulus generators or providers can have complex resonance frequencies (CRf) components ranging from approximately 10 to 99 GHz (due, for example, resonance frequency of small dimensions of structures like graphene platelets) as well as lower frequency resonance in Khz range due to the relatively much larger dimensions of the discussed intra-tire resonance. Generally, CRf can be equated to a function of elastomer component innate resonance frequency, carbon component innate resonance frequency, ratio/ensemble of the constituent components, and the geometry of the intra-tire resonance device.

Figure 2A:
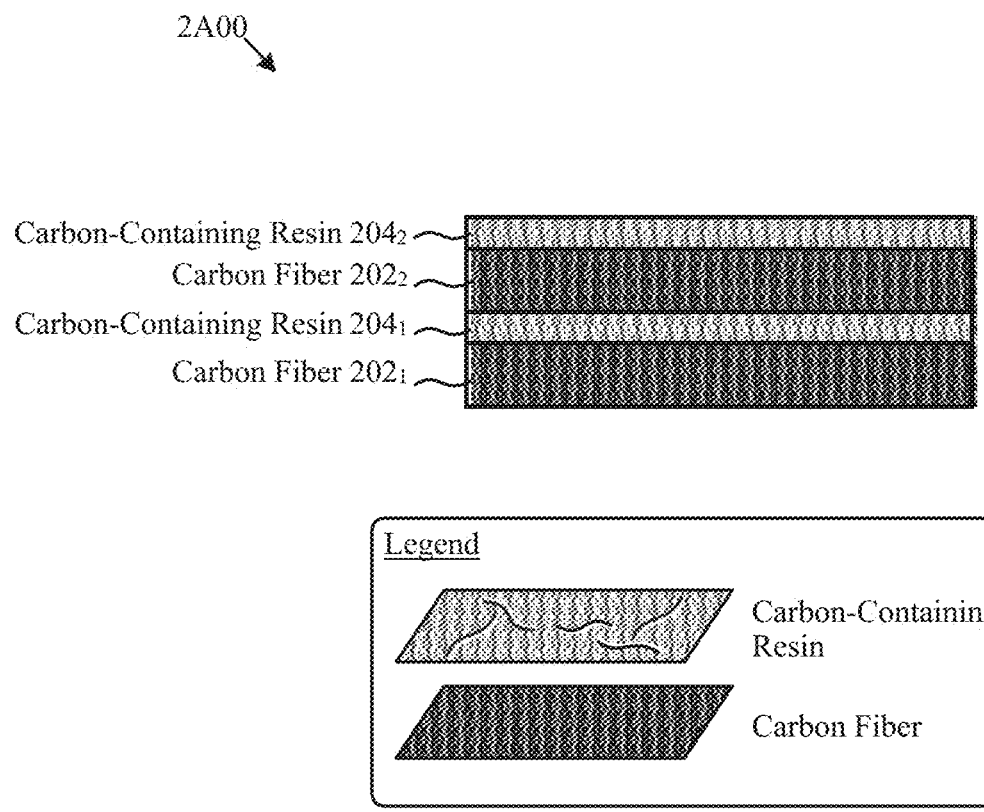
FIG. 2A depicts a sensing laminate including alternating layers of carbon-containing resin and carbon fiber in contact with one-another, according to some implementations.

FIG. 2A shows a schematic side-view cutaway diagram of a sensing laminate 2A00 (that can be representative of any sensor discussed with relation to that shown in FIGS. 1A-1C) composed of multiple layers disposed on each other, including (sequentially) a carbon-containing resin $204_2$, a carbon fiber $202_2$, a carbon-containing resin $204_1$, and a carbon fiber $202_1$. The term "resin" (in polymer chemistry and materials science), generally, refers to a solid or highly viscous substance of plant or synthetic origin that is typically convertible into polymers (a large molecule, or macromolecule, composed of many repeated subunits). Synthetic resins are industrially produced resins, typically viscous substances that convert into rigid polymers by the process of curing. In order to undergo curing, resins typically contain reactive end groups, such as acrylates or epoxides. And, the term "carbon fiber", are fibers about 5-10 micrometers (μm) in diameter and composed mostly of carbon atoms. Carbon fibers have several advantages including high stiffness, high tensile strength, low weight, high chemical resistance, high temperature tolerance and low thermal expansion.

Any one or more of the carbon-containing resin $204_2$, the carbon fiber $202_2$, the carbon-containing resin $204_1$, and the carbon fiber $202_1$ can be tuned to demonstrate or exhibit one or more specific resonance frequencies upon being pinged by RF signals by incorporating specific concentration levels of the any one or more of the aforementioned carbon-containing microstructures. The sensing laminate can include any configuration, orientation, order, or layering of any one or more of the carbon-containing resin $204_2$, the carbon fiber $202_2$, the carbon-containing resin $204_1$, and the carbon fiber $202_1$ and/or fewer or additional layers comprising similar or dissimilar materials. Additional layers of resin can be layered interstitially between additional layers of carbon fiber.

Each layer of carbon-containing resin can be formulated differently to resonate at a different expected or desired tuned frequency. The physical phenomenon of material resonation can be described with respect to a corresponding molecular composition. For example, a layer having a first defined structure, such as a first molecular structure will resonate at a first frequency, whereas a layer having a second, different molecular structure can resonate at a second, different frequency Material having a particular molecular structure and contained in a layer will resonate at a first tuned frequency when that layer is in a low energy state, and will resonate at a second different frequency when the material in the layer is in an induced higher-energy state. For example, material in a layer that exhibits a particular molecular structure can be tuned to resonate at a 3 GHz when the layer is in a natural, undeformed, low energy state. In contrast, that same layer can resonate at 2.95 GHz when the layer is at least partially deformed from its natural, undeformed, low energy state. As a result, this phenomenon can be adjusted to accommodate the needs for detecting, with a high degree of fidelity and accuracy, even the most minute aberration to, for example, a tire surface contacting against a road surface such as pavement and experiencing enhanced wear at a certain localized region of contact. Race cars racing on demanding race circuits (referring to highly technical, windy tracks featuring tight turns and rapid elevational changes) can benefit from such localized tire wear or degradation information to make informed tire-replacement decisions, even in time-sensitive race-day conditions.

The frequency-shifting phenomenon referred to above (such as transitioning from resonating at a frequency of 3 GHz to 2.95 GHz) is shown and discussed with reference to FIGS. 2B1-2B2. FIG. 2B2 depicts a frequency-shifting phenomenon as exhibited in a sensing laminate that includes carbon-containing tuned resonance materials.

As generally understood, atoms emit electromagnetic radiation at a natural frequency for a given element. That is, an atom of a particular element has a natural frequency that corresponds to characteristics of the atom. For example, when a Cesium atom is stimulated, a valence electron jumps from a lower energy state (such as, a ground state) to a higher energy state (such as, an excited energy state). When the electron returns to its lower energy state, it emits electromagnetic radiation in the form of a photon. For Cesium, the photon emitted is in the microwave frequency range; at 9.192631770 THz. Structures that are larger than atoms, such as molecules formed of multiple atoms also resonate (such as by emitting electromagnetic radiation) at predictable frequencies. For example, liquid water in bulk resonates at 109.6 THz. Water that is in tension (such as, at the surface of bulk, in various states of surface tension) resonates at 112.6 THz. Carbon atoms and carbon structures also exhibit natural frequencies that are dependent on the structure. For example, the natural resonant frequency of a carbon nanotube (CNT) is dependent on the tube diameter and length of the CNT. Growing a CNT under controlled conditions to control the tube diameter and length leads to controlling the structure's natural resonant frequency. According, synthesizing or otherwise "growing" CNTs is one way to tune to a desired resonant frequency.

Other structures formed of carbon can be formed under controlled conditions. Such structures include but are not limited to carbon nano-onions (CNOs), carbon lattices, graphene, carbon-containing aggregates or agglomerates, graphene-based, other carbon containing materials, engineered nanoscale structures, etc. and/or combinations thereof, any one or of which being incorporated into sensors of vehicle components according to the presently disclosed implementations. Such structures can be formed to resonate at a particular tuned frequency and/or such structures can be modified in post-processing to obtain a desired characteristic or property. For example, a desired property such as a high reinforcement value can be brought about by selection and ratios of combinations of materials and/or by the addition of other materials. Moreover, co-location of multiples of such structures introduces further resonance effects. For example, two sheets of graphene may resonate between themselves at a frequency that is dependent on the length, width, spacing, shape of the spacing and/or other physical characteristics of the sheets and/or their juxtaposition to each other.

As is known in the art, materials have specific, measurable characteristics. This is true for naturally occurring materials as well as for engineered carbon allotropes. Such engineered carbon allotropes can be tuned to exhibit physical characteristics. For example, carbon allotropes can be engineered to exhibit physical characteristics corresponding to: (a) a particular configuration of constituent primary particles; (b) formation of aggregates; and, (c) formation of agglomerates. Each of these physical characteristics influence the particular resonant frequencies of materials formed using corresponding particular carbon allotropes.

In addition to tuning a particular carbon-based structure for a particular physical configuration that corresponds to a particular resonant frequency, carbon-containing compounds can be tuned to a particular resonant frequency (or set of resonant frequencies). A set of resonant frequencies is termed a resonance profile.

Forming Frequency-Tuned Materials

Carbon-containing materials (such as those including carbon-based microstructures) tuned to demonstrate a specific resonance frequency upon being pinged by a RF signal can be tuned to exhibit a particular resonance profile by tailoring specific compounds that make up the materials to have particular electrical impedances. Different electrical impedances in turn correspond to different frequency response profiles.

Impedance describes how difficult it is for an alternating (AC) current to flow through an element. In the frequency domain, impedance is a complex number having a real component and an imaginary component due to the structures behaving as inductors. The imaginary component is an inductive reactance (the opposition of a circuit element to the flow of current due to that element's inductance or capacitance; larger reactance leads to smaller currents for the same voltage applied) component $X_L$, which is based on the frequency f and the inductance L of a particular structure:

$$X_L = 2\pi f L \quad \text{(Eq. 1)}$$

As the received frequency increases, the reactance also increases such that at a certain frequency threshold the measured intensity (amplitude) of the emitted signal can attenuate. Inductance L is affected by the electrical impedance Z of a material, where Z is related to the material properties of permeability $\mu$ and permittivity c by the relationship:

$$Z = \sqrt{\frac{\mu' + j\mu''}{\varepsilon' + j\varepsilon''}} = \sqrt{\frac{\mu_0}{\varepsilon_0}}, \quad \text{(Eq. 2)}$$

Thus, tuning of material properties changes the electrical impedance Z, which affects the inductance L and consequently affects the reactance $X_L$.

Carbon-containing structures such as those disclosed by Anzelmo, et al., in U.S. Pat. No. 10,428,197 entitled "Carbon and Elastomer Integration" issued on Oct. 1, 2019, incorporated herein by reference in its entirety with different inductances can demonstrate different frequency responses (when used to create sensors for the aforementioned systems). That is, a carbon-containing structure with a high inductance L (being based on electrical impedance Z) will reach a certain reactance at a lower frequency than another carbon-containing structure with a lower inductance.

The material properties of permeability, permittivity and conductivity can also be considered when formulating a compound to be tuned to a particular electrical impedance. Still further, it is observed that a first carbon-containing structure will resonate at a first frequency, whereas second carbon-containing structure will resonate at a second frequency when that structure is under tension-inducing conditions, such as when the structure is slightly deformed (such as, thereby slightly changing the physical characteristics of the structure).

FIG. 2B1 depicts a first carbon-containing structure that resonates at a first frequency, which can be correlated to an equivalent electrical circuit comprising a capacitor $C_1$ and an inductor $L_1$. The frequency $f_1$ is given by the equation:

$$f_1 = \frac{1}{2\pi\sqrt{L_1 C_1}} \quad \text{(Eq. 3)}$$

FIG. 2B2 depicts a slight deformation of the same first carbon-containing structure of FIG. 2B1. The deformation causes a change to the physical structure, which in turn changes the inductance and/or capacitance of the structure. The changes can be correlated to an equivalent electrical circuit comprising a capacitor $C_2$ and an inductor $L_2$. The frequency $f_2$ is given by the equation:

$$f_2 = \frac{1}{2\pi\sqrt{L_2 C_2}} \quad \text{(Eq. 4)}$$

FIG. 2B3 is a graph 2B300 depicting idealized changes in measured resonance as a function of deflection. As an option, one or more variations of graph 2B300 or any aspect thereof may be implemented in the context of the implementations described herein. The graph 2B300 (or any aspect thereof) may be implemented in any environment.

The implementation shown in FIG. 2B3 is merely one example. The shown graph depicts one aspect of deformation, specifically deflection. As a member or surface undergoes deformation by deflection (such as curving), the deformation can change the demonstrated resonance frequency of the member upon being pinged by a signal, such as an RF signal. The shape of the curve can depend on characteristics of the member, such as on characteristics of the laminate that forms the member or surface. The curve can be steep at small variations, whereas the curve flattens as the deflection reaches a maximum. Moreover, the shape of the curve depends in part on the number of layers of the laminate, the geometry of the carbon structures, how the carbon is bonded into the laminate, etc.

FIG. 2B4 is a graph 2B400 depicting changes in resonance for 4-layer laminates 292 and for 5-layer laminates 294. As an option, one or more variations of graph 2B400 or any aspect thereof can be implemented in the materials and systems described herein. Materials such as the described laminates can be deployed into many applications. One particular application is for surface sensors, which can be deployed into or on or over many locations throughout a vehicle. Some such deployments are shown and described as pertains to FIG. 2C.

Figure 2C:
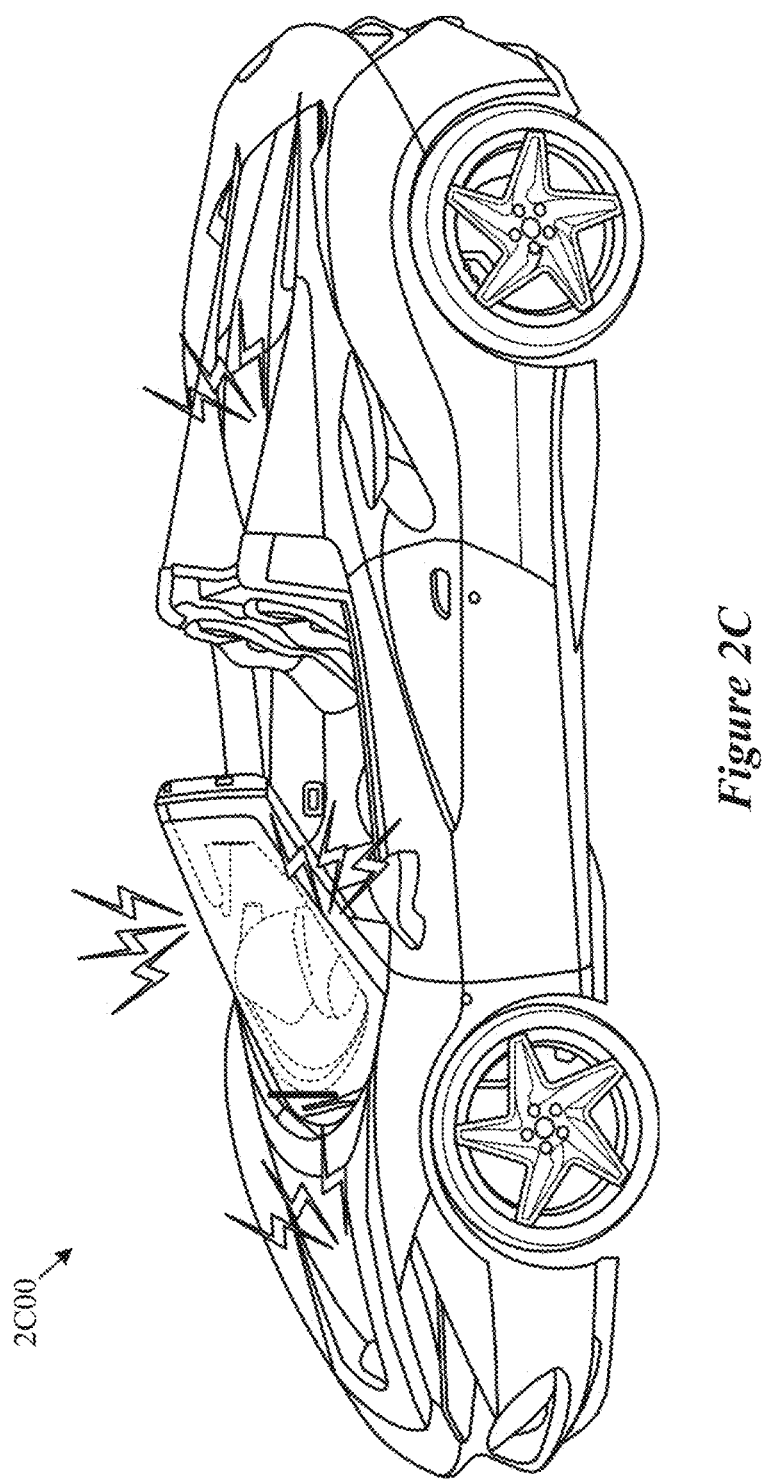
FIG. 2C depicts surface sensor deployments in areas of a vehicle, according to some implementations.

FIG. 2C depicts example surface sensor deployments 2C00 in selected locations of a vehicle. The example surface sensor deployments 2C00 or any aspect thereof may be implemented in or on a vehicle exposed to any possible exterior environmental condition, such as snow, sleet, hail, etc.

Tuned resonance sensing carbon-containing materials can be incorporated into or with automotive features, surfaces, and/or components in the context of durable sensors in various exterior surfaces of vehicles. As shown, the vehicle is equipped with surface sensors on the front faring (such as, hood) of the vehicle, on support members of the vehicle, and on the roof of the vehicle. Each of the foregoing locations of the vehicle can be subjected to stresses and accompanying deformations during operation of the vehicle. As examples, the surface sensors on the front faring will undergo air pressure changes when the vehicle is in operation (such as, during forward motion). Under the forces of the air pressure, the material that composes the surface can deform slightly and, in accordance with the phenomenon described as pertains to FIG. 2B1 and FIG. 2B2, demonstrate a change in resonant frequency of the material proportionate to the degree of change or deformation of the material. Such a change can be detected using the 'ping" and observation techniques described earlier.

Observed emitted signals can collectively define a signature for a particular material or surface and can be further classified. Specific characteristics of the signal can be isolated for comparison and measurement to determine calibration points that correspond to the specific isolated characteristics. Accordingly, aspects of the environment surrounding a vehicle can be accurately and reliably determined.

For example, if the deformation of the surface sensor results in a frequency shift from 3 GHz to 2.95 GHz, the difference can be mapped to a calibration curve, which in turn can yield a value for air pressure. A vehicle component such as a panel, roof, hood, trunk, or airfoil component can provide a relatively large surface area. In such cases, transceiver antennas can be distributed on the observable side of the component. Several transceiver antennas can be distributed into an array, where each element of the array corresponds to a section of the large surface area. Each transceiver antenna can be installed on or within the wheel wells of the surface sensor deployments 2C00 as shown and be independently stimulated by pings/chirps. In some cases, each element of the array can be stimulated sequentially, whereas, in other cases, each element of the array is stimulated concurrently. Aerodynamics of the vehicle can be measured over large surface areas by signal processing employed to distinguish signature returns from proximal array elements.

Signature returns from a particular array element can be analyzed with respect to other environmental conditions and/or other sensed data. For example, deflection of a particular portion of an airfoil component might be compared with deflection of a different portion of the airfoil component, which in turn might be analyzed with respect to then-current temperatures, and/or then-current tire pressure, and/or any other sensed aspects of the vehicle or its environment.

Figure 2D:
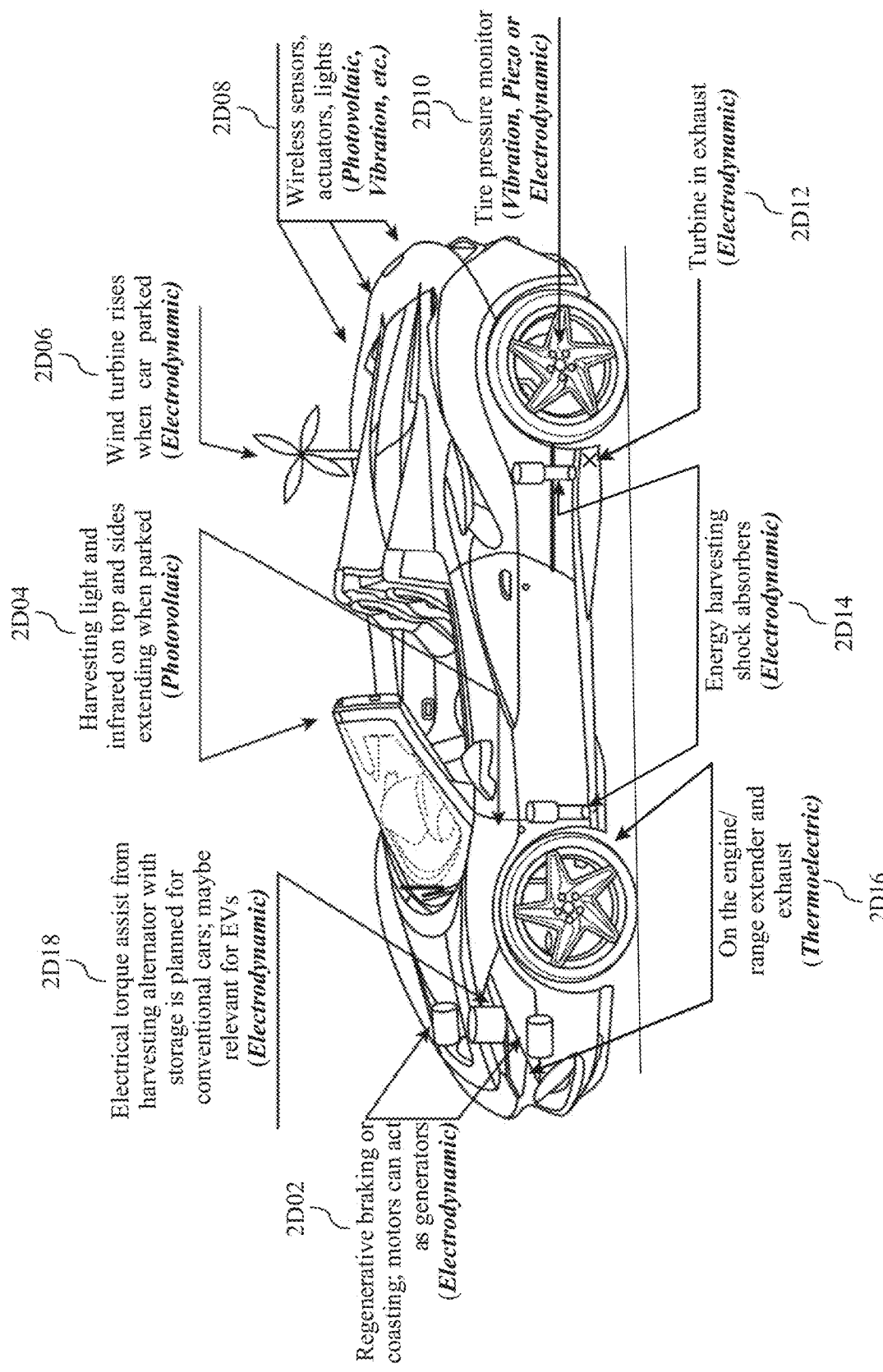
FIG. 2D illustrates various electric current generation systems capable of integrating with the surface sensors deployments shown in FIG. 2C, according to some implementations.

FIG. 2D illustrates various electric current generation systems capable of integrating with the surface sensors deployments shown in FIG. 2C, according to some implementations. Any one or more of the shown electrodynamic, photovoltaic, piezoelectric, and/or vibratory electric current generation systems including regenerative braking systems 2D02, electrodynamic systems 2D18, photovoltaic systems 2D04, wind turbine systems 2D06, photovoltaic and/or vibratory cells 2D08, piezoelectric tire pressure monitors 2D10, exhaust-based turbines 2D12, energy-harvesting shock absorbers 2D14 and/or supplementary power devices 2D16 can supplement triboelectric energy generators incorporated within the plies of a tire body as discussed in FIG. 2C and elsewhere.

The regenerative braking systems 2D02 can absorb, retain, and transform captured heat energy generated upon compression of brake pads of shoes against rotating brake rotors to useful electric current to power resonators. And, such power can be re-applied or otherwise re-used to provide a torque boost to enhance immediate off-the-line acceleration for conventional internal combustion engine powered, or battery-powered, vehicles. Incident light (from being parked in sunshine outside, for example) can be harvested by the photovoltaic systems 2D04, while wind turbine systems can 2D06 can further capture, retain, and reapply energy.

Likewise, incident vibratory energy (such as that due to a truck driving by near a parked car so-equipped with the disclosed systems of FIG. 2D) can be captured by vibratory cells 2D08, and energy due to vibrations encountered while driving over uneven road surfaces can be captured by the piezoelectric tire pressure monitors 2D10. The exhaust-based turbines 2D12 can capture and re-supply exhaust gases (like a turbocharger in an internal combustion engine) to generate usable electric power. Energy-harvesting shock absorbers 2D14 can absorb impact to retain that mechanical energy and transform it to useful electric current to supply the supplementary power devices 2D16 to extend the usable range of hybrid or electric-only vehicles. Potential supplementary power sources and systems are too numerous and widespread to be listed specifically herein, thus those skilled in the art will appreciate that the disclosed systems (and tribological energy generators) can function with any available power capture and re-use system.

Functionality related to energy recycling can be incorporated in different classes of vehicles. Energy sources can be provided as a function of required electric power magnitude, such as where vibratory energy-capture devices can retain approximately 800 µW per cm$^3$ machine induced vibration. Alternatively, or in addition, approximately 800 µW per cm$^3$ can be captured from humans acting as charge-carrying devices (such as capacitors). Light (photovoltaic) and heat (thermoelectric) energy capture and recycle devices suitable for incorporation with any of the disclosed systems can retain and re-use approximately 0.1-100 mW/cm$^2$ (for photovoltaic devices) and 60 µW/cm$^2$ at a temperature gradient of approximately 5° C. Ambient electromagnetic (EM) radiation radio frequency (RF) can impart approximately 0.26 µW/cm$^2$ at 1 V/m field strength, and so on and so forth.

FIG. 2E illustrates a table 2E00 for various numerical values relating to energy harvesting for vehicles. Possible scenarios relating to the increase in energy harvesting are shown regarding the number of electric vehicles (EVs) sold (such as heavy industrial, etc.) and the percentage using energy harvesting to charge traction batteries in, for example, year 2011 compared to (projected) year 2021.

FIG. 2F illustrates a table 2F00 for various properties relating to energy harvesting for vehicles. Examples of energy harvesting technologies and their applicability to electric vehicles, land, water and air are shown for each of the following electric power ranges: (1) microwatts to milliwatts; (2) milliwatts to watts; and, (3) watts to tens of kilowatts, all per vehicle. Aforementioned power regeneration systems are organized by potential power regeneration and delivery capabilities (such as microwatts to milliwatts and increasing).

Figure 2G:
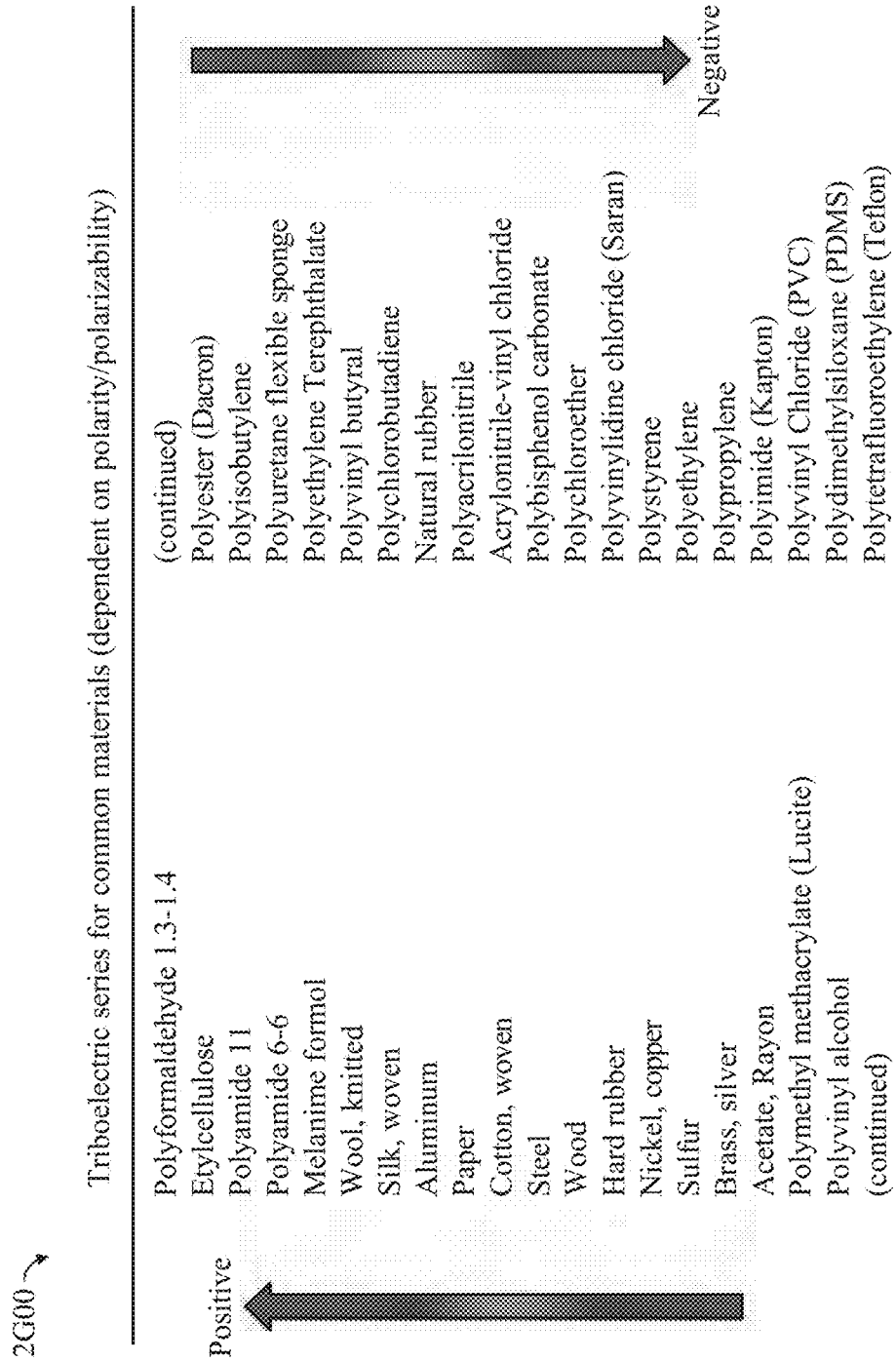
FIG. 2G illustrates a collection of common materials used in a triboelectric series organizes as dependent on polarity and/or polarizability, according to some implementations.

FIG. 2G illustrates a collection 2G00 of common materials used in a triboelectric series organizes as dependent on polarity and/or polarizability, according to some implementations. Example materials noted for demonstrated positive polarity and/or polarizability include polyformaldehyde 1.3-1.4, etc., whereas example materials noted for demonstrated negative polarity and/or polarizability include polytetrafluoroethylene (Teflon), etc. Those skilled in the art will appreciate that other possible example materials may exist regarding triboelectric energy generation potential without departing from the scope and spirit of that shown in FIG. 2G and elsewhere.

Figure 2H:
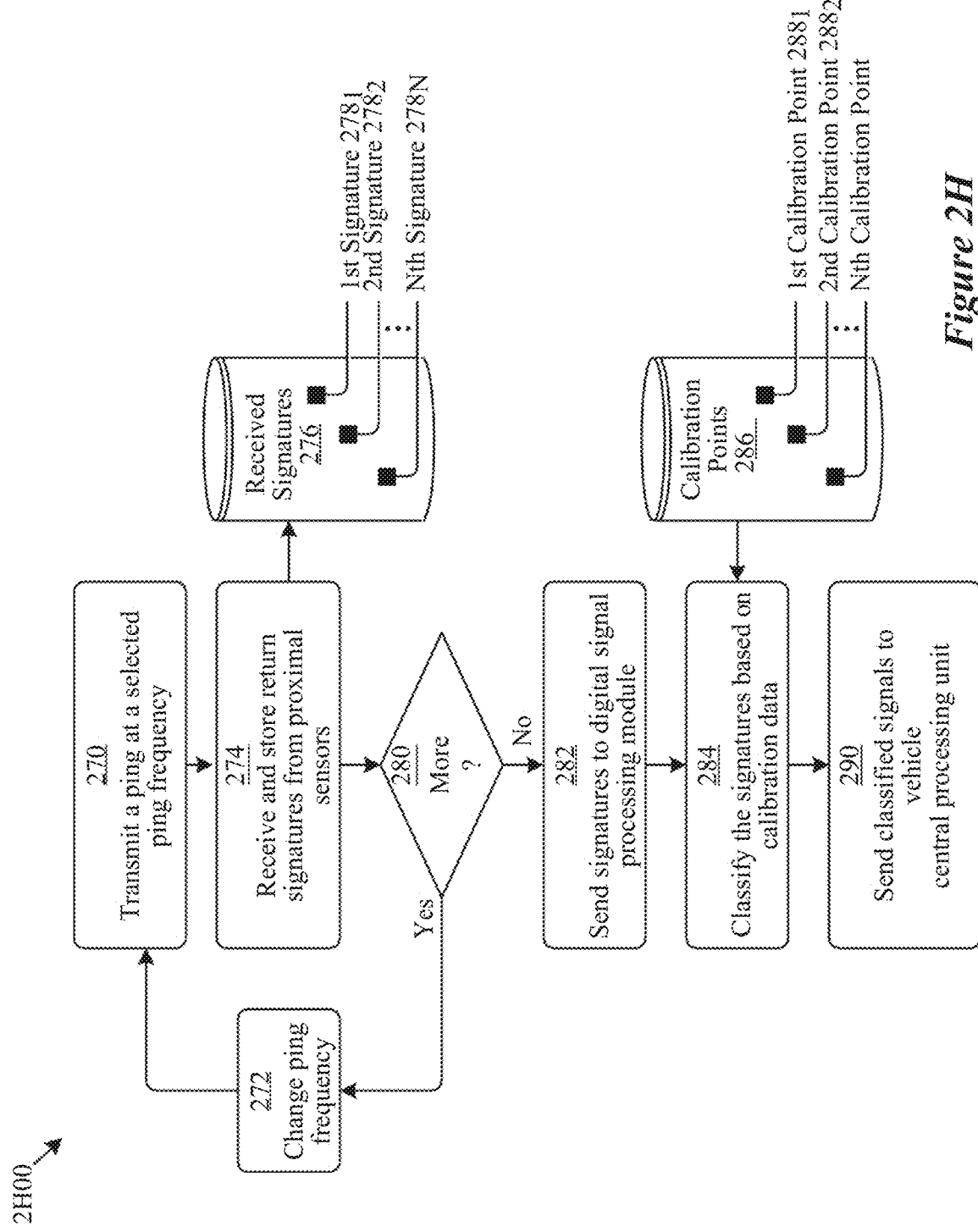
FIG. 2H illustrates a signature classification system that processes signals received from sensors formed of tuned carbon-containing RF resonance materials, according to some implementations.

FIG. 2H illustrates a signature classification system 2H00 that processes signals received from sensors formed of carbon-containing tuned resonance materials. The signature classification system 2H00 can be implemented in any physical environment or weather condition. FIG. 2H relates to incorporating tuned resonance sensing materials into automotive components for classifying signals (such as, signatures) detected by, classified and/or received from sensors installed in vehicles. A ping signal of a selected ping frequency is transmitted at operation 270. The ping signal generation mechanism and the ping transmission mechanism can be performed by any known techniques. For example, a transmitter module can generate a selected frequency of 3 GHz, and radiate that signal using an antenna or multiple antennae. The design and location of the tuned antenna (such as mounted on and/or within any one or more of the wheel wells or a vehicle) can correspond to any tuned antenna geometry, material and/or location such that the strength of the ping is sufficient to induce (RF) resonance in proximate sensors. Several tuned antennae are disposed upon or within structural members that are in proximity to corresponding sensors. As such, when a proximal surface sensor is stimulated by a ping, it resonates back with a signature. That signature can be received (operation 274) and stored in a dataset comprising received signatures 276. A sequence of transmission of a ping, followed by reception of a signature, can be repeated in a loop.

The ping frequency can be changed (operation 272) in iterative passes through the loop. Accordingly, as operation 274 is performed in the loop, operation 274 can store signatures 278, including a first signature $278_1$, a second signature $278_2$, up to an Nth signature $278_N$. The number of iterations can be controlled by decision 280. When the "No" branch of operation 280 is taken (such as, when there are no further additional pings to transmit), then the received signatures can be provided (operation 282) to a digital signal processing module (such as, an instance of signature analysis module 154 shown in FIG. 1B). The digital signal processing module classifies the signatures (operation 284) against a set of calibration points 286. The calibrations points can be configured to correspond to particular ping frequencies. For example, calibration points 288 can include a first calibration point $288_1$ that can correspond to a first ping and first returned signature near 3 GHz, a second calibration point $288_2$ that can correspond to a second ping and second returned signature near 2 GHz, and so on for any integer value "N" calibration points.

At operation 290, classified signals are sent to a vehicle central processing unit (such as, the vehicle central processing unit 116 of FIG. 1B). T The classified signals can be relayed by the vehicle central processing unit to an upstream repository that hosts a computerized database configured to host and/or run machine learning algorithms. Accordingly, a vast amount of stimulus related to signals, classified signals, and signal responses can be captured for subsequent data aggregation and processing. The database can be computationally prepared, referring to as being "trained", provided a given set of sensed measurements that can be correlated to conditions or diagnoses related to vehicular performance, such as tire degradation due to repeated use. Should, during the operation of the vehicle, the measured deflection (such as, air pressure) of a particular portion of an airfoil component differ from the measured deflection (such as, air pressure) of a different portion of the airfoil component, a potential diagnosis may be that one tire is underinflated and therefore causing vehicle ride height to be non-uniform, resulting in airflow over, on, and/or around the vehicle to demonstrate proportionate non-uniformities, as detected by deflection on the airfoil component. Other potential conditions or diagnoses can be determined by the machine learning system as well. The conditions and/or diagnoses and/or supporting data can be returned to the vehicle to complete a feedback loop. Instrumentation in the vehicle provides visualizations that can be acted upon (such as, by a driver or by an engineer).

Figure 3A:
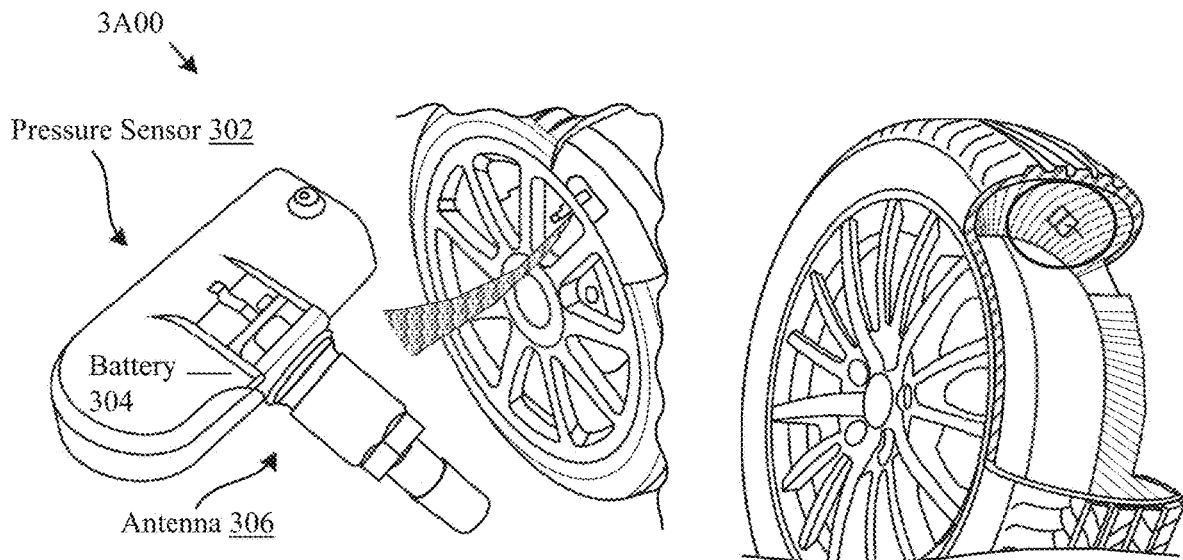
FIG. 3A depicts a prior art pressure-based battery-powered tire condition sensor, such as that which may be a part of (or otherwise associated with) a tire pressure monitoring system (TPMS), according to some implementations.

FIG. 3A depicts a (prior art) battery-powered tire condition sensor 3A00. As shown, the prior art technique can rely on battery-powered electronics (such as, a pressure sensor 302, a battery 304, and an antenna 306), any one or more of which are located inside the inflated tire to send signals to a receiver outside the inflated tire. This can encounter various challenges, including: (1) the battery-powered electronics may not survive in punishing environments (exterior to the vehicle); and, (2) the battery-powered electronics are inaccessible during the lifetime of the inflated tire.

A superior technique can involve the embedding of passive (referring to generally non-battery powered) sensors or sensing materials into the tire material itself (such as on, in-between, or within individual tire plies, or the tire carcass, etc.). Mechanisms for tire sensing, including inside the tire sensing as well as outside the tire environmental sensing, are shown and described in further detail as follows.

Figure 3B:
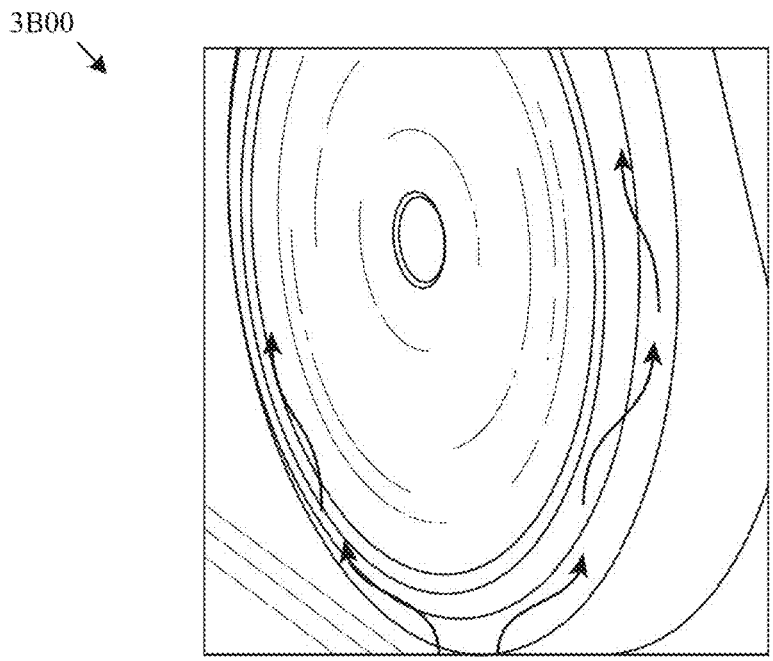
FIG. 3B depicts operation of a vehicle tire equipped with sensors having tuned carbon-containing RF resonance materials embedded in tire plies, according to some implementations.

FIG. 3B depicts operation of tire condition sensors 3B00 embedded in tires as (or at least partially within) one or more discrete (but interconnected or contacting) layers of carbon-containing tuned resonance materials. Tire condition sensors 3B00 may be implemented in any environment. No battery-powered electronics are installed inside the tire, rather the one or more various tire tread layers and/or tire body plies of the tire can be composed of (and/or otherwise include sensors made from) carbon-containing tuned resonance materials, each of which prepared to resonate at an ascertainable frequency distinct from the other tread layer and/or ply.

Figure 3C:
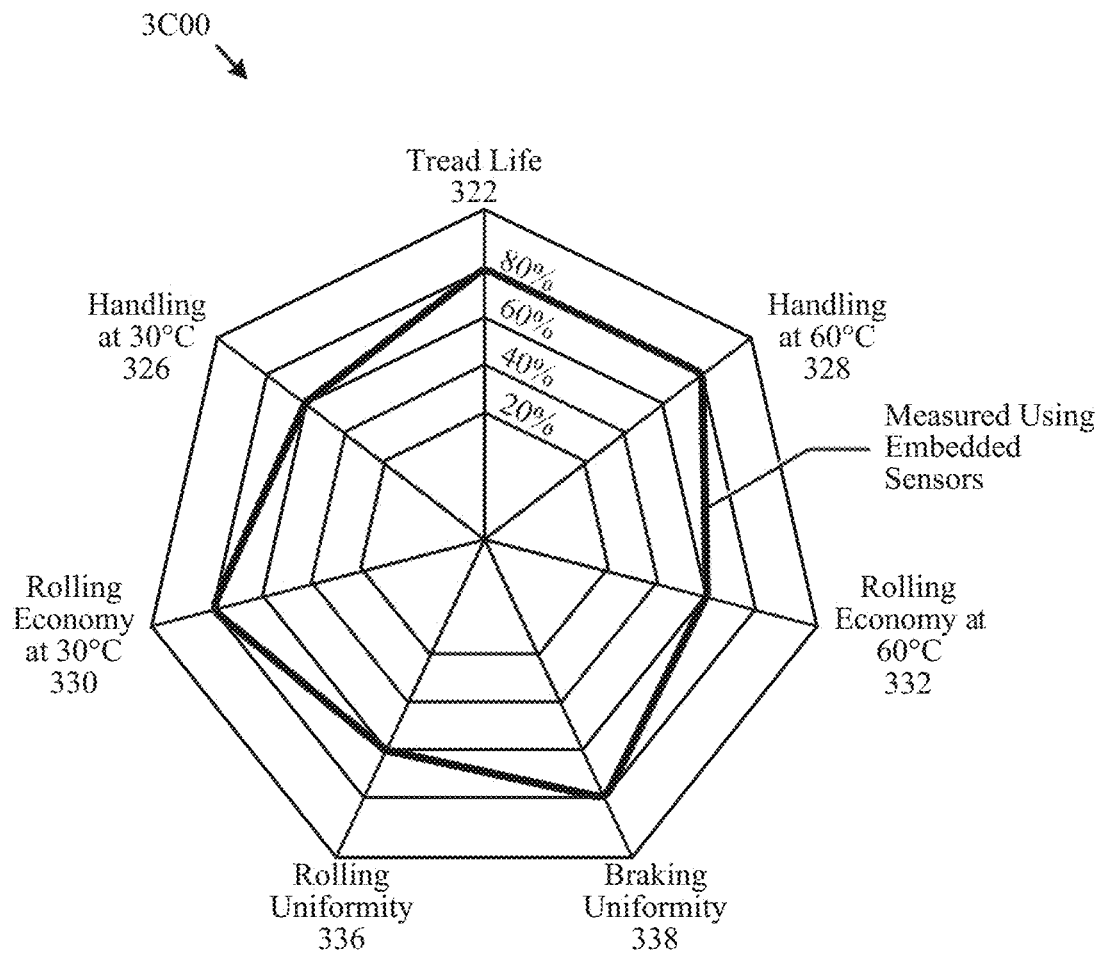
FIG. 3C depicts a series of tire condition parameters that are sensed from changes in RF resonance of various layers of carbon-containing tuned RF resonance materials, according to some implementations.

FIG. 3C illustrates various physical characteristics or aspects (tire condition parameters 3C00) pertaining to incorporating tuned resonance sensing materials into automotive components (such as tires). Here, the figure is presented with respect to addressing deployment of survivable sensors in tires, including non-pneumatic tires as well as pneumatic tires. The construction of the tires may correspond to radial tires, bias ply tires, tubeless tires, solid tires, run-flat tires, etc. Tires may be used in any sorts of vehicles and/or equipment and/or accessories pertaining to vehicles. Such vehicles may include aircraft, all-terrain vehicles, automobiles, construction equipment, dump trucks, earthmovers, farm equipment, forklifts, golf carts, harvesters, lift trucks, mopeds, motorcycles, off-road vehicles, racing vehicles, riding lawn mowers, tractors, trailers, trucks, wheelchairs, etc. The tires may, in addition or alternative to that presented, be used in non-motorized vehicles, equipment and accessories such as bicycles, tricycles, unicycles, lawnmowers, wheelchairs, carts, etc.

The parameters shown in FIG. 3C are as an example, and other variants may exist or otherwise be prepared to target specific desirable performance characteristics of many conceivable end-use scenarios, including truck tires designed to offer increased longevity (at the potential expense of road adhesion), or soft racing tires designed to provide maximum road adhesion (at the potential expense of lifespan).

Various carbon structures are used in different formulations with other non-carbon materials integrated into tires, which then undergo mechanical analysis to determine their respective characteristics of the tires. Some of these characteristics can be determined empirically by direct testing, while other characteristics are determined based on measurements and data extrapolation. For example, rolling uniformity can be determined by sensing changes in force when the tire is subjected to rolling over a uniform surface such as a roller, whereas tread life is based on an abrasion test over a short period, the results of which short term test are extrapolated to yield a predicted tread life value.

More tire characteristics can be measured, but some of these measurement techniques can be physically destructive to the tire, and thus measured at a desired point in the life of the tire. In contrast, using survivable sensors embedded in tires allows for such otherwise destructive measurements to be made throughout the entire lifetime of the tire. For example, detection of response signals based on RF signals pinged against sensors e embedded in tires can be used for such sensing. Moreover, each body ply and/or tread layer of a tire can, as discuss, include durable (also referred to as "survivable") sensors that are tuned to resonate at a particular frequency.

Ply used in a tire can be formulated to combine carbon-containing structures with other materials to achieve a particular material composition that exhibits desired performance (such as handling and longevity) characteristics. The natural resonance frequency (or frequencies) of the particular material composition can be subjected to spectral analysis to develop a spectral profile for the particular material composition. This spectral profile can be used as a calibration baseline for that material. When the body ply and/or tread layer of the tire undergoes deformation, the spectral profile changes, which spectral profile changes can be used as additional calibration points. Many such calibration points can be generated by testing, and such calibration points can in turn be used to gauge deformation.

Analysis of the spectral response results in quantitative measurements of many tire parameters. The tire parameters that can be determined from signature analysis, for example, can include tread life 322, handling at a first temperature 328, handling at a second temperature 326, rolling economy at a first temperature 330, rolling economy at a second temperature 332, rolling uniformity 336, and braking uniformity 338.

Responses, such as those spectrally represented based on return ping signals received from sensors embedded in materials in tire ply, can be representative of the deformation observed. That is, a certain type of tire deformation will correspond with a certain type of specific response, such that a mapping between responses or response types can be done to degradation types. Moreover, time-variant changes in the spectral response of a tire as it undergoes in-situ deformation can be used to determine many ambient conditions, some of which ambient conditions are discussed as pertains to FIG. 3E. In tires that are constructed using multiple ply, each body ply and/or tread layer can be formulated to exhibit a particular tuned frequency or range of frequencies. For example, FIG. 3D shows a schematic diagram for constructing a tire from multiple ply, each of which has as different a particular tuned frequency or range of frequencies.

Figure 3D:
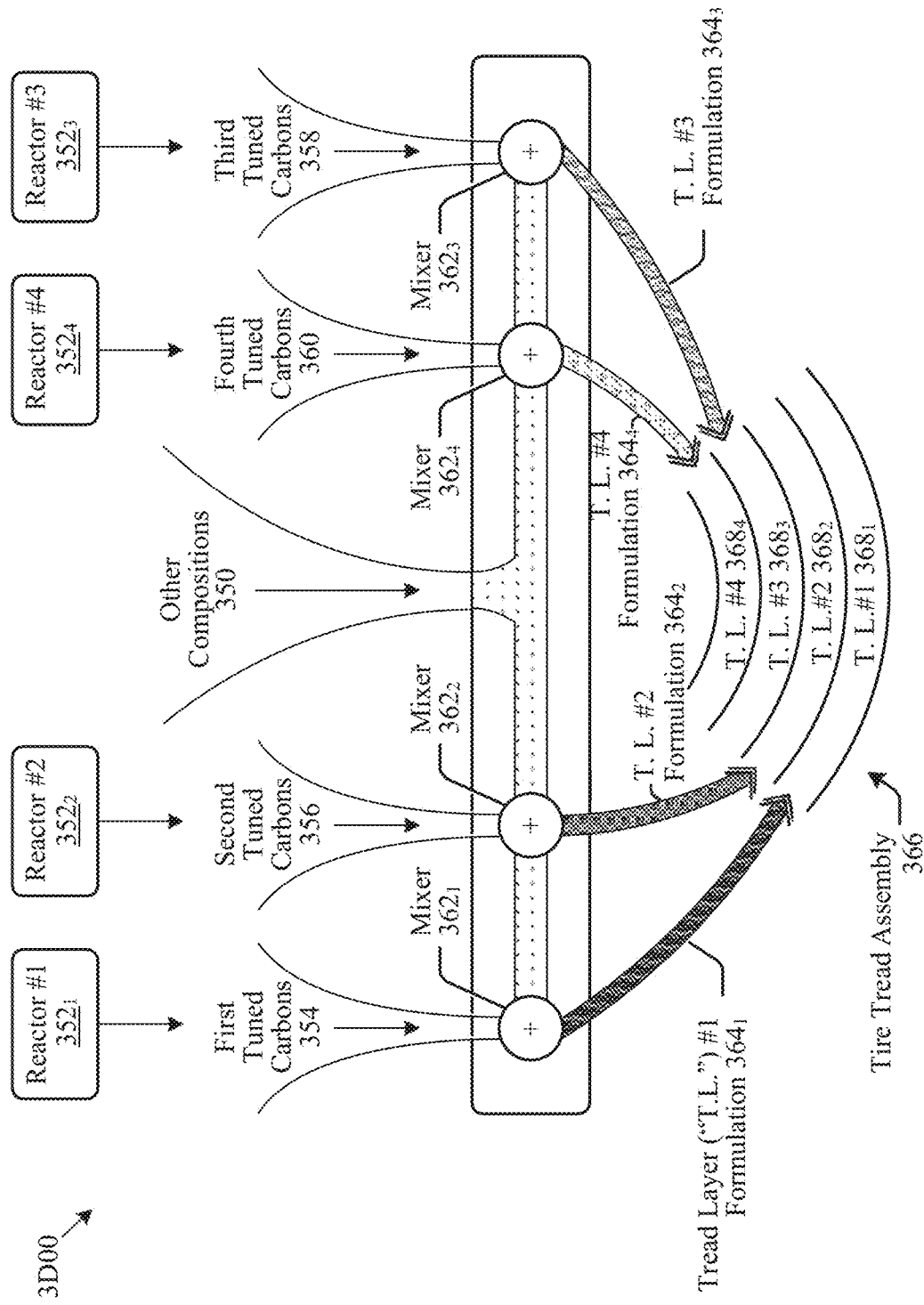
FIG. 3D depicts a manufacturing technique for tuning multiple plies of a tire by selecting carbon-containing tuned RF resonance materials from separate and independent reactors for incorporation into the body of a single tire assembly, according to some implementations.

FIG. 3D depicts a schematic diagram 3D00 for fine-adjustment, or tuning, of multiple body plies and/or tread layers of a tire by selecting carbon-containing tuned resonance materials for incorporation into a tire assembly or structure, which can be implemented in any environment.

FIG. 3D illustrates how to mix different carbons into tire composite formulations that are in turn assembled into a multi-ply tire. The resulting multi-ply tire exhibits the various resonance-sensitive and frequency-shifting characteristics.

Multiple reactors (such as, reactor $352_1$, reactor $352_2$, reactor $352_3$, and reactor $352_4$) each produce (or otherwise transport or provide) a particular carbon additive/filler to the network that is tuned to yield a particular defined spectral profile. The carbon additives (such as, first tuned carbons 354, second tuned carbons 356, third tuned carbons 358, and fourth tuned carbons 360) can mixed with other (carbon-based or non-carbon based) compositions 350. Any known techniques can be used to mix, heat, pre-process, post-process or otherwise combine the particular carbon additives with the other compositions. Mixers (such as, mixer $362_1$, mixer $362_2$, mixer $362_3$, and mixer $362_4$) are presented to show how different tuned carbons can be introduced into various components of a tire. Other techniques for tire assembly may involve other construction techniques and/or other components that comprise the tire. Any known techniques for multi-ply tires can be used. Moreover, the spectral profile of a particular body ply and/or tread layer (such as a group of body plies and/or tread layers 368, including a body ply and/or tread layer $368_1$, a body ply and/or tread layer $368_2$, a body ply and/or tread layer $368_3$, and a body ply and/or tread layer $368_4$) can be determined based on the characterization of a particular body ply and/or tread layer formulation. For example, based on a stimulus and response characterization, a first body ply and/or tread layer formulation (such as, body ply and/or tread layer formulation $364_1$) might exhibit a first spectral profile, whereas a second body ply and/or tread layer formulation (such as, body ply and/or tread layer formulation $364_2$) might exhibit a second spectral profile.

The resulting different formulations (such as, body ply and/or tread layer formulation $364_1$, body ply and/or tread layer formulation $364_2$, body ply and/or tread layer formulation $364_3$, and body ply and/or tread layer formulation $364_4$), each of which body ply and/or tread layer exhibits a corresponding spectra profile, are used in the different body ply and/or tread layer that are formed into a tire assembly 366.

Figure 3E:
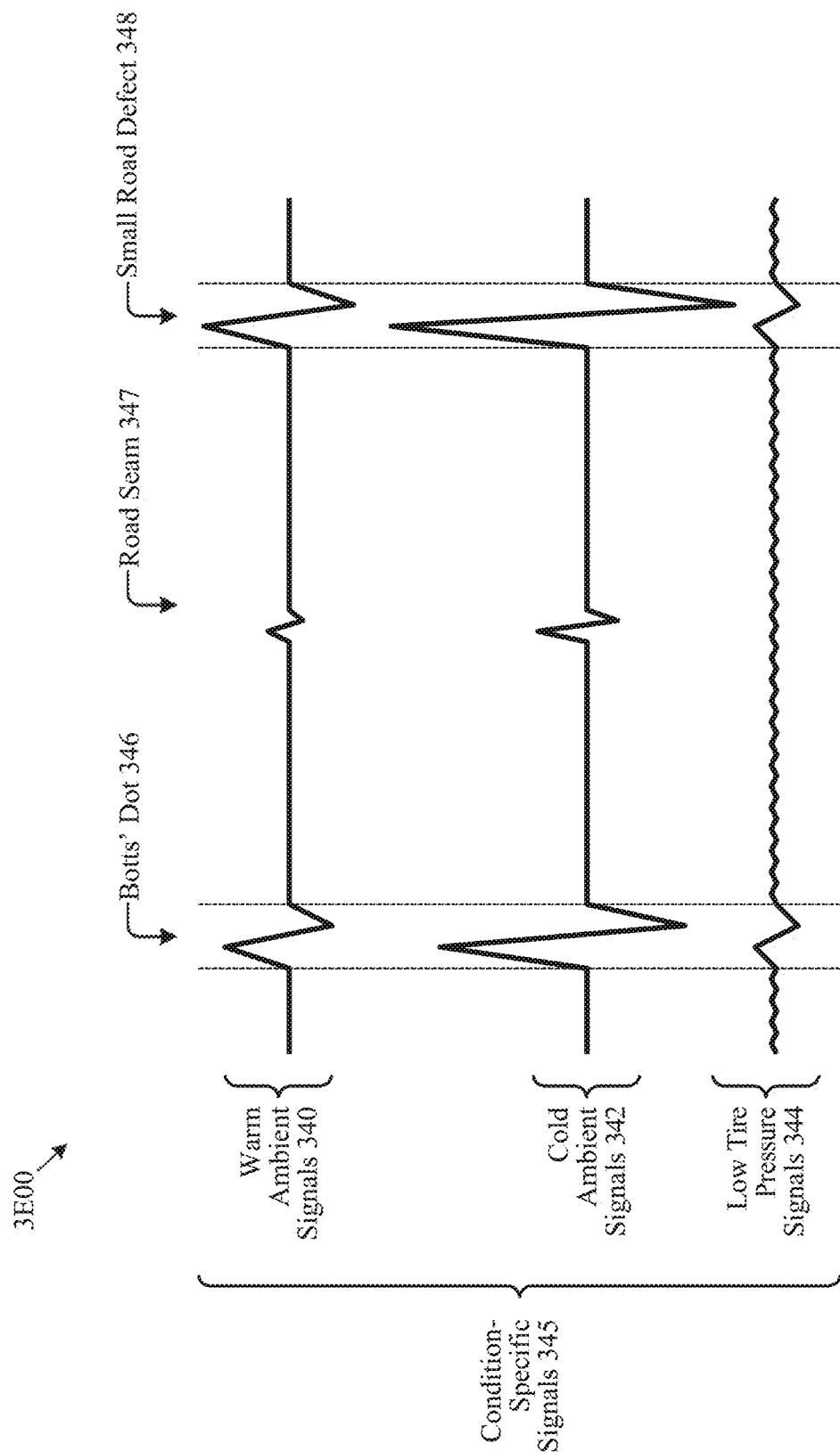
FIG. 3E depicts a first set of example condition signatures that are emitted from tires formed of layers of tuned carbon-containing RF resonance materials, according to some implementations.

FIG. 3E depicts a first set of example condition signatures 3E00 that are emitted from tires (exposed to any environment) formed of layers of carbon-containing tuned resonance materials. Several dynamic mechanical analysis tire parameters are shown that can be gauged based on operation. A given tire or tires can be installed on one or more wheels of a vehicle, then driven on by the vehicle in any environment. When the tire undergoes RF signal stimulation while also concurrently deforming due to use (such as, deformation of one or more body ply and/or tread layer of the tire), carbon-containing tuned resonance materials that form sensor layers within the tire can emit a signature in response to the stimulation which can be representative of the tire's contemporaneous deformation.

The figure depicts merely some examples of deformations of one or more body ply and/or tread layer of the tire as it is operated under various conditions. Operation of the tire under various conditions result in different sets of signals (such as, condition-specific signals 345) being emitted by the various body ply and/or tread layer of the tire in response to stimulation while such conditions are present. As shown, the tire can be operated in warm ambient conditions, during which operation the signals being emitted by the various body ply and/or tread layer of the tire in response to the stimulation are regarded as warm ambient signals 340. Also as shown, the tire can be operated in cold ambient conditions, during which operation the signals being emitted by the various body ply and/or tread layer of the tire in response to the stimulation are regarded as cold ambient signals 342. Furthermore, the tire can be operated under conditions of low tire inflation, during which operation the signals being emitted by the various body ply and/or tread layer of the tire in response to stimulation are regarded as low tire pressure signals 344.

Signal processing, (such as, such as may be carried out by an instance of the aforementioned signature analysis module 154 of FIG. 1B) classifies the condition-specific signals 345 against a set of calibration points that correspond to various environmental conditions. The calibrations points might correspond to a particular ping frequency, and/or the calibrations points might correspond to a particular set of ping frequencies. The temporal characteristics of the pinging may be different so as to detect different in-situ conditions. For example, when a vehicle is operated over Botts' dots (referring to round non-reflective raised pavement markers usually made with plastic, ceramic, thermoplastic paint, glass or occasionally metal), the tire or tires of the vehicle can undergo periodic deformation, which period is dependent on the speed of the vehicle and the distance between a first Botts' dot 346 and a next Botts' dot. As shown, the deformation may be different based various conditions (such as, warm ambient conditions, cold ambient conditions, conditions of low tire pressure, etc.). Moreover, the different deformations may be caused by specific road conditions such as a road seam 347 or a small road defect 348. Any of the foregoing condition-specific signals and/or any road conditions can be detected based on signals being returned in response to a ping or other stimulation. The foregoing discussion of FIG. 3E includes processing of a first set of example condition signatures. Additional sets of condition signatures are discussed in further detail as follows.

FIG. 3F1 shows a second set of example condition signatures 3F100 that are emitted from tires formed of layers of carbon-containing tuned resonance materials. The example condition signatures 3F100 or any aspect thereof may be emitted in any environment. FIG. 3F1 illustrates multiple body ply and/or tread layer (such as, body ply and/or tread layer #1, body ply and/or tread layer #2, and body ply and/or tread layer #3) of a new tire. The term "ply", as used in this example and elsewhere with reference to any one or more of the presented implementations, can refer to a ply or layer within a body of the tire, or—alternatively—a layer of the tire tread protruding radially outward away from the body of the tire intended for contact with hard pavement, or the earth for off-road tires). In example, the first body ply and/or tread layer is formulated (referring to being created with a specific formula) with tuned carbons such that the first body ply and/or tread layer resonates at 1.0 GHz when stimulated with a 1.0 GHz ping stimulus (such as, first ping 374). Similarly, the second body ply and/or tread layer is formulated with tuned carbons such that the second body ply and/or tread layer resonates at 2.0 GHz when stimulated with a 2.0 GHz ping stimulus (such as, second ping 376). Further, the third body ply and/or tread layer is formulated with tuned carbons such that the third body ply and/or tread layer resonates at 3.0 GHz when stimulated with a 3.0 GHz ping stimulus (such as, third ping 378). As shown by first response 382, second response 384, and third response 386, all three-body ply and/or tread layer are responsive at their respective tuned frequencies.

A transceiver antenna can be positioned in and/or on the wheel well of the corresponding tire. Systems handling any such generated response signals can be configured to distinguish from other potential responses arising from the other surfaces, such as the remaining non-target tires of the vehicle, for example. For example, even though the right front tire mounted on the right front wheel of the vehicle might respond to a ping that is emitted from a transceiver antenna located in the left front wheel well of the vehicle, the response signal from the right front tire will be significantly attenuated (and recognized as such) as compared to the response signals from the left front tire of the vehicle.

When the transceiver antenna is located in the wheel well of a corresponding tire, the response from the corresponding tire will be attenuated with respect to the ping stimulus. For example, the response from the corresponding tire can be attenuated with respect to the ping stimulus by 9 decibels (−9 dB) or more, or can be attenuated with respect to the ping stimulus by 18 decibels (−18 dB) or more, or can be attenuated with respect to the ping stimulus by 36 decibels (−36 dB) or more, or can be attenuated with respect to the ping stimulus by 72 decibels (−72 dB) or more. In some cases, a ping signal generator is designed to be combined with a transceiver antenna located in the wheel well so as to cause the ping response of a corresponding tire to be attenuated by not more than 75 dB (−75 dB).

FIG. 3F2 depicts a third set of example condition signatures 3F200 that are emitted from tires after wear-down of some of the carbon-containing tuned resonance materials. As an option, one or more variations of example condition signatures 3F200 or any aspect thereof may be implemented in the context of the architecture and functionality of the implementations described herein. The example condition signatures 3F200 or any aspect thereof may be emitted in any environment.

In this example, the tire has undergone wear. More specifically, the outermost body ply and/or tread layer has been worn away completely. As such, a ping stimulus at 1.0 GHz would not result in a response from the outermost ply. This is shown in the chart as a first response attenuation 387. As the tire continues to undergo tread wear, ping responses from the next body ply and/or tread layer and ping responses from the next successive body ply and/or tread layer and so on will be attenuated, which attenuation can be used to measure total tread wear of the tire. As an alternative, the same tuned carbons can be used in all ply. The tread wear of the tire as well as other indications can be determined based on the returned signal signatures from the tire.

FIG. 3F3 depicts a graph of measured resonant signature signal intensity (in decibels, db) against height (in millimeters, mm) of tire tread layer loss, according to some implementations. As shown here, carbon-containing microstructures and/or microstructural materials can be incorporated into sensors or, in some configurations, entire layers of one or more tire treads at a given concentration level, or multiple dissimilar concentration levels (in each of the one or more tire tread layers) to achieve the unique deterioration profile shown. That is, the measure resonant signature (referring to the identifying "signature" of a particular tire tread layer in question) can be 'pinged', as so described herein, by one or more RF signals to demonstrate the attenuation of that emitted signal as shown.

A new tire tread layer can be configured to indicate a signal intensity (measured in decibels, db) of approximately 0. That intensity can change proportionate to the extent of deterioration of that tire tread layer. For instance, a 2 mm height loss of a tire tread layer, presumably the tire tread layer in contact with pavement, can correspond with the measure resonant signature signal intensity profile shown. A 'ping' signal at 6.7 GHz can be measured at an intensity level of about 9 db, or so, and so and so forth.

Accordingly, unique concentration levels, chemistries, dispersions, distributions and/or the like of the carbon-containing microstructures can be embedded (or, in some cases, placed on one or more surfaces of) tire tread layers to achieve a unique and readily identifiable measured resonant signature signal intensity as shown. A user of such a system can therefore immediately be notified to the exact extent and location of tire tread wear as it occurs during driving, rather than being restricted to observe the tires while the vehicle is in a stationary condition, a process that can be both time-consuming and cumbersome.

FIGS. 3G1 and 3G2 depict schematics of example conventional carbon material production chains such as those described by Anzelmo, et al., in U.S. Pat. No. 10,428,197 entitled "Carbon and Elastomer Integration" issued on Oct. 1, 2019, incorporated herein by reference in its entirety. FIG. 3G1 shows a schematic of an example conventional carbon material production chain 3G100, in comparison to FIG. 3G2, which is an example of a carbon material production chain 3G200 used to produce the carbon-based microstructures described herein. In the conventional carbon material production chain 3G100, as illustrated in FIG. 3G1, raw materials such as carbon black 3G102, silica 3G104, and other chemicals 3G106 can be transported to entering a manufacturing facility 3G110, where they are formulated into an elastomer compound and then processed into a finished product, such as (rubber-based and pneumatic) tires 3G120.

A conventional tire supply can include the preparation of raw materials (such as rubber bales, carbon filler, textiles, steel and other additives), building the tire components (including extruding elastomer compounds for the tread and sidewalls), and then building the tire 3G120 (including curing the tire, and inspecting the finished tire). The carbon microstructure production, the mixing of the elastomer compounds, and optionally building the finished product (such as automobile tires), can be done on-site, as well as (optionally) the nano-mixing of materials as well.

In contrast to conventional carbon-inclusive tire production as presented by conventional carbon material production chain 3G100 in FIG. 3G1, hydrocarbons 3G202 and silica 3G204 are mixed (such as by being integrated together) on-site in a reactor 3G206 at a manufacturing facility 3G208, then integrated with elastomer raw materials (such as rubber) to produce an elastomer compound, prior to processing into a finished product, such as tires 3G208. The differentiation between FIGS. 3G1 and 3G2 shows potential benefits, including eliminating the need for transporting difficult to handle carbon black materials and reducing energy consumption by integrating materials together during the carbon production process.

Alternatively, the conventional supply chain shown in FIG. 3G1 can be used in conjunction with the present graphene-based carbon materials. The carbon materials can be produced at one site, and then the carbon materials and other component materials can be transported to a manufacturing facility where they are formulated into an elastomer compound and then processed into a finished product, such as tires.

Another benefit of using the present graphene-based carbon materials is the improved purity compared to carbon black. Impurities in carbon black (such as residual oil) require the carbon to be labeled as carcinogenic. Provided graphene-inclusive carbon-based microstructures have lower volatile organic compounds (VOCs) than carbon black, and therefore do not result in residual oil on the surface of the produced elastomer material. Alternatively, the carbon-based microstructures have a lower concentration of residual hydrocarbons (such as polycyclic aromatic hydrocarbons) compared to carbon black, resulting in less residual oil on the surface of the produced elastomer material. The carbon materials (inclusive of carbon-based microstructures) described herein also contain low concentrations of contaminants (such as ash, metals, and other elemental contaminants) compared to conventionally processed carbon black or graphene. Also, there can be minimal $CO_2$, $NO_x$, and $SO_x$, emissions as production by-products. All these benefits result in the present carbon materials being safer to handle and more environmentally friendly than the conventional carbon black that is used for elastomers.

The reduced concentration of impurities of the present carbon-based microstructures compared to carbon black is also a benefit for processing the carbon materials (such as carbon post-processes, and elastomer compounding). For example, conventional carbon black processing equipment can require specialized systems to process the toxic carbon black particles. In contrast, specialized systems are not needed to process the present non-toxic or low toxicity materials.

There are three properties that can affect the ability of a particular carbon material to reinforce elastomers: (1) surface area; (2) structure; and, (3) surface activity. Also, impurities, such as coke, ash and moisture can be important to the effectiveness of a carbon material filler in an elastomer. Surface area refers to the total area of the carbon material surface, including that which is available to interact with the elastomer. Particle size and shape can affect the surface area. Smaller carbon-based microstructures (such as less than 100 nm in average diameter) typically fuse together to form larger aggregates (such as 1-10 microns average diameter). Structure describes the shape of the aggregate. The structure can be affected by the number of particles fused together and the configuration of the particles within the aggregate. For example, aggregates with larger numbers of particles can have complex shapes with large void volumes created. The structure can affect the degree of mixing of the carbon and the polymer (such as voids can be filled with the polymer), which can affect the properties of the elastomer/carbon compound.

Also, surface activity, which refers to the strength of the surface interaction between the carbon filler material and the polymer, can impact the dispersion properties of the carbon materials within the elastomer. Compound mechanical properties such as tensile strength, tear strength, and abrasion resistance can be affected by surface area of the carbon filler material. Other compound mechanical properties such as viscosity, shrinkage, and modulus can be affected by the structure of the carbon filler material. Surface area also can affect some compound mechanical properties such as hysteresis. Structure can also affect flex fatigue and abrasion resistance in reinforced elastomeric compounds. Surface activity can affect compound mechanical properties as well, such as modulus, hysteresis, and abrasion resistance.

Properties and procedures related to waste energy harvesting and powering in vehicles, any one or more of which can influence carbon-inclusive material performance in the disclosed systems, can include powering resonators embedded within tire plies. For example, capabilities related to waste energy harvesting and powering in vehicles can include application spaces including at least the following: composites used in vehicles for harvesting energy from vehicular motion; vehicle tires for harvesting energy from vehicular motion; energy capture devices positioned in and around heat sources such as steam pipes or exhaust pipes; and, industrial uses for harvesting energy from equipment motion.

Thermoelectric power generation functionality can also be, in some implementations, at least partially integrated into tires for energy transfer to occur within a vehicle wheel well. Such energy transfer can include: a flow of charge carriers between the hot and the cold regions (of the tire) to create a voltage difference, therefore allowing thermoelectric generators (TEGs) to still function in the dark, TEGs also have no moving parts, which allows for continuous operation; TEGs can be placed as layers in tire treads, carbons tuned for conductivity and doped N/P can produce significant power from waste heat >10 mw/cm², where even small temperature changes (such as $\Delta 10°$ C.) can yield approximately 3.5 W+to provide usable harvested power.

Figure 4A:
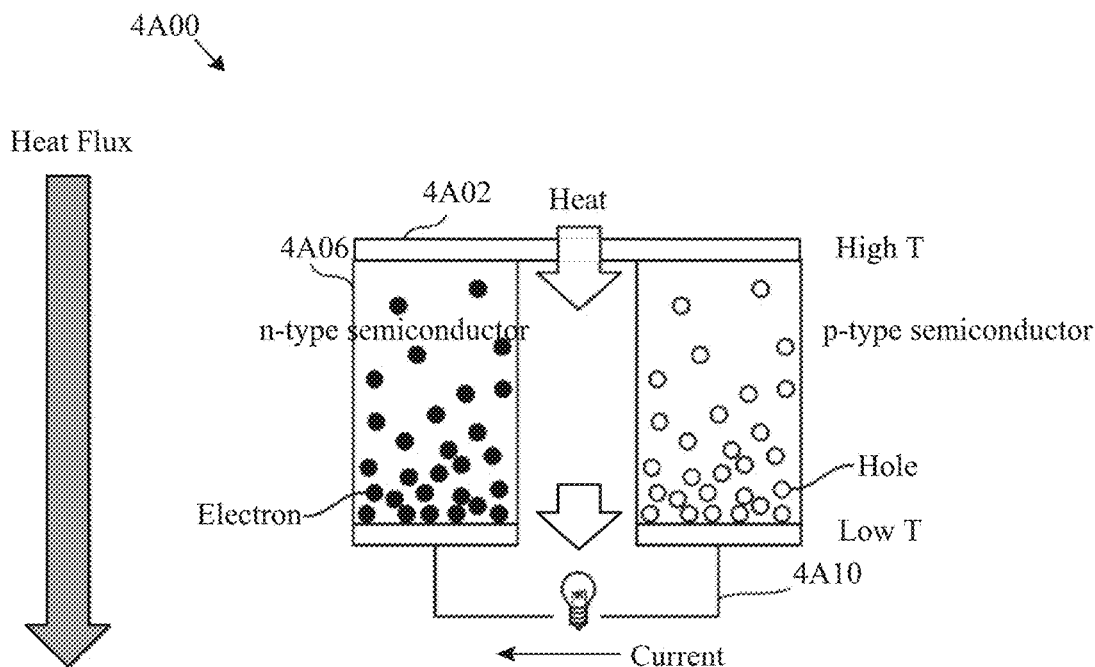
FIG. 4A illustrates a schematic diagram representative of a flow (within semiconducting materials) of charge carriers between hot and cold regions to create a voltage difference to allow thermo-electric generators (TEGs) to operate in low or no light conditions, according to some implementations.

FIG. 4A illustrates a schematic diagram representative of a flow (within semiconducting materials incorporated within materials of vehicle components) of charge carriers between hot and cold regions to create a voltage difference to allow thermo-electric generators (TEGs) to operate in low or no light conditions. Semiconductor 4A00 can be incorporated within plies of the body of a vehicle tire to capture heat transfer from a high temperature region including locations 4A02 and 4A04 through n-type and/or p-type semiconducting materials 4A06 to provide electric current through circuit 5B10 to power, for example, any of the disclose resonators.

Figure 4B:
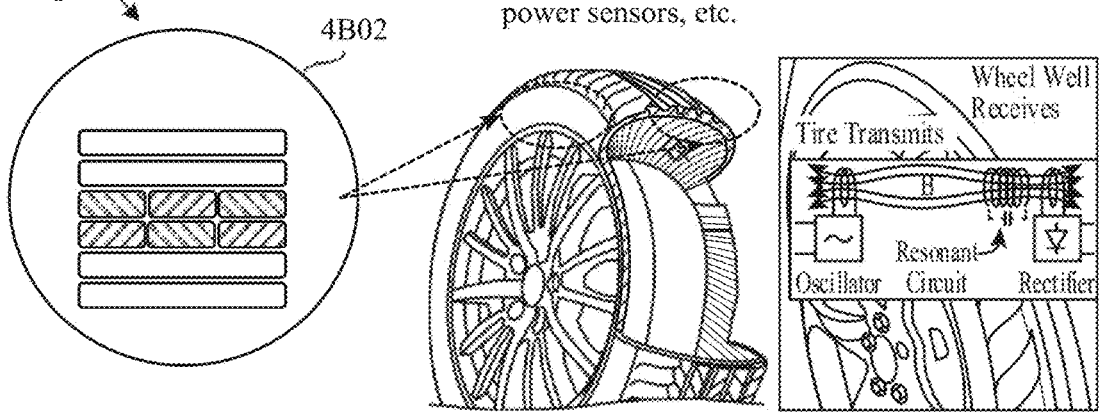
FIG. 4B illustrates carbon-based materials incorporated into plies within the body or treads of a tire tuned for electric conductivity and/or doped to produce power from waste heat, according to some implementations.

FIG. 4B illustrates carbon-based materials incorporated into plies within the body or treads of a tire tuned for electric conductivity and/or doped to produce power from waste heat. Layered positive-negative (PN) junction semiconducting materials segmented for voltage 4B02 can be incorporated within walls of the body of a tire, or treads extending therefrom, and thus provide electric current to power the resonator as so described, which may include components such as an oscillator, resonant circuit, and rectifier, all operating in substantially conventional formats.

Figure 4C:
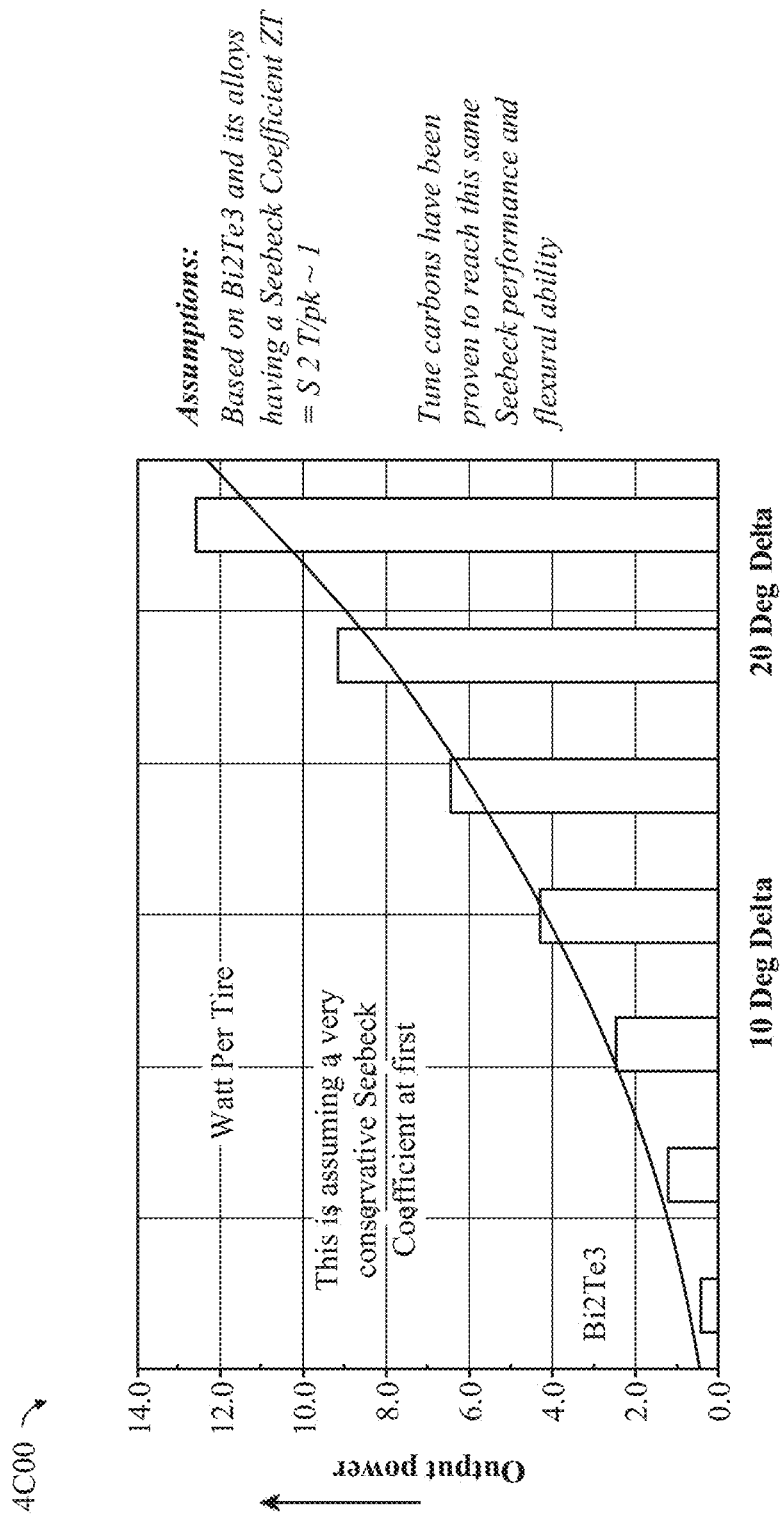
FIG. 4C illustrates a chart for comparing output power against a magnitude of heat flux (delta of degrees Celsius) related to thermoelectric generation functionality integrated into tires, according to some implementations.

FIG. 4C illustrates a chart 5D00 for comparing output power against a magnitude of heat flux (delta of degrees Celsius) related to thermoelectric generation functionality integrated into tires. Assumptions include that TEG devices include bismuth telluride ($Bi_2Te_3$) having a Seebeck coefficient (referring to a measure of the magnitude of an induced thermoelectric voltage in response to a temperature difference across that material) such as approximately −287 μV/K at 54° C. and/or demonstrating the relationship ZT=S 2 T/ρκ~1. Carbon-based microstructures can be tuned and incorporated within TEG devices to potentially also reach Seebeck performance (referring to a bismuth telluride inclusive TEG device) performance and flexural ability. Generally, output power (in watts, W, per tire) generated by such TEG devices can increase with larger temperature gradients.

Carbon-based microstructures can be incorporated into thermoelectric (TEG) devices by being placed as layers in composite components stacks, carbons properly tuned for conductivity and doped negative and/or positive (N, P, respectively) semiconducting materials can produce significant power from waste heat >10 mw/cm², such that a temperature gradient of approximately 200 degrees F. can generate approximately 35 W, or more. Such TEG devices incorporating the disclosed carbon-based microstructures can be included in, for example, vehicle engine covers of conventional internal combustion engines to efficiently capture emitted radiant heat energy during engine operation for storage and/or later re-use by providing usable electric current to power resonators.

Figure 5A:
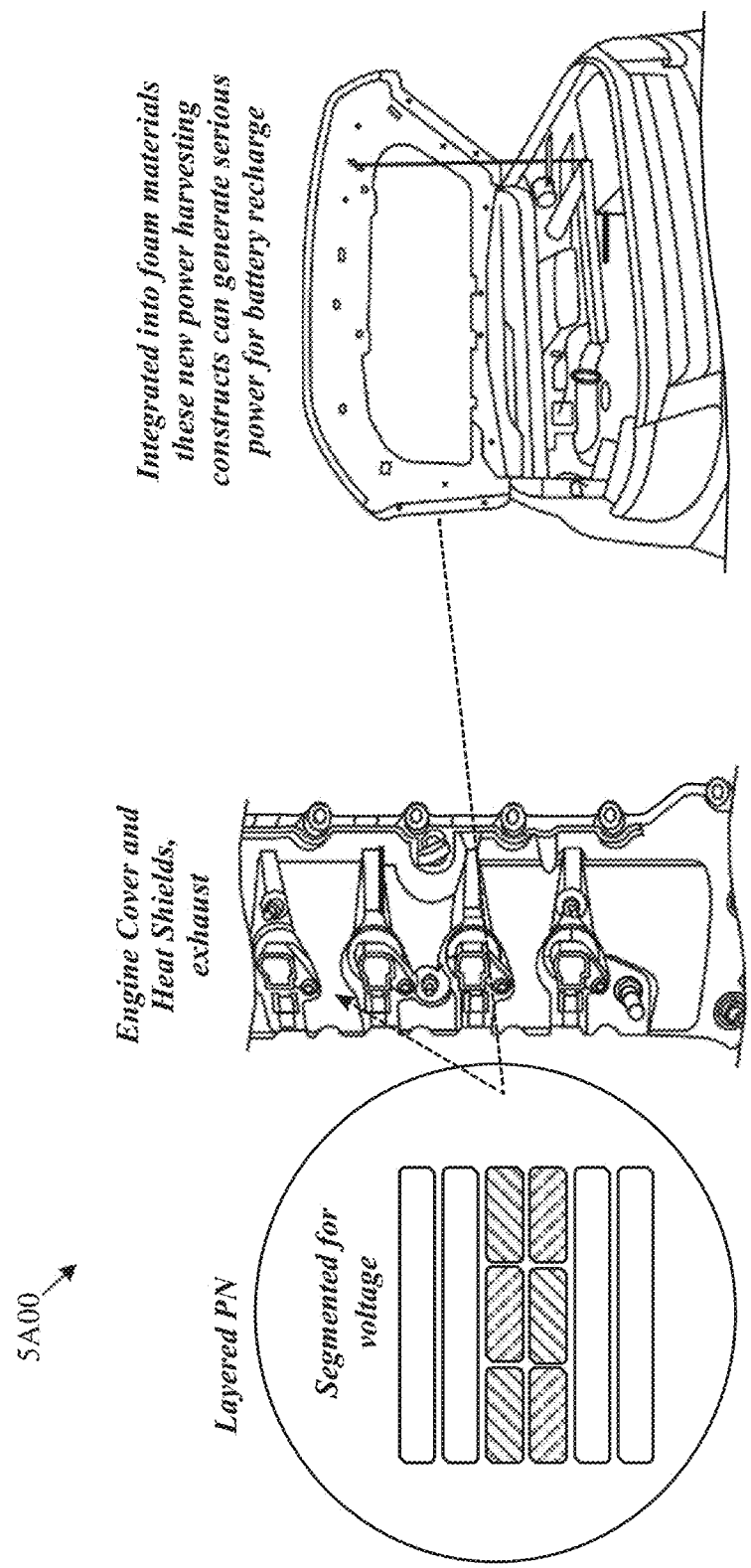
FIG. 5A illustrates a layered positive-negative (PN) junction type semiconductor material incorporated into engine components for electric power harvesting, according to some implementations.

FIG. 5A illustrates various example schematic diagrams 5A00 of a layered positive-negative (PN) junction type semiconductor material incorporated into engine components for electric power harvesting. The layered PN semiconductor can be segmented for precise voltage control and incorporated within an engine cover, heat shields, or exhaust components. And, foam materials may be used to absorb vibrational and/or thermal energy for power harvesting. As a whole, these devices, when combined with any one or more of the aforementioned systems and devices can be used to supplement energy harvesting and re-use capabilities to power resonators as needed to efficiently pin-point vehicle component wear.

Tire diagnostic related devices can be, in some implementations, powered by piezoelectric energy generators and/or the like. Piezoelectricity is the electric charge that accumulates in certain solid materials (such as crystals) in response to applied mechanical stress. The piezoelectric effect results from the linear electromechanical interaction between the mechanical and electrical states in crystalline materials with no inversion symmetry. The piezoelectric effect is a reversible process: materials exhibiting the piezoelectric effect (the internal generation of electrical charge resulting from an applied mechanical force) can also exhibit the reverse piezoelectric effect, the internal generation of a mechanical strain resulting from an applied electrical field. Here, tire deformation or strain monitoring can indirectly provide the degree of friction between the tires and road surface (which the tires contact), which can be used for optimization of automobile tire control systems. Tire wear information can be wirelessly transmitted to a receiver positioned within the wheel well housing the tire of interest based on a resonant sensor platform. Tire information can be transferred via telemetry into a vehicle navigation system.

In some implementations, one or more of the carbon-based microstructures used with the presently disclosed systems and materials, including carbon nano-onions (CNOs), can be used to form piezoelectric-layering in sensors on the surface of or embedded within vehicle components, such as tires. Also, graphene can be used to create energy harvesting patches with can be integrated into the tire. The CNOs and/or graphene can be prepared to collect, retain, and supply power (such as in the form of electric current) to resonators for use in identifying, with exacting accuracy, location of vehicle component degradation, such as tire wear.

Figure 5B:
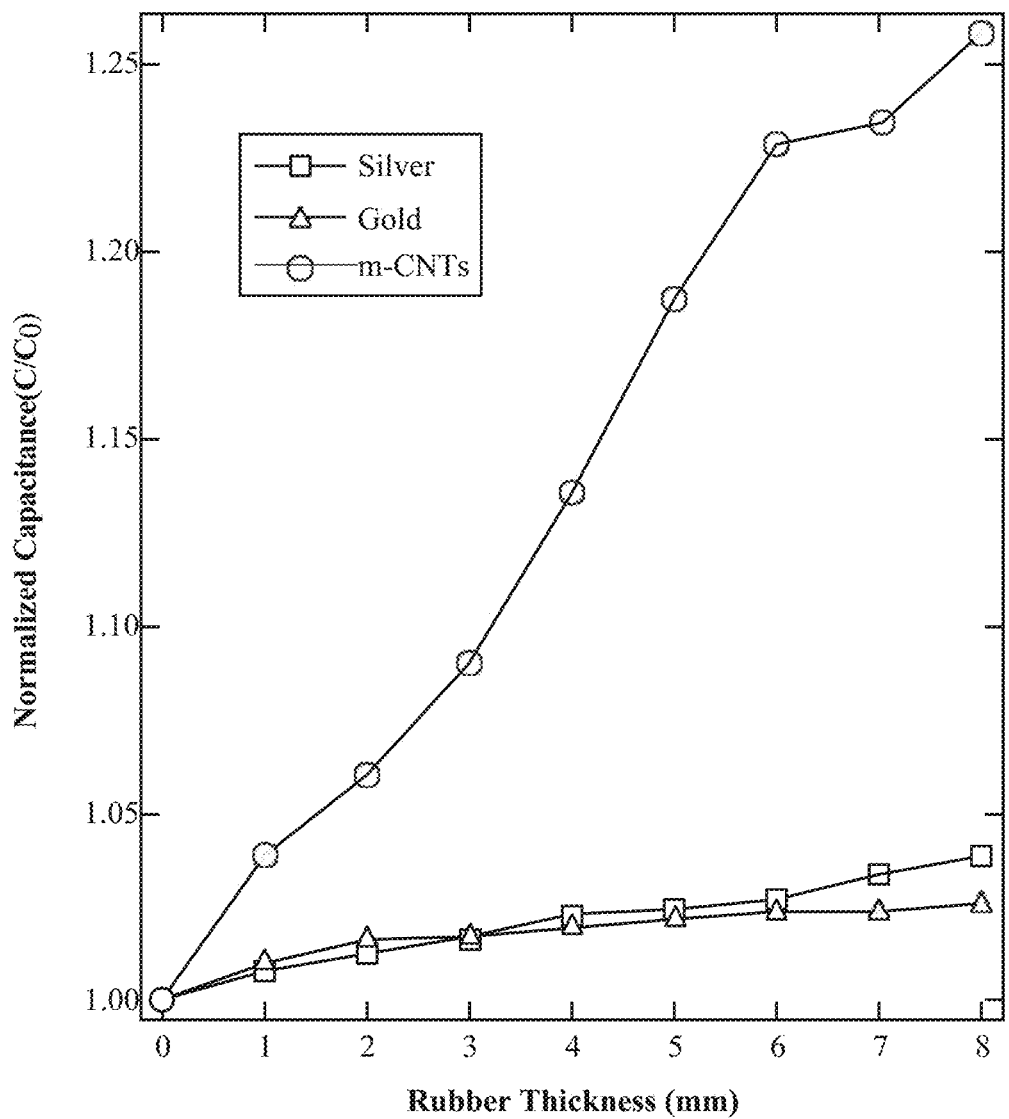
FIG. 5B is a graph of conventional materials incorporated within rubber of a vehicle tire, comparing normalized capacitance (C/C0) against rubber thickness (mm), according to some implementations.

Tuned carbon materials, such as the micro-carbon nanotubes (m-CNTs) shown in a graph 5B00 in FIG. 5B, can more accurately assist in the sensing of the tire tread wear (such as by powering resonators) due to their large innate capacitance. In comparison to metals, CNOs can provide a form of enhanced carbon to realize piezoelectric energy generation.

For usage in conjunction with any one or more of the systems, methods, and materials presented earlier, CNOs can be used to create piezoelectric generators that power, for example a wireless strain sensor position on the side (such as within an inner liner) of a tire to monitor and detect tire damage. Potential tire deformation or strain can be determined or calculated from the degree of friction from the road surface, where such information can then be used to optimize related automobile tire control systems. Tire related information, for example, can be wirelessly transmitted (after being calculated based on signal frequency shift and/or attenuation behavior as discussed earlier) to appropriately-equipped receivers that may be positioned within the tire and/or may work with resonators to provide a total tire information solution. Disclosed implementations can work with conventional telemetry methods and devices to communicate vehicle component wear related information to, for example, a vehicle navigation system.

FIG. 5B illustrates the graph 5B00 of conventional materials incorporated within rubber of a vehicle tire, comparing normalized capacitance ($C/C_0$) against rubber thickness (mm). As shown, the presently disclosed m-CNTs consistently outperform traditional materials such as silver and gold as relating to normalized capacitance compared to the thickness of rubber of materials into which the silver, gold, or m-CNTs (which may be incorporated in piezoelectric, thermoelectric, or other advanced energy harvesting and resupply functionality). The presently disclosed carbon-based nanomaterials match or exceed performance figures for that shown for m-CNTs.

Figure 6A:
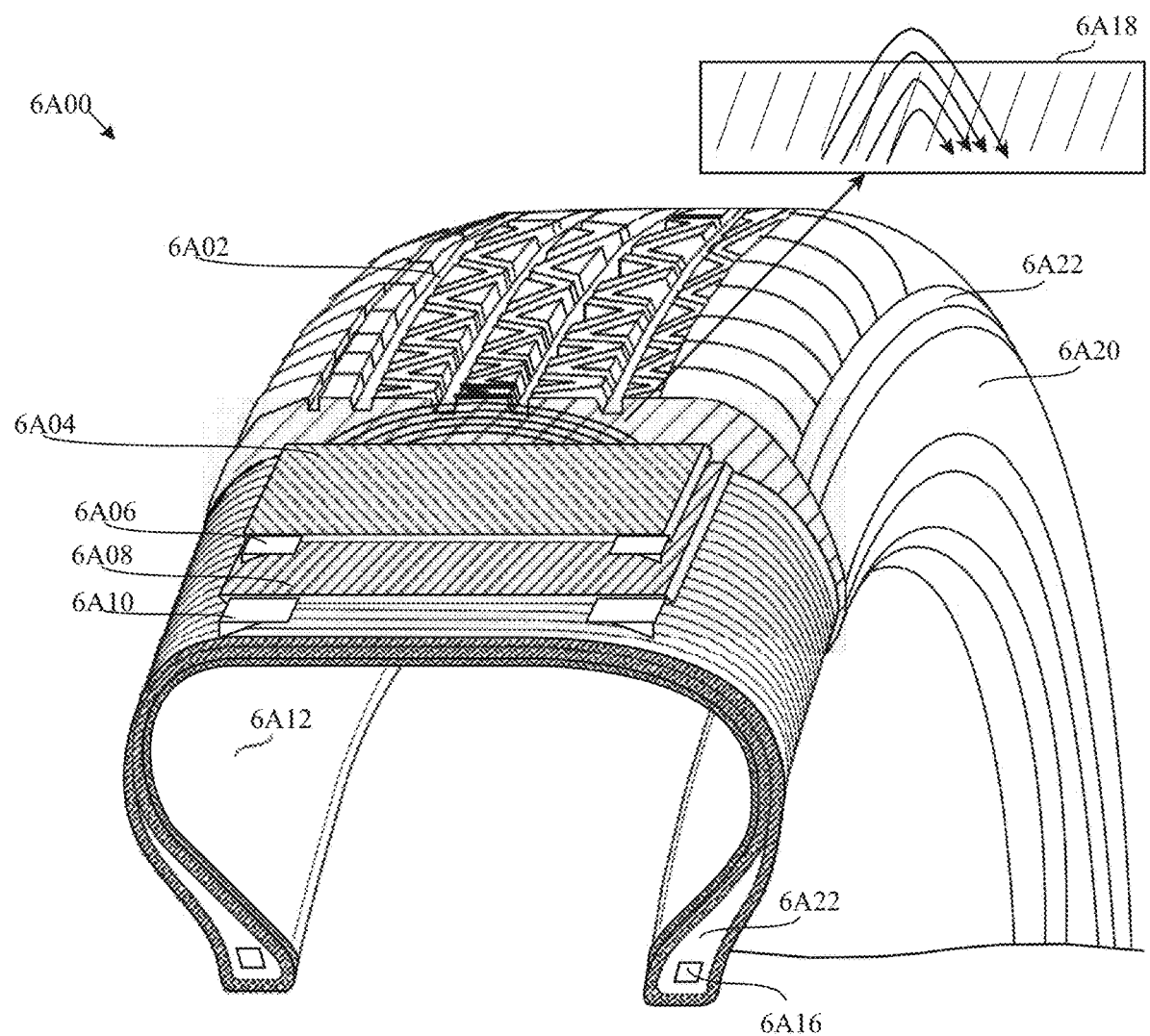
FIG. 6A illustrates a schematic diagram showing a complete tire diagnostics system and apparatus for tire wear sensing through impedance-based spectroscopy, according to some implementations.

FIG. 6A illustrates a schematic diagram 6A00 showing a complete tire diagnostics system and apparatus for tire wear sensing through impedance-based spectroscopy. A tire 6A00, such as a pneumatic rubber tire filled with air or nitrogen gas ($N_2$), can include traditional tire components including a body 6A20, an inner liner 6A12, a bead filler region 6A22, a bead 6A16, one or more belt plies 6A04, 6A06, 6A08, and 6A10, tread 6A02, and impedance-based spectroscopy wear sensing printed electronics 6A18 (alternatively sensors including carbon-based microstructures for signal frequency shift and attenuation monitoring by a resonator embedded within any one or more of the belt plies 6A04-6A10).

As shown here, a wireless strain sensor can be placed on surfaces or on the sides of the inner liner (or be embedded within) to monitor the tire condition for automobile safety, (such as to detect damaged tires). Tire deformation or strain monitoring can (indirectly) provide information representative of a degree of friction between the tires and contacting road surfaces, which can then be used for the optimization of automobile tire control systems. The tire information can be wirelessly transmitted to a receiver positioned in the tire hub based on a resonant sensor platform.

Figure 6B:
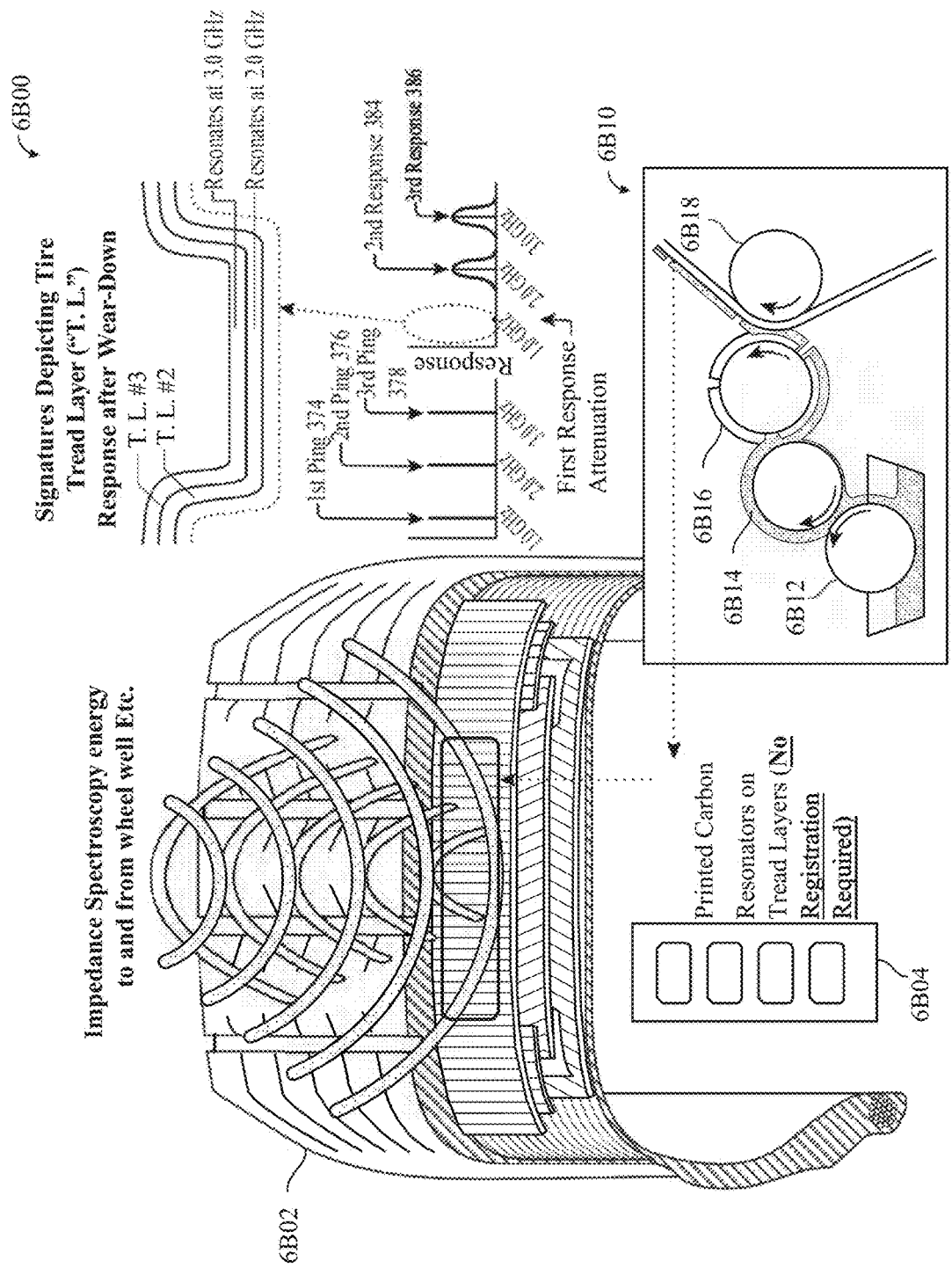
FIG. 6B illustrates tire information transferred via telemetry into a navigation system and equipment for manufacturing printed carbon-based materials, according to some implementations.

FIG. 6B illustrates a system 6B00 for providing tire wear-related information transferred via telemetry into a navigation system and equipment for manufacturing printed carbon-based materials. The system 6B00 can function with any one or more of the presently disclosed systems, methods, and materials, such as the sensors including carbon-based microstructures such that a redundant description of the same is omitted. Impedance spectroscopy, also referred to as Electrochemical Impedance Spectroscopy (EIS), refers to a method of impedimetric transduction involving the application of a sinusoidal electrochemical perturbation (potential or current) over a wide range of frequencies when measuring a sample, such as a sensor including carbon-based microstructures incorporated within one or more tire belt plies of a tire 6B02. Printed carbon-based resonators 6B04 can be incorporated within one or more tire components such as the tire belt plies, with each of the printed carbon-based resonators 6B04 having the general oval configuration shown, or some other shape or configuration tailored to achieve specific desirable resonance properties suitable for efficient and accurate vehicle component wear detection through monitoring of frequency shift and/or attenuation (such as a first response attenuation indicative of the wear of a tire body ply and/or tread layer having a natural resonance frequency of approximately 1.0 GHz).

An assembly of rollers 6B10 capable of forming the printed carbon-based resonators 6B04 includes a repository 6B12 (such as a vat) of carbon-based microstructures and/or microstructural material (such as graphene), an anilox roller 6B14 (referring to a hard cylinder, usually constructed of a steel or aluminum core which is coated by an industrial ceramic whose surface contains millions of very fine dimples, known as cells), a plate cylinder 6B16, and an impression cylinder 6B18. In operation, graphene extracted from the repository 6B12 can be rolled, pressed, stretched, or otherwise fabricated by the rollers of the assembly of rollers 6B10 into the oval-shaped (or in any other shape) printed carbon resonators 6B04. No registration (referring to alignment) of the printed carbon resonators 6B04 for appropriate functioning of the system 6B00.

As such, any combination of the aforementioned features can be used to manufacture a tire that has a resonator (referring to actual or "equivalent" tank, LC and/or resonant circuit, where carbon-containing microstructures themselves can resonate in response to emitted RF signals from a transceiver, and/or from energy supplied by an advanced energy source, such that other sensors, disposed into or onto any one or more components such as the tread, a ply or plies, an inner liner, etc. of the tire can demonstrate frequency-shifting or signal attenuation properties or behavior. The described resonator is not necessarily required to be embodied as an actual electrical and/or integrated circuit (IC). The described resonator can be realized simply as tuned carbon-containing microstructures, to thus avoid common deterioration concerns that may arise when implementing traditional discrete circuitry in decomposable materials, such as tire tread layers. Such resonators can resonate in response to an externally-supplied 'ping' (such as that supplied by a transceiver located in the wheel well of vehicle), or the resonator can respond to being charged by a co-located (referring to within the same tire tread layer, but possibly at a different location within that tire tread layer), self-powered, self-pinging capability facilitated by any variations or any number of power or charge generators (such as thermoelectric generators, piezoelectric energy generators, triboelectric energy generators, etc.).

At any time when the tire is rolling or otherwise undergoing deformation, any of the described resonators (and other resonators and/or resonant circuits) can be configured to emit and/or further emit oscillating RF signals (or other forms of electromagnetic radiation, depending on the overall configuration). As a vehicle tire experiences wear resultant from usage (such as on or off-road driving), tire tread layers in contact with pavement or ground (earth) may experience deformation, either instantaneously or over time (such as that observed from being "squished", referring to at least partial flattening of sections of the exposed vehicle tire tread layers during rotation or rolling, and/or from lateral motion as experienced during turning, etc.), therefore resultant signal frequency-shift and/or attenuation behavior may change pursuant to such "squishing" as associated signals can oscillate over one or more known amplitude ranges. In addition, or in the alternative, as the tire undergoes deformation, observed signals can oscillate within a known frequency range corresponding to a particular resonator, allowing for precise and accurate identification of the type of deterioration occurring while it is occurring, rather than requiring the driver, passengers, and/or other vehicle occupants to exist the vehicle, while it is stationary, to observe tire tread conditions. Such a frequency-shifting oscillation is observable as a frequency shift back and forth between two or more frequencies within the known frequency range.

A wireless-capable strain, such as a geometric measure of deformation representing the relative displacement between particles in a material body that is caused by external constraints or loads, sensor positioned on sides of the inner liner can monitor tire condition for automobile safety (such by detecting damaged tires). Additionally, tire deformation or strain monitoring can indirectly provide information related to the degree of friction between tires and road surface, which can then be used for the optimization of automobile tire control systems. Such tire information can be wirelessly transmitted to a receiver (and/or transceiver) positioned in the wheel hub based on a resonant sensor (such as an impedance spectroscopy, IS, sensor) platform.

Figure 6C:
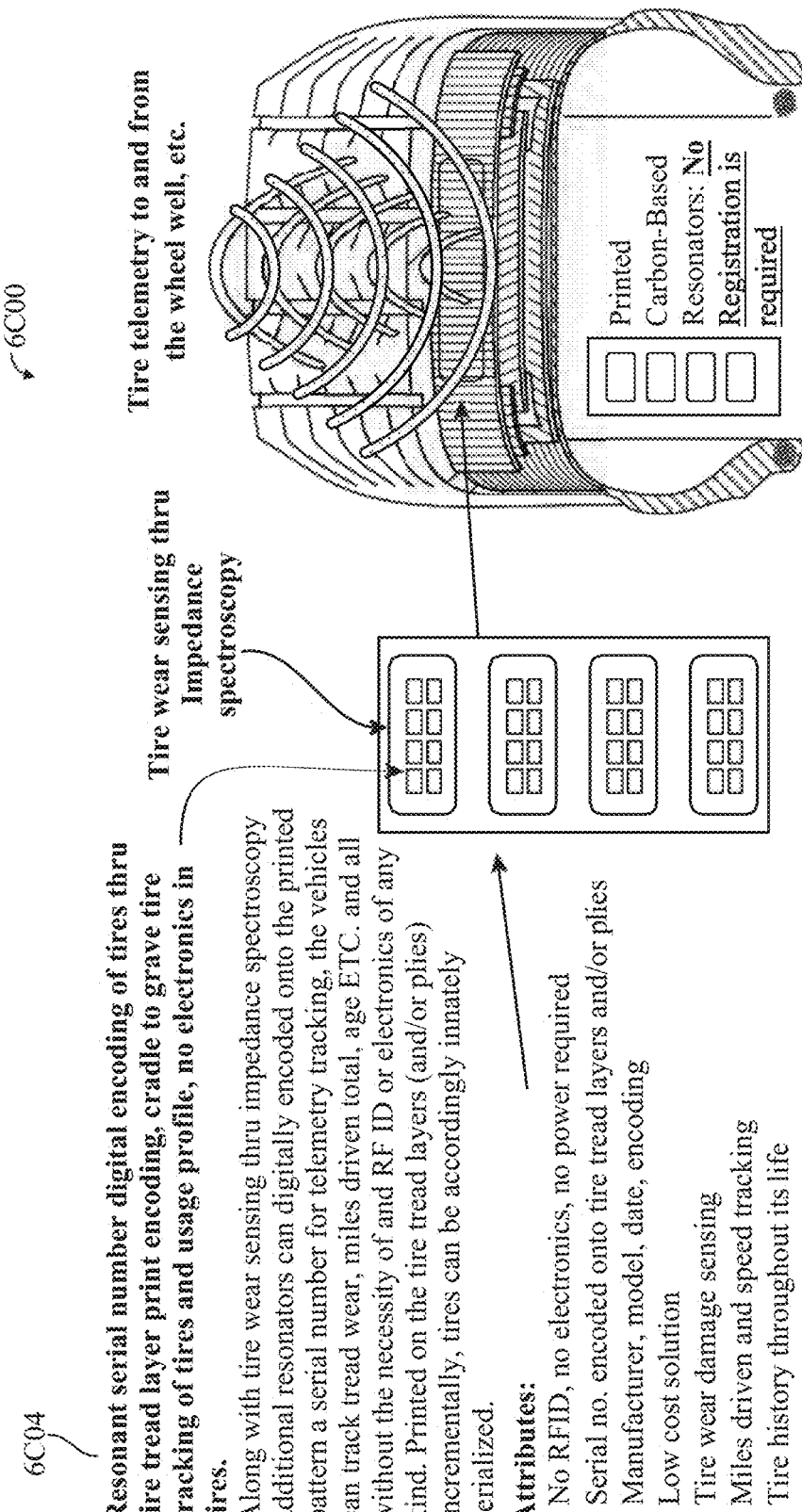
FIG. 6C is a presentation of information related to the sensing of a tire condition, according to some implementations.
Figure 6D:
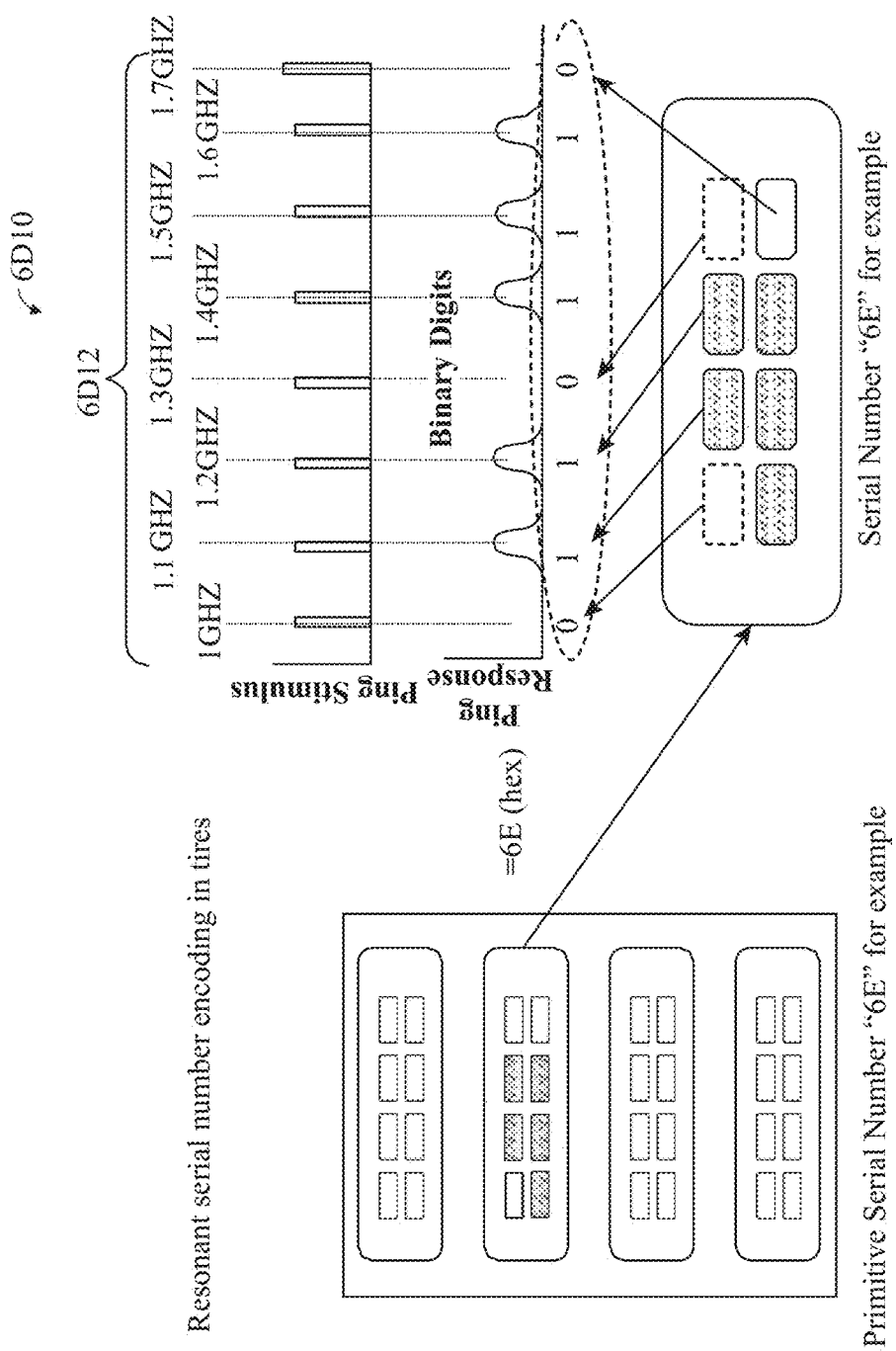
FIG. 6D illustrates schematics related to a resonant serial number-based digital encoding of vehicle tires through tire tread layer and/or tire body ply-print encoding, according to some implementations.

FIGS. 6C-6D illustrate schematics including a schematic diagram 6C00 and a schematic diagram 6D00, both related to a resonant serial number-based digital encoding system 6C04 for determining wear of vehicle tires through ply-print encoding. The resonant serial number-based digital encoding system 6C04 may be incorporated and/or function with any of the presently disclosed systems, methods, and sensors. The resonant serial number-based digital encoding system 6C04 offers digital encoding of tires through ply-print encoding and thus offers cradle-to-the-grave (referring to a full lifespan) of tracking of tires (and related performance metrics) and a usage profile without requiring traditional electronic devices susceptible to routine wear-and-tear in the tires.

Along with tire wear sensing thru Impedance Spectroscopy (IS) and/or Electrochemical Impedance Spectroscopy (EIS), additional resonators can be digitally encoded onto a printed pattern to provide a recognizable serial number for telemetry-based tire performance tracking. Accordingly, so-equipped vehicles can track tread wear, miles driven total, age, etc., without requiring traditional radio-frequency identification systems (RFID) or other electronics of any kind. By being printed onto the body ply and/or tread layer incrementally, tires incorporating the discussed printed carbon-based resonators can be innately serialized.

FIG. 6G shows schematic diagram 6D10 for resonant serial number encoding in tires. The serial number "6E" is shown encoded in a specially-prepared array of printed carbon resonators configured to resonate according to the 'ping' stimulus-response diagram 6D12 allowing for convenient and reliable identification of that particular body ply and/or tread layer of the so-equipped vehicle tire.

Figure 7:
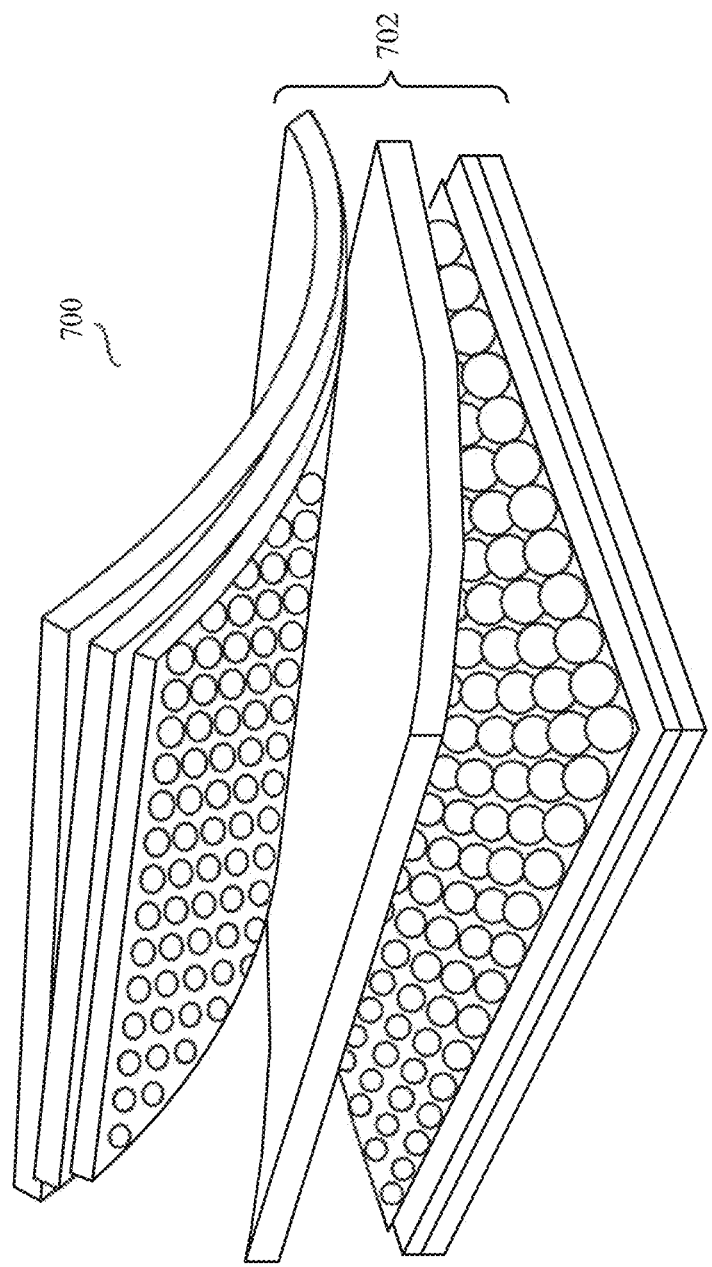
FIG. 7 illustrates a schematic diagram depicting various layers of tire belt plies configured to generate electric power or current through piezo-electric capabilities, according to some implementations.

FIG. 7 illustrates a schematic diagram 700 depicting various layers of tire belt plies 702 configured to generate electric power or current through piezo-electric capabilities such as that outlined earlier, and may be incorporated into any one or more of the example tires discussed herein in relation to the various presented systems, methods, and materials. Generally, such belt plies may be a part of a conventional rubber pneumatic vehicle, such as an automobile, sport utility vehicle, light truck, or truck tire, which may include any one or more of a bead, a body, reinforcing belts, cap plies (which are optional), sidewalls, and tread, also optional, and absent on certain racing tires such as slicks.

In some implementations, regarding any one or more of the presently disclosed examples, thermoelectric generation can be based on the principles of Seebeck, Peltier, and Thomson effects, where the flow of charge carriers between the hot and the cold regions creates a voltage difference.

Optimal thermoelectric materials (suitable for incorporation within the presently disclosed TEGs) should possess a high-Seebeck coefficient ($V=\alpha\Delta T$), high-electrical conductivity, and low-thermal conductivity to maintain high-thermal gradient at the junction. The polarity of the output voltage can be dependent on the polarity of the temperature differential across the TEG.

TEGs can be made up of solid-state daisy-chained circuits of inversely doped pairs of thermoelectric structural posts, referred to as "legs". The N- and P-type semiconductor legs can be placed electrically in series and sandwiched between two thin thermally conductive ceramic plates. A commonly used semiconductor material is bismuth-telluride ($Bi_2Te_3$).

The thermoelectric module with the highest product of $V_{max}$ (maximum voltage)*Imax (maximum current) for a given size will provide the ideal power. Common modules can be square, ranging in size from about 10 mm to 50 mm per side and can range from 2 mm to 5 mm in thickness. A notable performance feature distinguishable over other alternative energy generation devices are that TEGs can operate in the dark, which greatly expands the scope of potential applications. TEGs are also solid-state devices with no moving parts, allowing for continuous operation and also containing no materials that need to be replenished. And, in certain configurations, TEGs provide that heating and cooling capabilities can be reversed.

In some examples, strain gauge sensors can be incorporated within elastomeric materials to sense weight to determine the curb weight of, for example, a tractor and trailer. Such sensors can be designed to trigger an alarm if the tire demonstrates a weight or load imbalance (such as due to a cargo shift), and increased force.

TEGs can function with resonators incorporated in race tires filled with nitrogen gas to observe increases in other gas amounts (such as oxygen and/or argon) to be indicative of leaks or a potential upcoming tire rupture (blowout) situation. Tire construction can incorporate any combination of TEGs, piezoelectric energy generators, triboelectric energy generators and other advanced energy harvesting means to capture, retain, and repurpose energy during vehicle operation to provide electric current needed for resonator oscillation to function with any of the presented systems. Also, vehicle component wear and deterioration information can be electronically forwarded by appropriately equipped systems (mounted in the vehicle itself, or elsewhere at remote locations) to inform interested parties and potentially law enforcement authorities as well to provide high-quality ongoing holistic and reliable vehicle operational information. This information can be used and considered for predictive sales (based on vehicle driving behavior), promotional sponsorship, insurance, time-on-road, etc.

Figure 8:
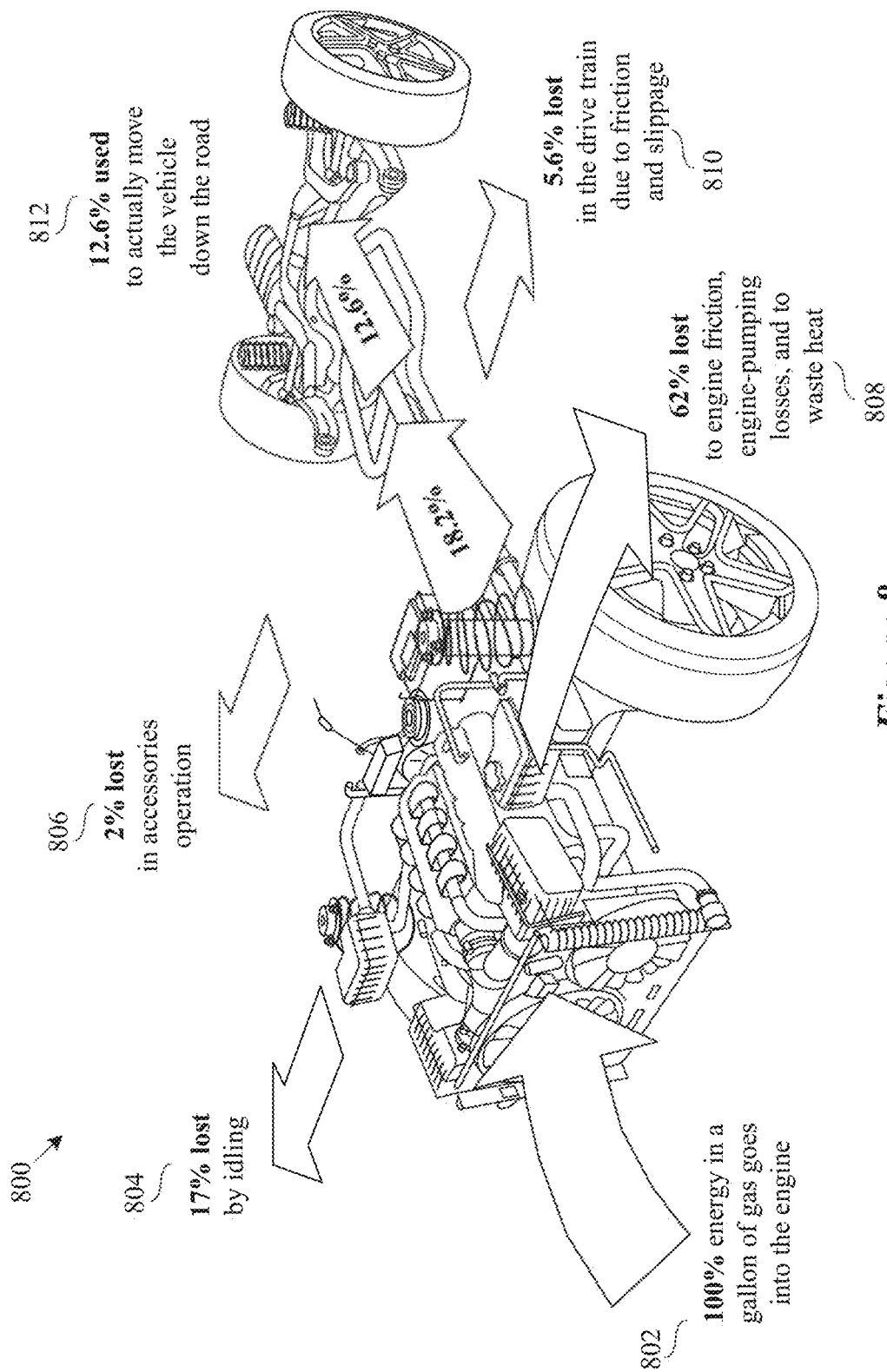
FIG. 8 illustrates a schematic cut-away diagram of a vehicle chassis, engine, and drivetrain to show powertrain losses (non-usable for forward propulsion power) associated with a conventional vehicle, according to some implementations.

FIG. 8 illustrates a schematic cut-away diagram 800 of a vehicle chassis, engine, and drivetrain to show powertrain losses (such as those that are non-usable for forward propulsion power) associated with a conventional vehicle. Any of the disclosed systems, methods and materials can be applied to counter-act such powertrain losses by effectively capturing energy that would be otherwise lost to re-purpose such energy to power any of the disclosed resonators for vehicle component material deterioration detection through signal resonance monitoring. For instance, in a conventional automobile powered by a front-mounted internal combustion engine (such as that shown by the diagram 800 in FIG. 8), an input 802 provides a traditional exhaustible energy source, such as gasoline, into the engine. Idling of the engine resulting in waste 804 of 17% of that input energy, while another 2% is lose in accessory operation 806, 62% is lost due to engine friction, engine-pumping losses, and to waste heat (collectively referred to as engine-related losses 808), 5.6% is lost in drive train losses 810 due to friction and slippage, leaving only 12.6% of residual energy available 812 to actually move the vehicle down the road.

Figure 9:
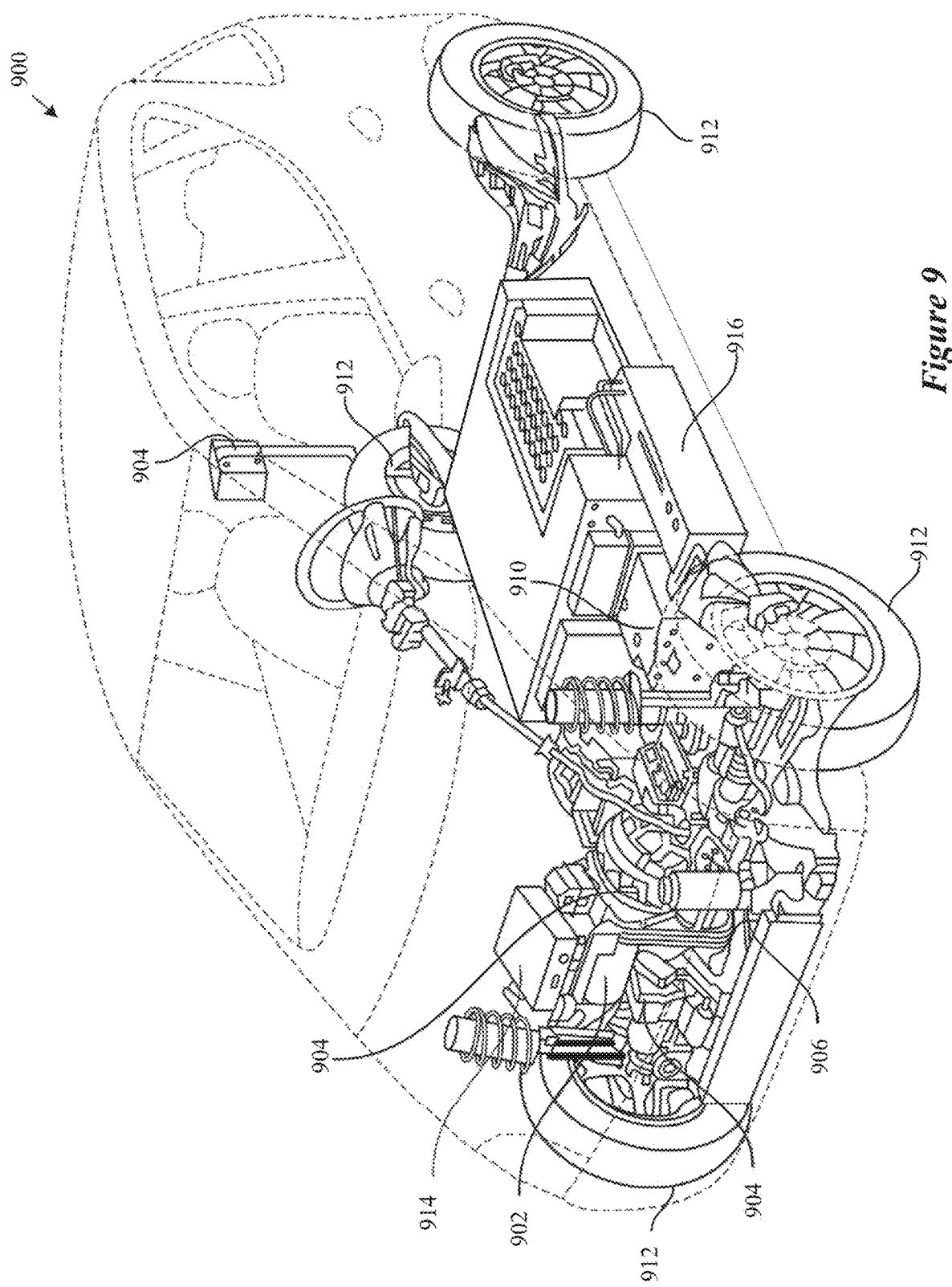
FIG. 9 illustrates a schematic cut-away diagram of a vehicle equipped with piezoelectric and/or thermoelectric electric current and/or power generators, according to some implementations.

FIG. 9 illustrates a schematic cut-away diagram of a vehicle equipped with piezoelectric and/or thermoelectric electric current and/or power generators. A vehicle 900 (as shown to be a mini-compact, but can alternatively be any form of passenger vehicle, sedan, coupe, truck, sport utility vehicle, sports car, etc.) that can be powered by a conventional internal combustion engine, feature hybrid electric power, or operate exclusively on an electric-only basis featuring an electric motor. In example configuration the vehicle 900 can include four tires 912, an air conditioning (A/C) converter 914, drive motors 902, a power steering 906, a horsepower (HP) distributor 910, an external charging socket 904, and a battery system 916. The vehicle 900 can be equipped with piezoelectric energy generation means (such as generators, devices, motors, and/or the like) to capture energy and convert that captured energy into electric current useful for other applications or uses, such as to power any of the presently disclosed resonators, resonant circuits, and/or the like for accurate and precise detection of vehicle component condition regarding wear and degradation.

Piezoelectricity, as introduced earlier, implies the electric charge that accumulates in certain solid materials (such as crystals) in response to applied mechanical stress. The word piezoelectricity means electricity resulting from pressure and latent heat. Mechanistically, the nature of the piezoelectric effect is closely related to the occurrence of electric dipole moments in solids. The latter can either be induced for ions on crystal lattice sites with asymmetric charge surroundings (as in $BaTiO_3$) or may directly be carried by molecular groups (as in cane sugar). The dipole density or polarization (dimensionality [$C·m/m^3$]) can be calculated for crystals by summing up the dipole moments per volume of the crystallographic unit cell. As every dipole is a vector, the dipole density P is a vector field.

The change of polarization P when applying a mechanical stress is of importance for the piezoelectric effect. This might either be caused by a reconfiguration of the dipole-inducing surrounding or by re-orientation of molecular dipole moments under the influence of the external stress. Piezoelectricity may then manifest in a variation of the polarization strength, its direction or both, with the details depending on:

the orientation of P within the crystal;
crystal symmetry; and
the applied mechanical stress.

The change in P appears as a variation of surface charge density upon the crystal faces, such as a variation of the electric field extending between the faces caused by a change in dipole density in the bulk. For example, a 1 cm³ cube of quartz with 2 kN (500 lbf) of applied force can produce a voltage of 12,500 V.

Such principles can be configured to provide voltage and/or electric current to any of the presently disclosed resonators for associated functioning as discussed earlier, such as to deliver: (1) high power; or, (2) low power. High power applications can include capturing rotational energy generated out of a tire through a rotating hub, induction, or wireless means. Low power applications include integrated with remote and/or on-board (referring to integrated with the vehicle 900) energy harvesting systems (such as the disclosed TEG systems and/or triboelectric energy generators). Integration with a distributed sensor array activated by electromagnetic (EM) signal communication (at, for example, 465 Mhz, or similar) can be used to facilitate backscatter or inductive coupling.

Figure 10:
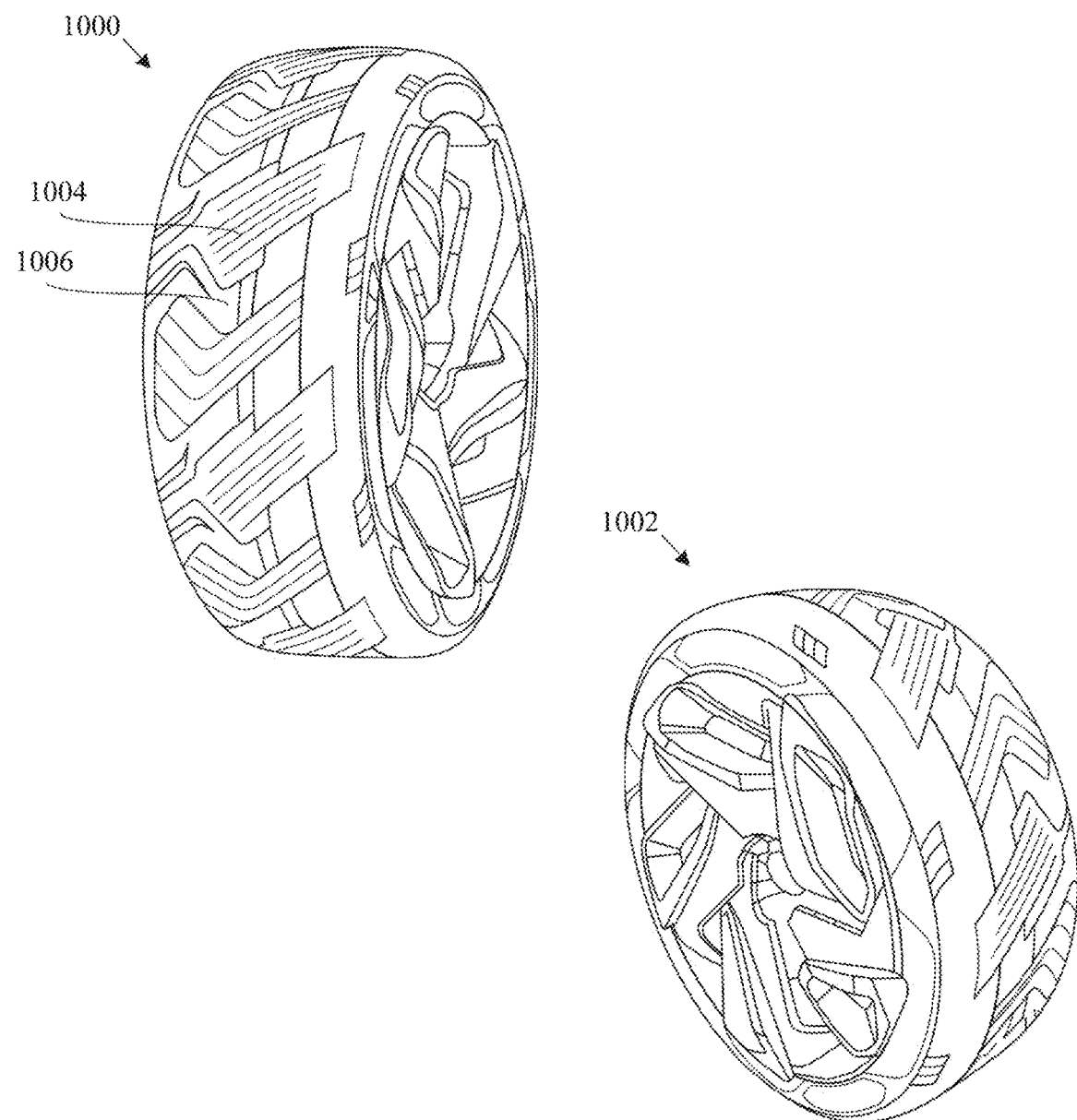
FIG. 10 illustrates various perspective schematic views of an advanced conceptual tire and various energy (current) delivery challenges, according to some implementations.

FIG. 10 illustrates various perspective schematic views of an advanced conceptual tire and various energy (current) delivery challenges. Tires 1000 and/or 1002 can be Goodyear® BH03 Piezo Concept Tires, manufactured by The Goodyear Tire & Rubber Company of Akron, Ohio, or any similar such advanced self-generating powered tire, where any of the disclosed systems, methods, and materials (inclusive of carbon-containing microstructures) can be configured to function with such advanced tires to be self-powered regarding provision of ongoing electric power to resonators for accurate vehicle component material deterioration detection. Tires 1000 and/or 1002 may feature tread 1004, sipes 1006 and offer construction including carbon black, referred to as "ultra-black" texture for effective heat absorption captured by thermoelectric (TE) power generators or capabilities.

With relation to incorporation into any one or more of the presently disclosed example carbon-based microstructures incorporated into tire materials, types of suitable carbon include graphene and graphene related materials. Graphene refers to an allotrope of carbon in the form of a single layer of atoms in a two-dimensional hexagonal lattice in which one atom forms each vertex. It is the basic structural element of other allotropes, including graphite, charcoal, carbon nanotubes and fullerenes. It can also be considered as an indefinitely large aromatic molecule, the ultimate case of the family of flat polycyclic aromatic hydrocarbons.

Graphene has a theoretical specific surface area (SSA) of 2,630 $m^2/g$. This is much larger than that reported to date for carbon black (typically smaller than 900 $m^2/g$) or for carbon nanotubes (CNTs), from ≈100 to 1000 $m^2/g$ and is like activated carbon. Intrinsic properties of graphene include: high strength (per unit area), thermal conductivity in the approximately 3,000 W/mK to approximately 5,000 W/mK range, capabilities to accommodate n-type conductivity by doping with certain elements such as nitrogen (N), sulfur (S), boron (B), phosphorous (P), fluorine (F), and/or chlorine (Cl).

The formula $ZT=\sigma S^2 T/\kappa$ provides a quantitative relationship regarding the thermoelectric (TE) performance of materials as measured and can be defined as follows: S is the Seebeck coefficient (a measure of the magnitude of an induced thermoelectric voltage in response to a temperature difference across that material, as induced by the Seebeck effect), "$\sigma$" and "$\kappa$" are the electrical and thermal conductivity, respectively, and T is the absolute temperature. Goals for thermoelectric conversion can include to increase electrical conductivity while concurrently decreasing thermal conductivity.

Graphene can require nano-structuring, such as to achieve low dimensionality: dots ("0D"), tubes/ribbons ("1D"), or sheet (2D) and interfaces (phonon scatterers) to reduce thermal conductance and band gap engineering to increase electrical carriers (p/n), increase sensitivity/performance, preparing certain graphene sheet formats that are not well-suited for "daisy-chaining" (referring to connecting several devices together in a linear series) within typical high power, thermopile architecture and can be prepared to be best suited as supporting substrate (such as for thermal management) for epitaxial grown BiSbTe.

Graphene can also be used as a multifunctional element offering any one or more of the following advantages: allowing for combination with a (or to function as) thermal conductor (such as for heat management/PMC composite system; graphene-on-graphene materials), strengthener/reinforcement, distributed sensor (health: pressure, friction, shear) and to act as an energy harvester.

Figure 11:
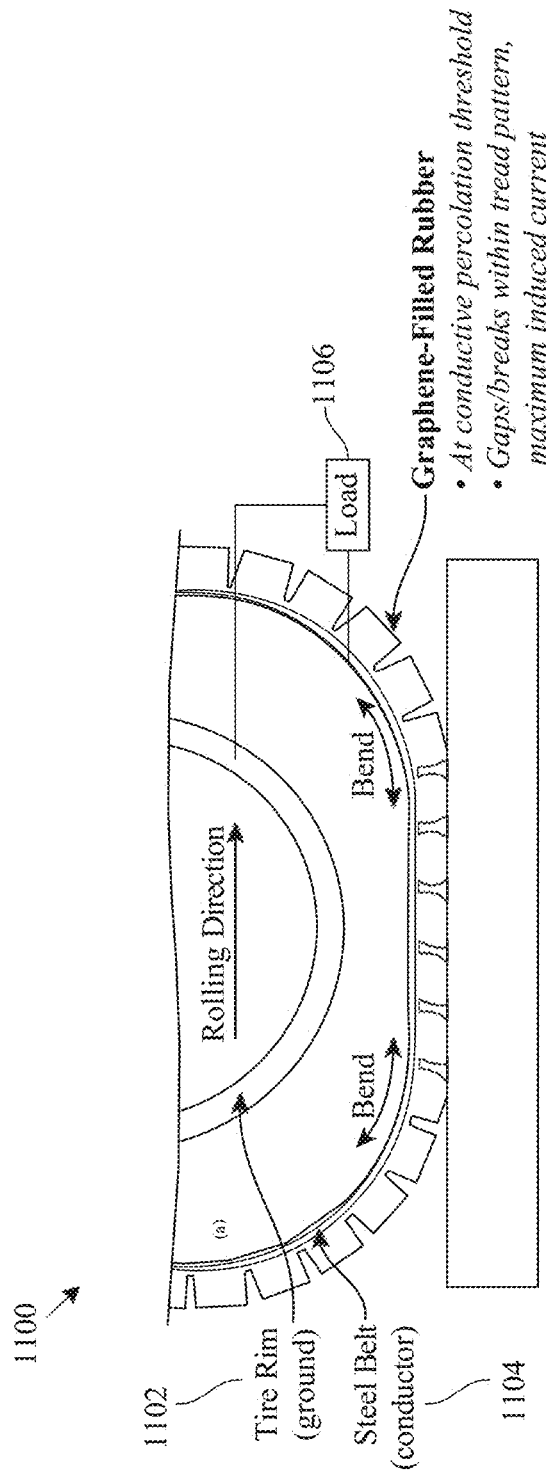
FIG. 11 is a side-view schematic diagram of a vehicle tire incorporating graphene-filled rubber and contacting a ground or pavement, according to some implementations.

FIG. 11 is a side-view schematic diagram of a vehicle tire 1100 incorporating graphene-filled rubber and contacting a ground or pavement. As shown, the vehicle tire 1100 includes a tire rim (ground) 1102, and a steel belt (conductor) 1104 wrapped circumferentially around the vehicle tire 1100. Graphene-filled rubber can be incorporated in or otherwise used to form one or more of the tire plies of a body of the tire. Such graphene-filled rubber can offer a conductive percolation threshold (referring to the lowest concentration of filler at which insulating material can be converted to conductive material, meaning that percolation threshold is the lowest concentration of filler material, such as graphene-filled rubber, at which electrical pathway is formed throughout a sample). The tire can support its weight as reflected as a load 1106 and/or other weight bearing down on the tire, such as through a vehicle chassis or of the occupants, when the vehicle is loaded.

The vehicle tire 1100 can be equipped with triboelectric power generators in one or more plies of the body of the tire to supply captured energy in the form of usable electric energy to the resonators as disclosed earlier. Triboelectric energy conversion principles, as employed here, support the conversion of mechanical energy into electricity, coupling triboelectric friction and electric induction to power sensors to diagnose, in an ongoing manner, the general health (referring to wear and degradation) of the tire.

Under normal (every commuting use) conditions, approximately 5 to 7% of energy generated by friction encountered between the vehicle tire 1100 and the ground (such as roadway pavement) can be dissipated. Without triboelectric generators (or other advanced energy recovery means) to recover and retain such dissipated energy, the energy can be undesirably lost to the surrounding environment. Therefore, any of the presently disclosed carbon-based microstructures, such as those self-nucleated in-flight in a reaction chamber or reactor from a carbon-containing gaseous species such as methane ($CH_4$), as disclosed by Stowell, et al., in U.S. patent application Ser. No. 16/785, 020 entitled "3D Self-Assembled Multi-Modal Carbon-Based Particle" filed on Feb. 7, 2020, can be used to form sensors suitable to indicate vehicle component wear or degradation as discussed earlier.

Alternatively, or in addition, such carbon-based microstructures can be incorporated within the triboelectric energy generators themselves, and be optimized to create a carbon-inclusive triboelectric conductor with adjustable (tunable) polarizability and able to be organized and/or connected in series to accommodate a variety of power supply and generation scenarios or needs. Carbon-inclusive triboelectric energy generators, as so described, can optionally be uniformly interspersed throughout the entirety of a given tire ply, extending across the entire width of the tire, as well as circumferentially around the tire, instead of being localized at (smaller than the width of the tire) localized sensors. Therefore, such entire-tire-ply-width carbon-inclusive triboelectric energy generators (and/or localized sensors in communication with localized triboelectric energy generators distributed throughout one or more tire plies) both can offer the following benefits:

high contact area at surface of tire for optimum charge generation/surface electrification (ablation—referring to the removal or destruction of material from an object by vaporization, chipping, or other erosive processes, such as being due to friction, creation of a new surface, and possible changes in resistance and potentially related to tread wear/lifetime);

tuned graphene and rubber composite materials can be optimized for permittivity related electrostatic induction (referring to a redistribution of electric charge in an object, caused by the influence of nearby charges, to create or generate static electricity in a material by bringing an electrically charged object near it, this causes the electrical charges to be redistributed in the material, resulting in one side having an excess of either positive (+) or negative (−) charges);

graphene can be tuned to achieve optimum end-use application area specific tire properties (such as optimization for wet or dry handling, rolling resistance, etc.), and charge generation (wettability); and vibrations of the tire (loading and unloading, referring to material flexure, could potentially relate to impedance changes) can be captured and transformed into useful electric power.

Vehicle specific applications of triboelectric generators as set forth here are applied to capture and re-use of the approximately 5 to 7% of energy otherwise lost due to rolling friction between a tire and the pavement with which it is in contact with. Specifically, ground surfaces containing silica, cement, and metal (or metal-containing composite materials) can act as electron donating materials that contact with electron accepting materials in the carbon-based microstructures, such as graphene, incorporated within sensors or entire plies of the body of, for example, a rubber pneumatic tire.

The role of graphene, referring particularly to, in some examples, 3D hierarchical carbon-based microstructures synthesized from agglomerations containing multiple graphene sheets coupled together, can be tuned to act as an electrical conductor at its percolation threshold (referring to the lowest concentration of filler at which insulating material is converted to conductive material) and provide a relatively high contact area at exposed surfaces of the tire for optimum charge generation. This may hold true especially for configurations in which the entire width of one or more tire plies incorporates at least some carbon-based microstructures, making that entire body ply and/or tread layer at least partially electrically conductive. Conductive materials can accommodate charge generated by triboelectric generators from ablation (referring to the removal or destruction of carbon-containing rubber in the tire body ply and/or tread layer upon contact with the pavement causing vaporization of that material).

Moreover, graphene incorporated within the tire body ply and/or tread layer can serve multiple desirable purposes including being tuned to achieve optimum tire properties, such as being tuned for optimum handling under wet or dry conditions, rolling resistance, etc. Vibration of the tire during loaded and unloaded condition, could also impact observed impedance changes within such a partially conductive tire capable of capturing and repurposing generated charge for material deterioration detection purposes.

FIGS. 12A-12C illustrate schematic diagrams 1200 of charge generation on a rolling wheel (equipped with a single electrode and a copper-laminated polydimethylsiloxane, PDMS, patch) to demonstrate incremental charge generation of a wheel rolling on ground such as pavement of a roadway. Any one or more of the presently disclosed carbon-based nanostructures, whether used to form sensors on surfaces, embedded within tire plies, or mixed within rubber formulations to form carbon-inclusive tire plies, can function with triboelectric energy generators that include the designs shown by the schematic diagrams 1200. As shown, triboelectric energy generators can have the following components: metal sheets 1206 that can be connected to an electrical load 1204 (referring to an electrical component or portion of a circuit that consumes, active, electric power), which is in turn connected to a metal film 1202 in contact with a polymer film 1208 that contacts a ground 1210.

That is, equipment shown by the schematic diagrams 1200 can function to provide electric power to resonators to electronically communicate with carbon-based microstructures in sensors and elsewhere within or on a tire body ply and/or tread layer and can accommodate at least the following principles, capabilities, and/or observations:

A design of single-electrode triboelectric nanogenerator (S-TENG) using rough PDMS thin film to simulate the tire surface can effectively scavenge the wasted friction energy from rolling tires;

The S-TENG design is very simple, scalable and able to be easily integrated into a wide variety of potential end-use application areas;

The triboelectric output increases monotonically (referring to a function between ordered sets that preserves or reverses the given order) with the load and moving speed of the tire;

The S-TENGs have been successfully implemented to the tires of a toy vehicle and have instantaneously powered 6 commercial light emitting diodes (LEDs) while the vehicle was moving on the ground; and This development provides a promising solution to improve fuel efficiency of conventional vehicles or the cruising ability of electric vehicles.

Triboelectric nanogenerators (TENG), generally, are energy harvesting devices to convert mechanical energy into electricity based on the universally known triboelectric principle. Innovative design of single-electrode TENG (S-TENG) using PDMS to simulate the tire surfaces for scavenging the wasted friction energy from rolling tires have been developed and can be integrated with the presently disclosed systems, methods, and materials. By fixing the PDMS S-TENG on a rubber wheel, the performance of scavenging friction energy has been successfully systematically investigated. The electric output of the S-TENG-on-wheel demonstrated monotonical increase with the increase of the moving speed and weight load of the wheel.

Maximum instantaneous power has been obtained to be at approximately 1.79 mW at a load resistance of 10 M$\Omega$, corresponding to a highest energy conversion efficiency of 10.4%. And, arrays of multiple S-TENGs have been implemented to the tires of a toy vehicle and instantaneously powered 6 commercial green light emitting diodes (LEDs) while the vehicle was moving on the ground. This successful demonstration supports a promising solution to scavenge the wasted friction energy from rolling tires, which may improve the fuel efficiency or the cruising ability of electric vehicles and may power the presented resonators.

Figure 12D:
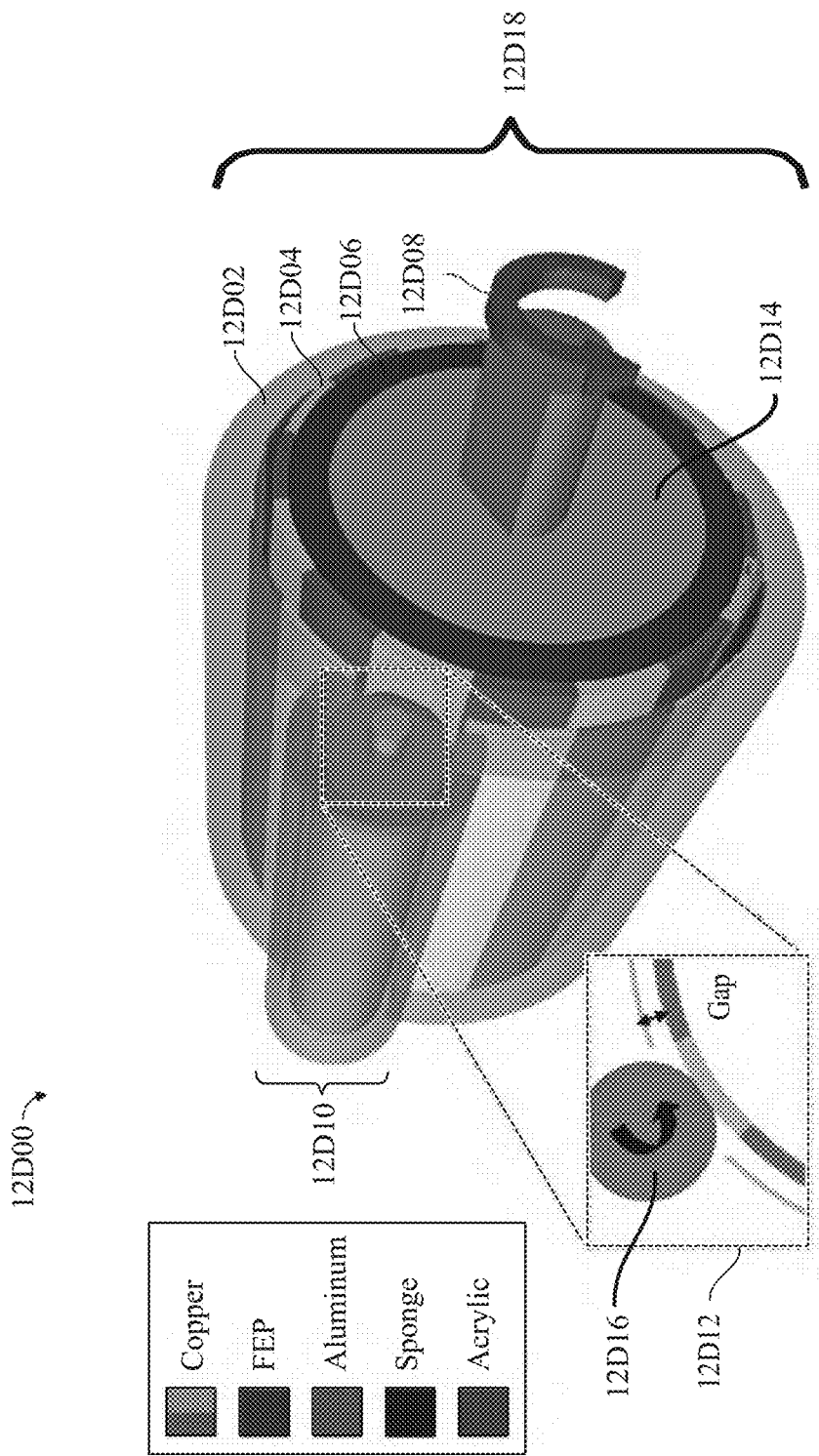
FIG. 12D illustrates an example rotor and stator configuration of a triboelectric power generator or motor, according to some implementations.

FIG. 12D illustrates an example rotor 12D18 and a stator 12D10 arranged in a configuration 12D00 to collectively function as an example of a triboelectric power generator or motor, according to some implementations. Various known materials can be used, nevertheless the example shown in the configuration 12D00 can include (at a minimum): an outer shell 12D02, a copper layer 12D04, a fluorinated ethylene propylene (FEP) material is a copolymer of hexafluoropropylene and tetrafluoroethylene (and differs from the polytetrafluoroethylene resins in that it is melt-processable using conventional injection molding and screw extrusion techniques), an aluminum roller 12D16, a sponge layer, and an acrylic core 12D14.

In operation, the acrylic core 12D14 can rotate in a direction 12D08 and be wrapped by multiple layers, each layer of the multiple layers surrounding and in contact with both a preceding and succeeding layer. That is, the acrylic core 12D14 can be surrounded by the sponge layer 12D06, that may be inwardly compressible to reduce and later regain thickness as needed to accommodate charge capture and transfer, which can be surrounded by the copper layer 12D04 (that may include quantities of FEP dispersed therein and the outer shell 12D02.

The aluminum roller 12D16 can rotate opposite to the direction 12D14 as shown in an enlarged section 12D12 to harvest triboelectrically generated charge. Observed physical values and parameters (when, for example, used in conjunction with any of the aforementioned triboelectric power generation means) include the following (at a minimum):

At load resistance of 20 MΩ and rotation rate of 1000 r/min, peak power density of 250 mW/m2;

Simultaneous powering of 16 spotlights in parallel and charging a 200 μF commercial capacitor to 120 V in 170 seconds;

At a load resistance of 10 MΩ, measured power density of 15 mW/cm$^3$; and

At a load resistance of ~1MΩ, and rotation rate of 1000 rpm, peak power of 267 mW/cm$^2$.

Figure 13A:
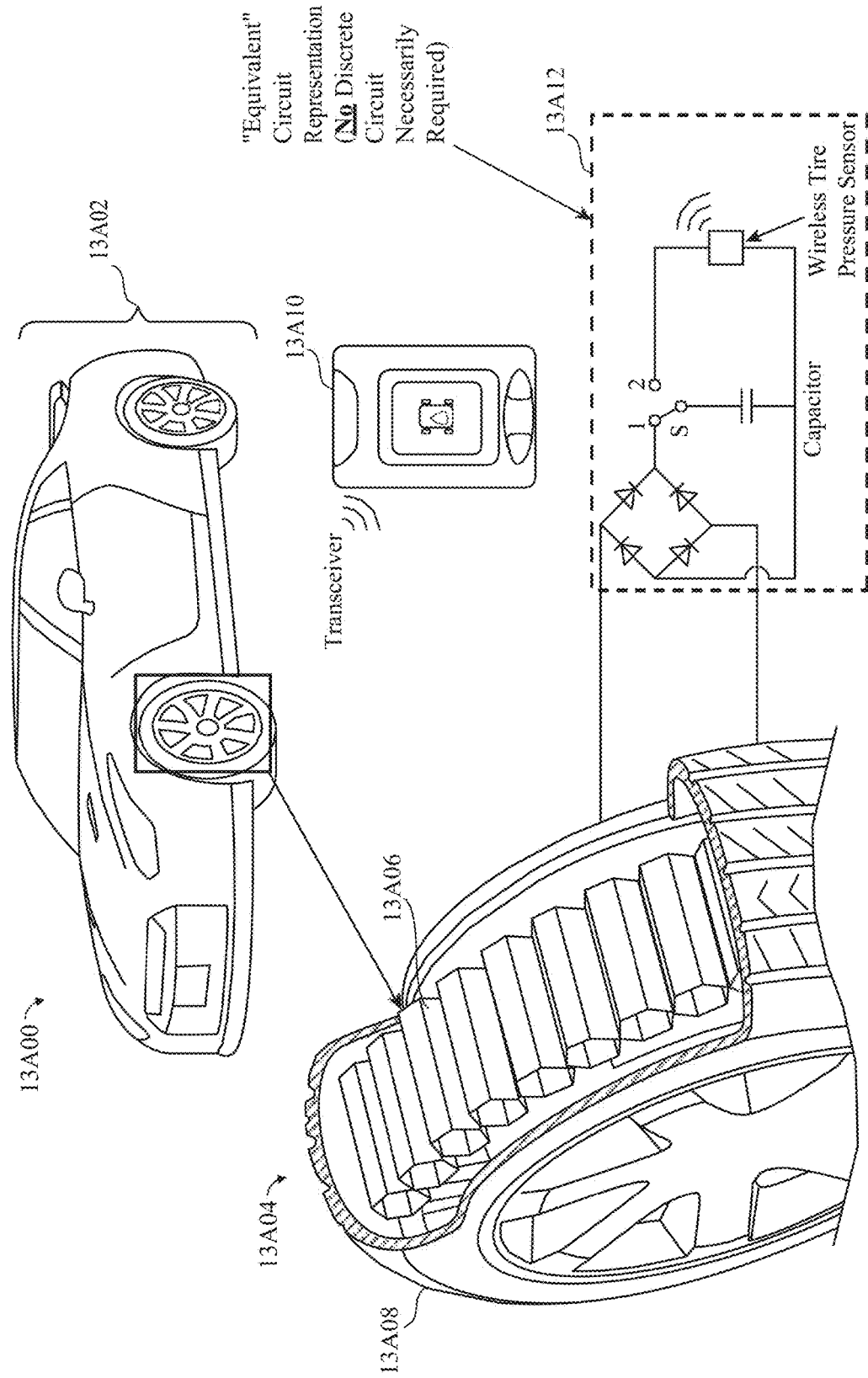
FIG. 13A illustrates schematic diagrams relating to various alternative triboelectric power generators incorporated in vehicle tires and a configuration of an array of compressible hexagonal-structured triboelectric energy nanogenerators (CH-TENGs) fixed within a rubber pneumatic tire, according to some implementations.
Figure 13B:
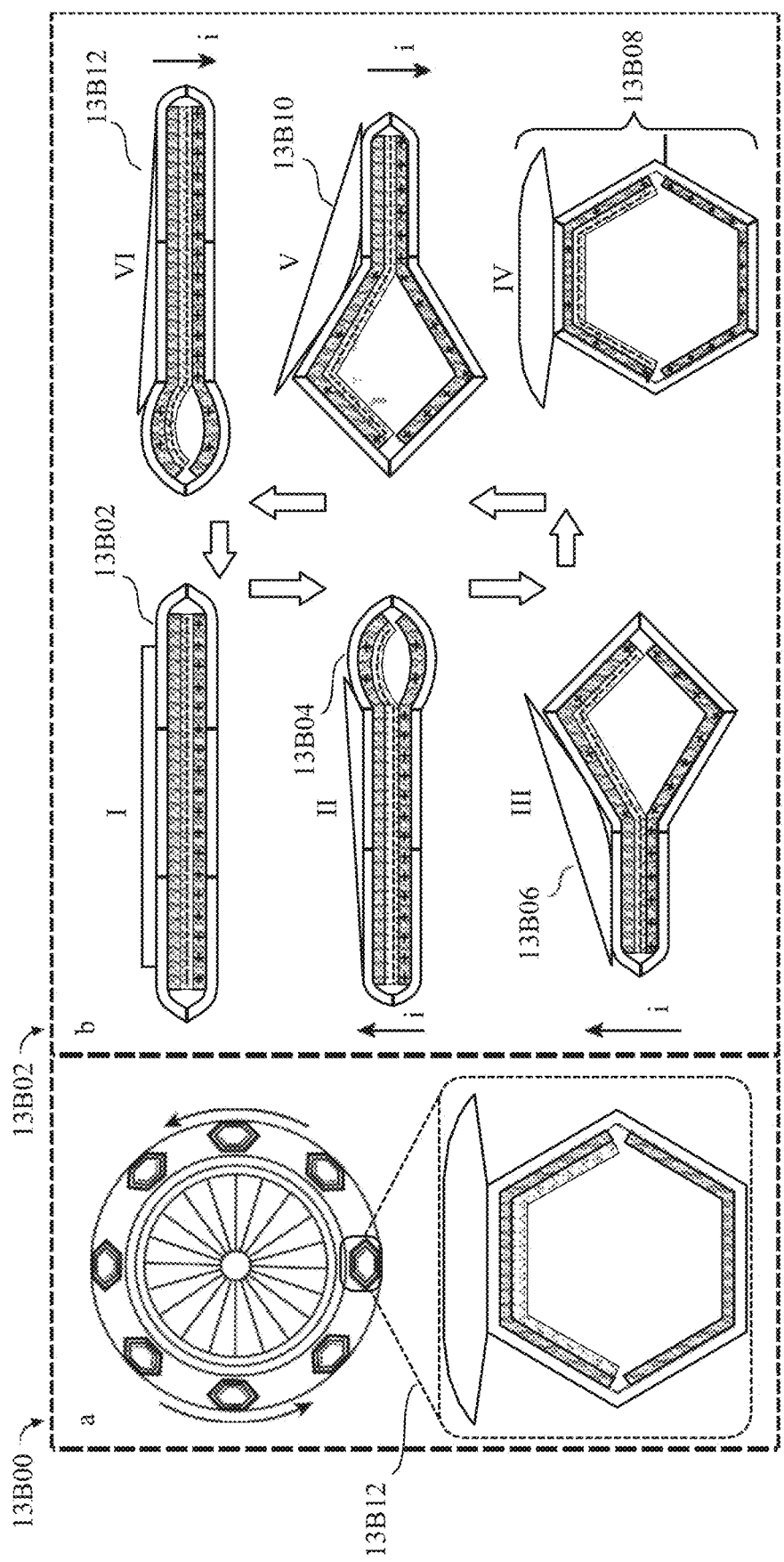
FIG. 13B illustrates various types of triboelectric energy generator configurations intended for incorporation within a vehicle tire, according to some implementations.

FIG. 13A illustrates schematic diagrams relating to a vehicle equipped with a system 13A00 (inclusive of triboelectric energy generators in, for example, an actual form, as realized as electric and/or discrete circuits, as well as a representative form, as an "equivalent" circuit, as to be further detailed below) incorporated in tires 13A04 of a vehicle 13A02 (of any type, such as traditional pneumatic tires as well as next-generation solid air-less tires). System 13A00 can include a configuration of an array of compressible hexagonal-structured triboelectric energy nanogenerators (CH-TENGs) 13A06 fixed within a body 13A08 or within one or more tread layers of one of the tires 13A04. CH-TENGs 13A06 can be substantially like any of the triboelectric power generation means presently disclosed (and function accordingly), but with each of the triboelectric energy generators having a substantially hexagonal shape. Other potential representations 13B02 are shown in FIG. 13B.

CH-TENGs 13A06 can generate charge usable to create electric current suitable to power resonators capable of further emitting signals emitted by a transceiver 13A10 (capable of both transmitting and receiving electromagnetic radiation in the form of signals). Certain configurations of the CH-TENGS 13A06 can also include traditional electronic components such as a rectifier and a capacitor to communicate with a wireless tire pressure sensor that may be a part of a tire-pressure monitoring system (TPMS) to provide a holistic tire wear monitoring solution.

System 13A00 can include at least three (3) types of components, functionalities, and/or sub-systems related to the detection and communication of aberrations to the tire, including equipment that functions by:

Emitting a RF signal, such as by a transceiver 13A10, or further emitted by a resonator;

Resonating in response to an RF signal (more specifically, generating a respective resonant signal by resonating in response to an excitation signal), such as that performed by a traditional LC, resonant and/or tank circuit (or any other discrete circuit element), and/or carbon-containing microstructures tuned to resonate and/or attenuate signals at known frequencies and/or intensity levels; and Shifting the frequency of and/or attenuating the RF signal, as performed by sensors made of carbon-containing materials, or entire surfaces such as vehicle tire tread layers and/or plies including mixtures at fixed or vary concentration levels, etc.

Generally, resonators can be realized in discrete form, that is, as an LC circuit, also called a resonant circuit, tank circuit, or tuned circuit. This type of resonator is an electric circuit consisting of discrete components such as an inductor, represented by the letter L, and a capacitor, represented by the letter C, connected together. The circuit can act as an electrical resonator, an electrical analogue of an acoustic wave tuning fork, storing energy and emitting energy that is oscillating at the circuit's natural resonant frequency.

LC circuits can be used either for generating signals at a particular frequency or picking out a signal at a particular frequency from a more complex signal; this function is referred to as "a bandpass filter". They are key components in many electronic devices, particularly radio equipment, used in circuits such as oscillators, filters, tuners and frequency mixers.

However, the incorporation of discrete electronic components into a potential high-abrasion area such as vehicle tire tread layers exposed to contact with pavement or the ground, for example, can be problematic in view of possible unwanted degradation and breakage of such components, such as traditional LC circuits as so described above, due to wear and tear and/or increased temperatures, etc.

Accordingly, the resonators can be, in some implementations, made from solely carbon-containing microstructures and related materials independent of any discrete electronics. Such carbon-containing microstructures can form sensors that can be either embedded within tire plies of the body of the tire, or within tire tread layers, or both. Further, carbon-containing microstructures can be mixed into tire formative materials (such as rubber) to be present within one or more plies and/or tire tread layers at, for example, varying, similar (or even identical) concentration levels that may impact signal generation performance.

Sensors, plies and/or tire tread layers made from carbon-containing microstructures can effectively and entirely replace traditional discrete circuit components, such as the resonant circuit described above, by providing equivalent (at least substantially identical) functionality and performance, and can thus be represented by an equivalent circuit 13A12, which can be powered by the CH-TENGs 13A06, or not, by generating a respective resonant signal by resonating in response to an excitation signal (such as that emitted by a transceiver). An equivalent circuit refers to a theoretical circuit that retains all of the electrical characteristics of a given circuit (such as a resonant circuit), but is made up of linear, passive elements (and thus does not necessarily require the usage of traditional discrete circuit elements).

Accordingly, unwanted breakage of traditional discrete circuits can be avoided by implementing sensors, plies and/or tire tread layers made from carbon-containing microstructures that act as equivalent circuits. In such a configuration, there are no discrete electronic component devices installed inside the tire. Rather, the one or more various tire tread layers and/or tire body plies of the tire can be composed of (and/or otherwise include sensors made from) carbon-containing tuned microstructural resonance materials that resonate at a known frequency or that resonate within a known frequency range to facilitate accurate and precise identification of component wear.

FIG. 13B illustrates various types of triboelectric energy generator configurations 13B00 intended for incorporation within a vehicle tire. Such configurations can be substantially hexagonal, such as that shown by enlarged section 13B12, or take on any of the forms shown by structures I-VI, shown by an example configuration schematic 13B02, an example configuration schematic 13B04, an example configuration schematic 13B06, an example configuration schematic 13B08, an example configuration schematic 13B10, and an example configuration schematic 13B12, respectively, during cyclical compression and decompression cycles (referred to colloquially as being "squished") proportionate to tire body ply and/or tread layer contact with the ground, given that the CH-TENGs can be included within the tire plies (as shown in the body 13A08 of the tire 13A04 shown in FIG. 13A) and compress according to tire compression. Cyclical compression-decompression behavior can facilitate electric charge harvesting capabilities of the CH-TENGs.

Generally, tire-pressure monitoring system (TPMS), which may be suitable for incorporation with any one or more of the aforementioned example systems and structures, refers to an electronic system designed to monitor the air pressure inside the pneumatic tires on various types of vehicles. A TPMS reports real-time tire-pressure information to the driver of the vehicle, either via a gauge, a pictogram display, or a simple low-pressure warning light. TPMS can be divided into two different types—direct (dTPMS) and indirect (iTPMS). TPMS are provided both at an OEM (factory) level as well as an aftermarket solution. The target of a TPMS is avoiding traffic accidents, poor fuel economy, and increased tire wear due to underinflated tires through early recognition of a hazardous state of the tires.

Any of the disclosed methods, systems and materials can functionally combine with any type of TPMS to support TPMS functionality to provide additional, heightened, tire deterioration information. As presented, iTPMS can monitor any of: speed, vibration, wheel radius, and can employ more advanced methods, including usage of Kalman filters (also known as linear quadratic estimation, LQE, an algorithm that uses a series of measurements observed over time, containing statistical noise and other inaccuracies, and produces estimates of unknown variables that tend to be more accurate than those based on a single measurement alone, by estimating a joint probability distribution over the variables for each timeframe) along with strain, temperature, and acceleration to determine deformation and friction (essentially "piggybacking" off, referring to relying on the functionality of, existing anti-lock braking system, ABS, sensor suite). And, dTPMS can couple with or otherwise functionality integrate with the following capabilities and/or technologies (at a minimum):

Capacitive sensors and/or energy generators: two surfaces come in contact (wheel rim, valve, $Nb_2O_5$ active material)

Strain gauge: polyimide based although film is much stiffer than rubber (debonding)

Surface acoustic wave (SAW) sensors, which are a class of microelectromechanical systems (MEMS) which rely on the modulation of surface acoustic waves to sense a physical phenomenon; the sensor transduces an input electrical signal into a mechanical wave which, unlike an electrical signal, can be easily influenced by physical phenomena; the device then transduces this wave back into an electrical signal; changes in amplitude, phase, frequency, or time-delay between the input and output electrical signals can be used to measure the presence of the desired phenomenon; SAW: interdigitated electrodes on piezoelectric substrate;

Fabry-Pérot interferometer (FPI) or etalon is an optical cavity made from two parallel reflecting surfaces (such as thin mirrors); optical waves can pass through the optical cavity only when they are in resonance with it;

Hall effect sensors, referring to devices that are used to measure the magnitude of a magnetic field; its output voltage is directly proportional to the magnetic field strength through it; Hall effect sensors are used for proximity sensing, positioning, speed detection, and current sensing applications tread deformation (GaAs on ceramic);

MEMS (micro-electric mechanical systems, referring to the technology of microscopic devices, particularly those with moving parts)

Non-contact ultrasonic systems (mounted base of wheel rim inside tire); and

Electric resistor-condenser parallel circuit integrated on steel wire belt.

Graphene and/or other ordered carbon-based sensors can combine with the aforementioned TPMS systems and employ any one or more of the following sensor types and/or variants:

Capacitive;

Strain gauge; and

Piezoelectric-based sensors (ZnO coated carbon nanotubes, CNTs).

Figure 14A:
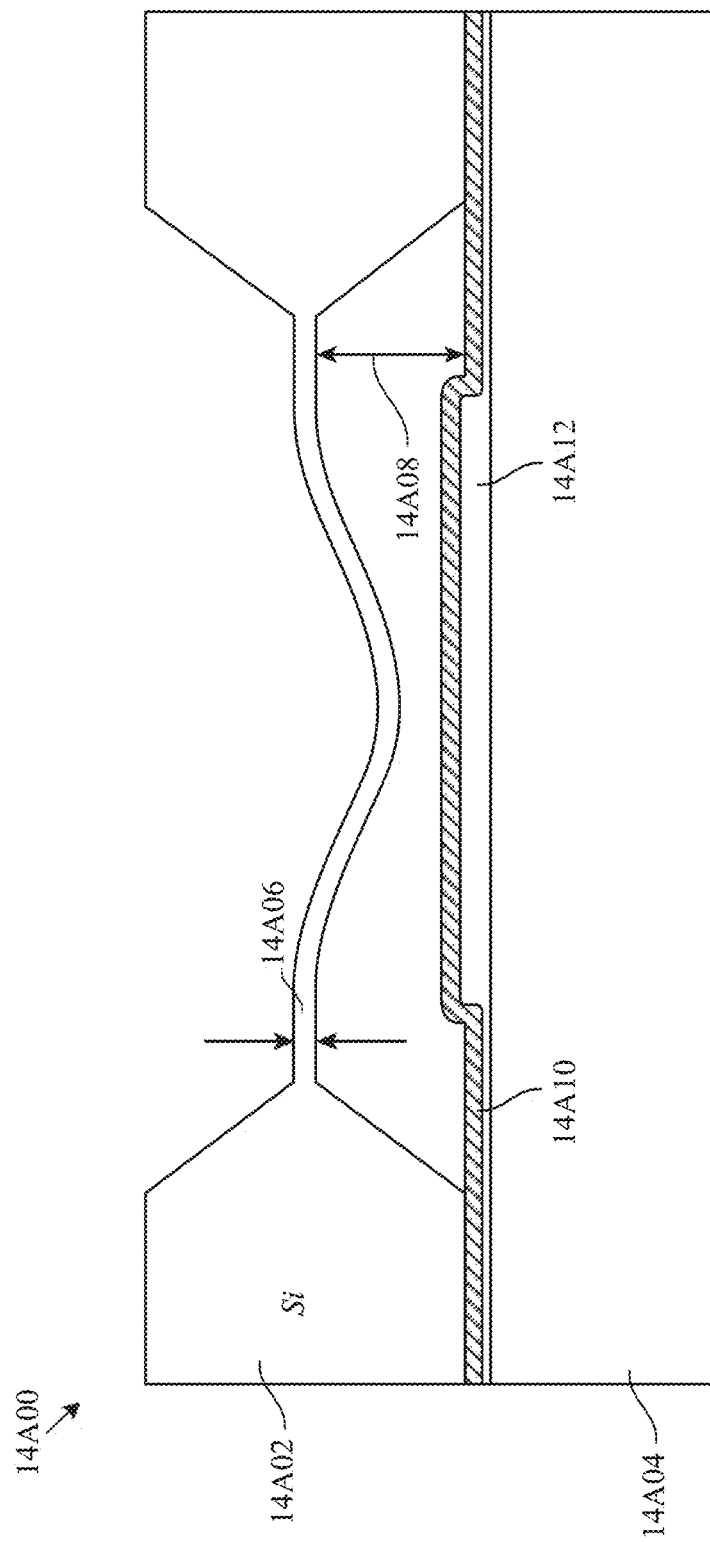
FIG. 14A is a schematic side-view of a substrate incorporating a substrate electrode, according to some implementations.

FIG. 14A is a schematic side-view of a substrate assembly 14A00 incorporating a substrate 14A04. The substrate assembly 14A00 be a part of an ABS sensor suite and can interact or function with any of the presently disclosed systems, methods, and materials incorporating, for example, carbon-based microstructures to provide power (in the form electric current) to resonators. The substrate assembly 14A00 can have a diaphragm thickness 14A06 that can expand (or compress) near a silicon-containing region 14A02 in response to exterior force (shown by the arrows), above a gap 14A08. The gap 14A08 can be disposed above an isolation layer 14A10 on top of a substrate electrode 14A12.

Figure 14B:
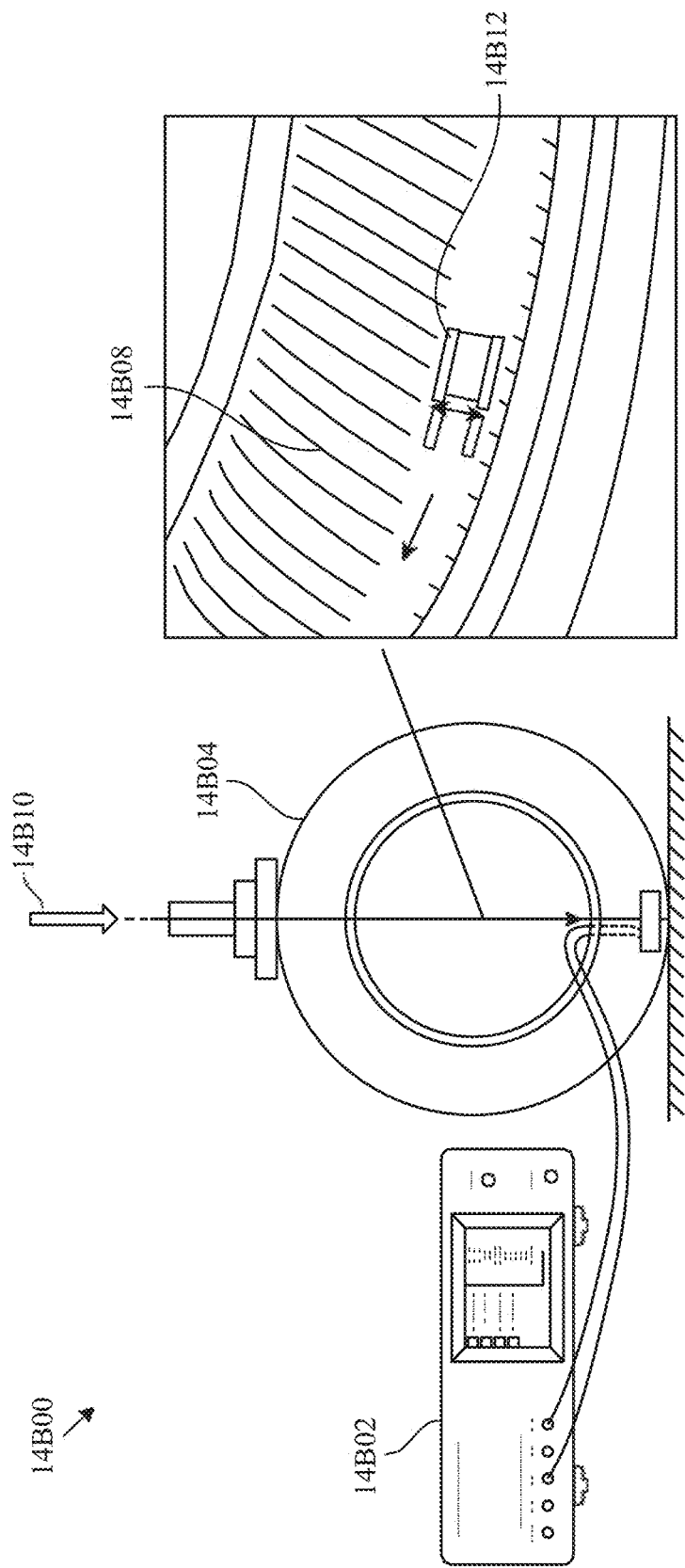
FIG. 14B is a schematic view of a polyimide-based strain gauge to monitor tire pressure, according to some implementations.

FIG. 14B is a schematic view of a polyimide-based strain gauge system 14B00 that can be configured to monitor tire pressure, including a computing resource 14B02, a strain gauge 14B04 responsive to an external applied force 14B10, and a capability to miniaturized to accommodate an on-tire-ply-fitment 14B12 on a tire body ply and/or tread layer 14B08. The polyimide-based strain gauge system 14B00 can be a part of a TPMS in communication with any of the presently disclosed systems, methods, and materials, to augment tire pressure detection capabilities with further detailed tire condition deterioration-related information.

Figure 14C:
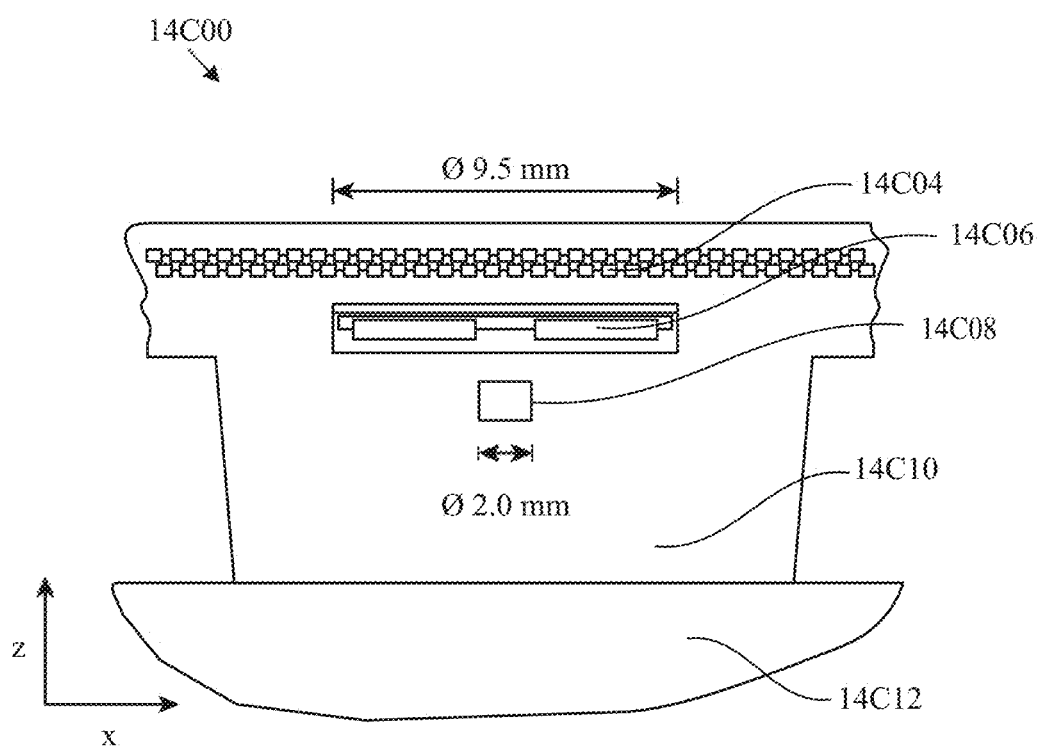
FIG. 14C is a schematic cut-away view of a hall sensor configured to detect vehicle tire tread deformation and incorporating gallium arsenide (GaAs) on ceramic, according to some implementations.

FIG. 14C is a schematic cut-away view of a hall sensor system 14C00 configured to detect vehicle tire tread deformation and incorporating gallium arsenide (GaAs) on ceramic. The hall sensor system 14C00 can be a part of a TPMS in communication with any of the presently disclosed systems, methods, and materials, to augment tire pressure detection capabilities with further detailed tire condition deterioration-related information. The hall sensor system 14C00 can include a steel cord 14C04, as a part of a vehicle tire. Gallium arsenide (GaAs) hall effect generators 14C06 function with a magnet 14C08 within a body 14C10 (of a tire) above tread elements which contact the road (shown as a pavement 14C12). Functioning of the hall sensor system 15D00 can generate electric charge and/or current usable to power resonators to ascertain tire condition information during vehicle operation.

Figure 14D:
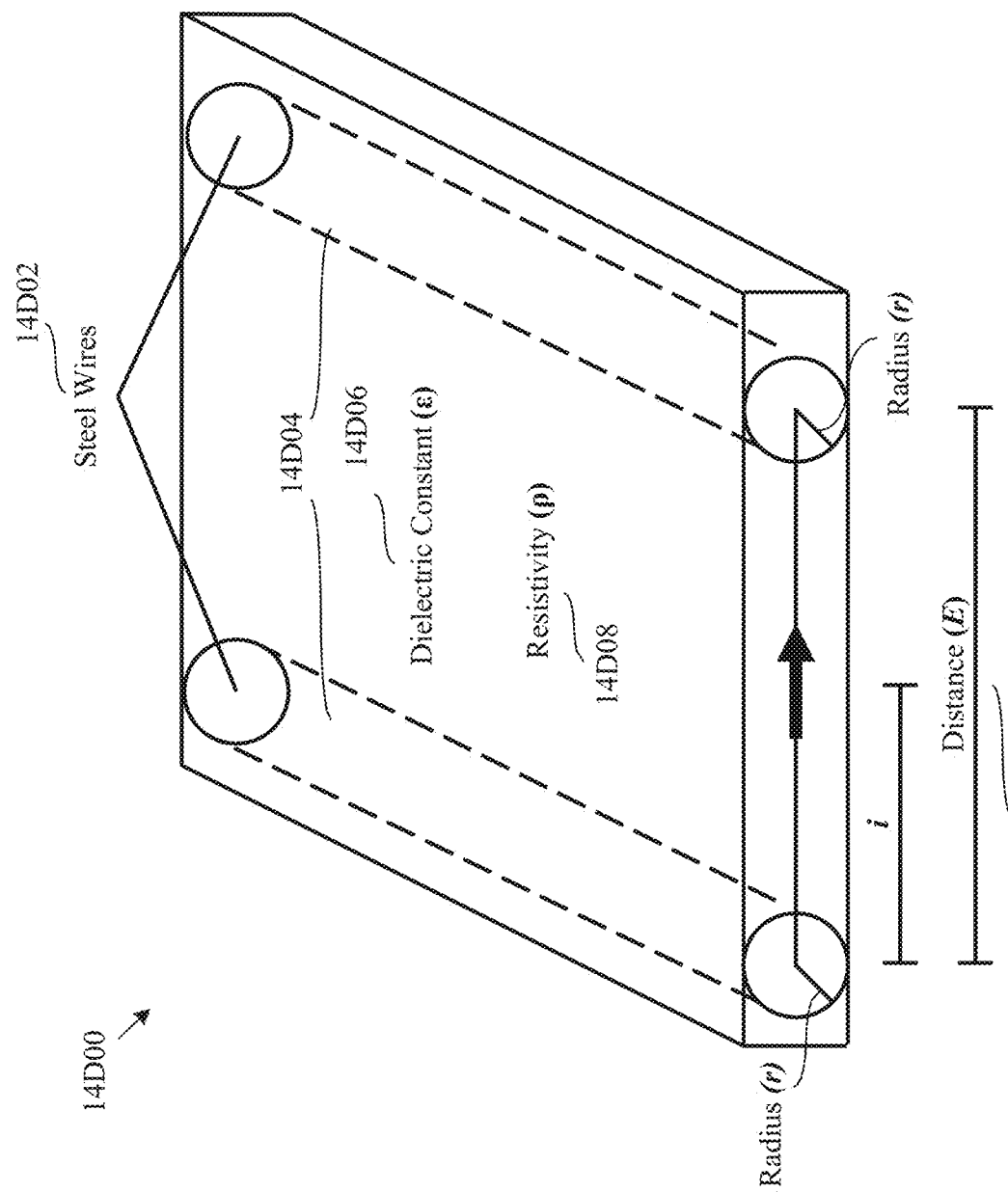

FIG. 14D shows a schematic diagram relating to a non-contact ultrasonic electric resistor-condenser parallel circuit 14D00 integrated on a pair 14D04 of steel wire belts 14D02 of within the body of a tire. Functioning of the non-contact ultrasonic electric resistor-condenser parallel circuit 14D00 can generate electric charge and/or current usable to power resonators (as presently disclosed) to ascertain tire condition information during vehicle operation. The pair 14D04 of the steel wire belts 14D02 can be positioned a defined distance 14D10 apart to demonstrate a quantifiable dielectric constant 14D06 and/or resistivity 14D08 values.

Figure 14E:
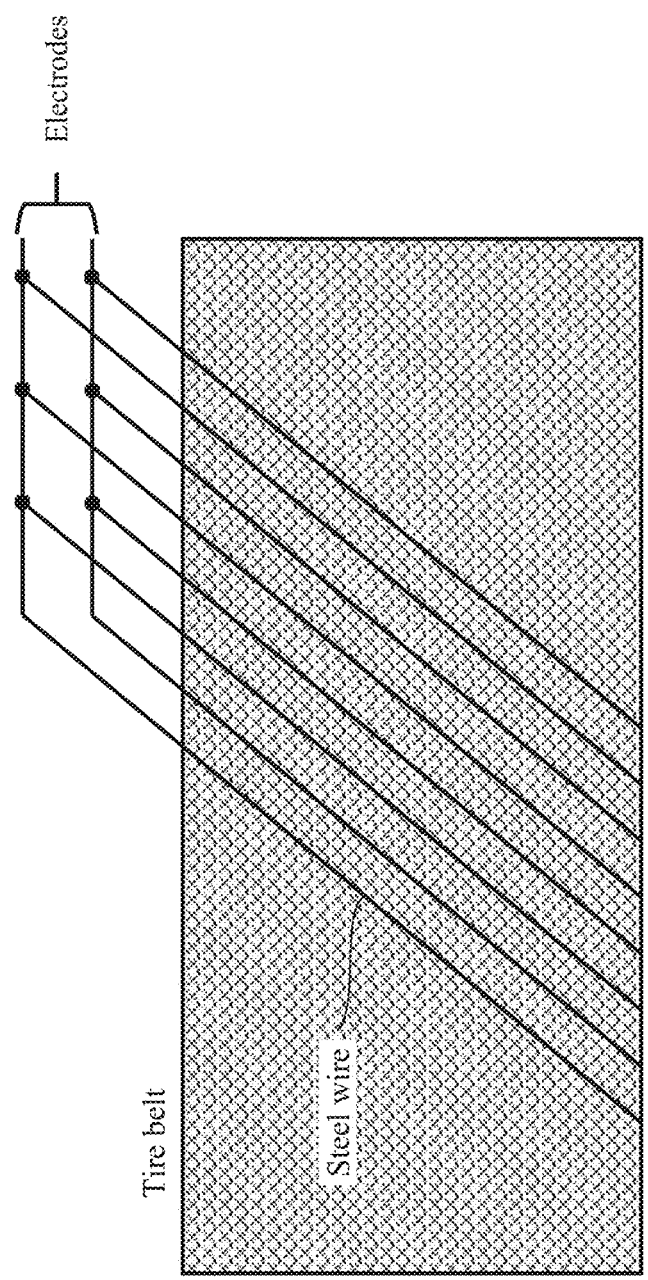

FIG. 14E shows another suitable configuration of the non-contact ultrasonic electric resistor-condenser parallel circuit 14E00 (non-contact referring to the lack of contact between individual steel wire belts), where steel wires are electrically coupled and/or connected with corresponding electrodes as may be necessary to store and transfer electric charge and/or conduct electric current to power the resonators as disclosed herein.

FIG. 14F shows a simplified schematic diagram of a representation of the non-contact ultrasonic electric resistor-condenser parallel circuit 14D00 (as shown in FIG. 14D) which can be, in some implementations, another type of "equivalent circuit" that features no discrete circuitry but instead implements a theoretical circuit composed of carbon-containing microstructures that exhibit all of the electrical characteristics of a given circuit. As an example, this equivalent electric circuit can include carbon-containing microstructural resonant materials that mimic the functionality of at least a capacitor (C) and resistor (R) that may be configured as necessary to resonate as needed for detection of frequency-shift behavior and/or signal attenuation as demonstrated by resonant materials.

Figure 14G:
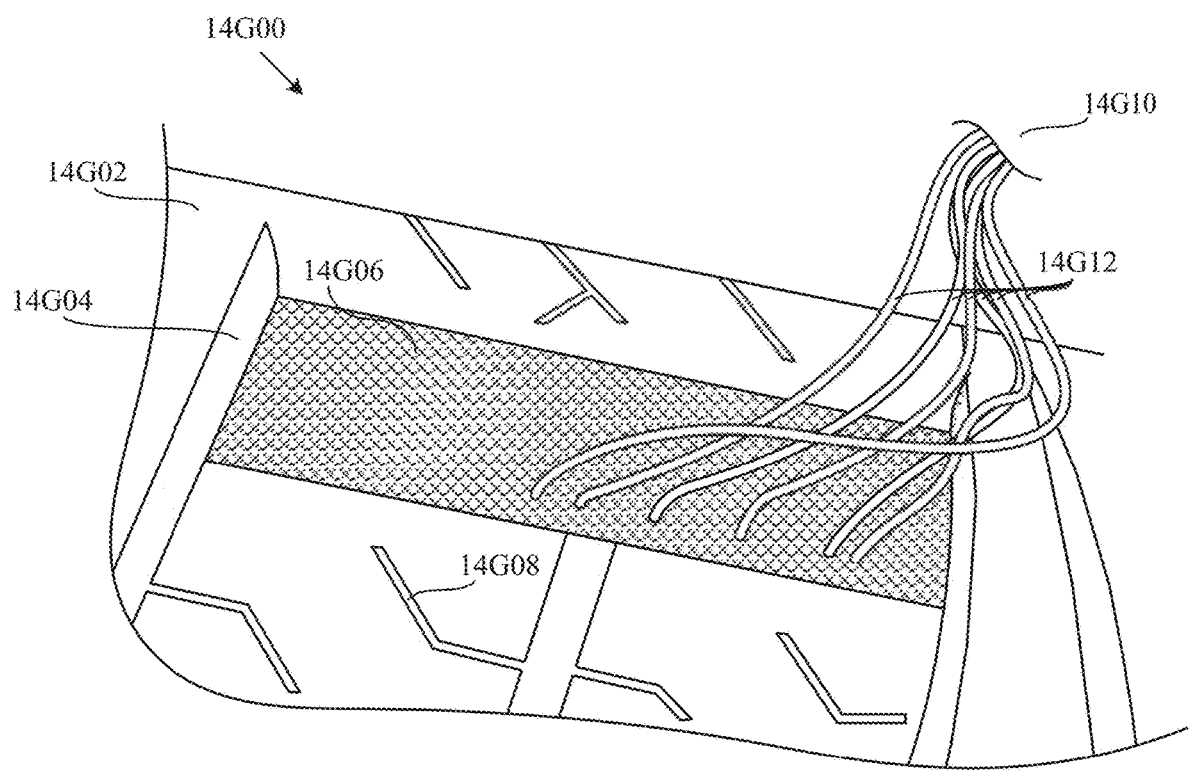

FIG. 14G shows a schematic diagram 14G00 of an electric resistor-condenser parallel circuit 14G10 (having multiple wires 14G12) integrated onto a steel wire belt 14G06 of a vehicle tire 14G02. The steel wire belt 14G06 can be in near a tire component (such as a sidewall) 14G04 without interfering with a tire tread pattern 14G08. The electric resistor-condenser parallel circuit 14G10 can generate usable electric charge and/or power or current through any one or more of the aforementioned means, such as by triboelectric principles, or otherwise, to provide such power to the resonators as presently disclosed.

Figure 15:
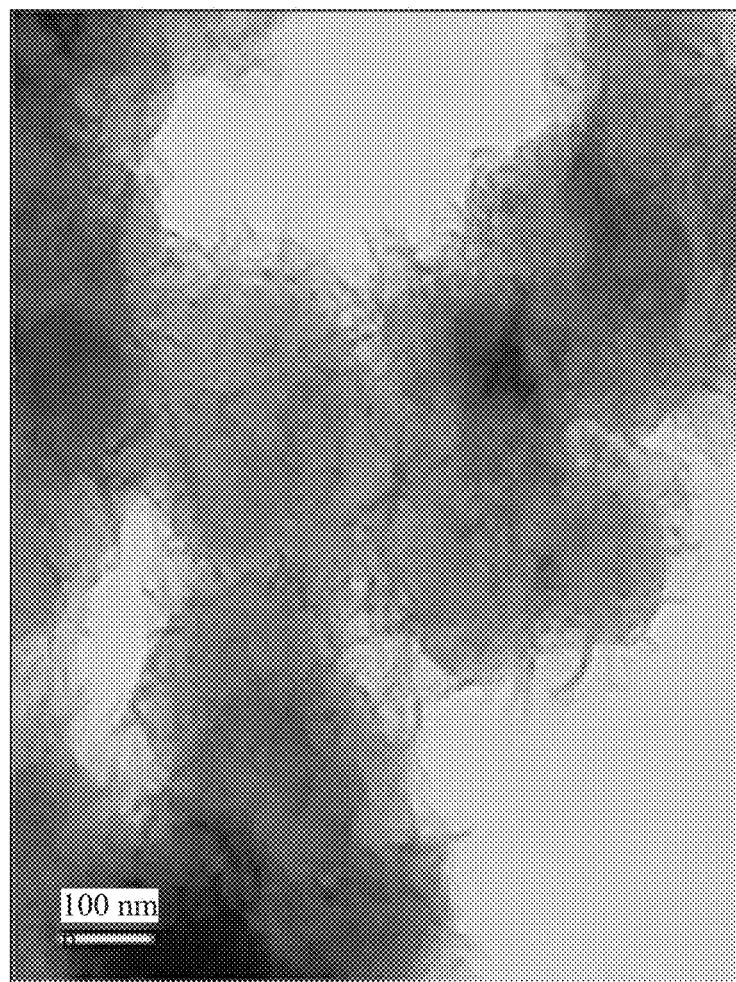
FIG. 15 through FIG. 17 depict structured carbons, various carbon nanoparticles, various carbon-based aggregates, and various three-dimensional carbon-containing assemblies that are grown over other materials, according to some implementations.
Figure 16:
Figure 17:
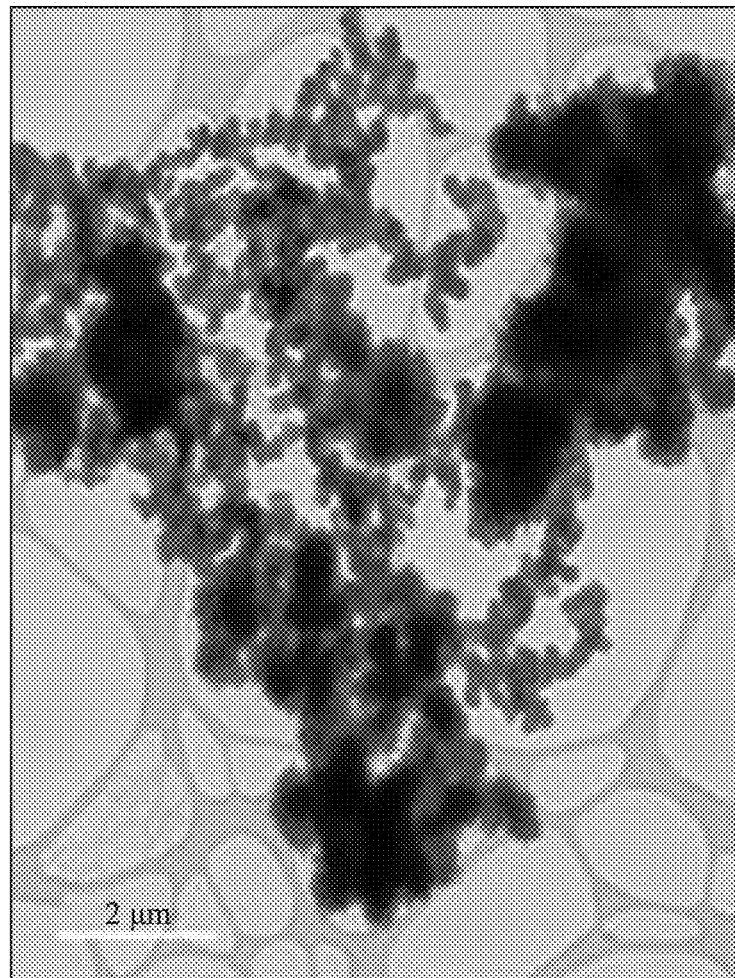

FIGS. 15-17 depict structured carbons, various carbon nanoparticles, various carbon-based aggregates, and various three-dimensional carbon-containing assemblies that are grown over other materials. That disclosed may be examples of the carbon-based microstructures as referred to herein.

Figure 18:
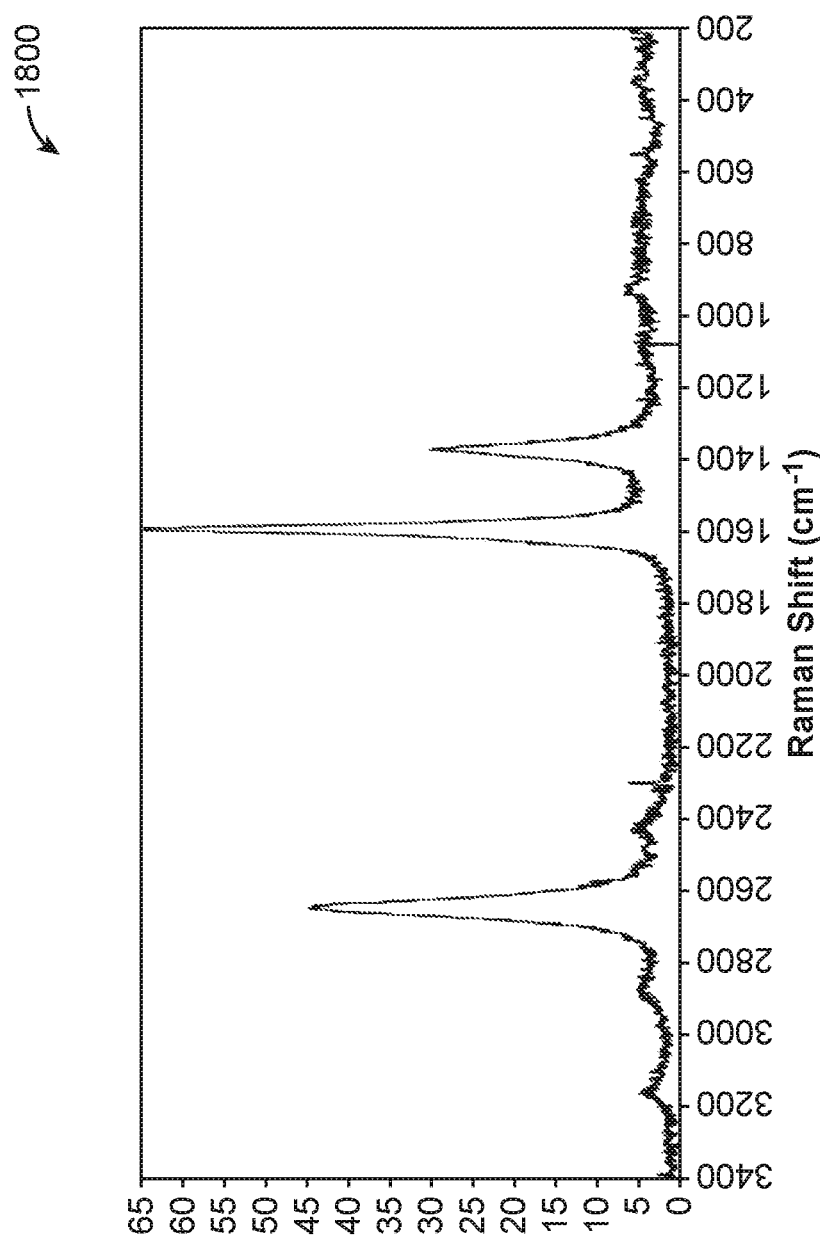
FIG. 18 illustrates a Raman shift plot for one or more of the structured carbons and/or the like shown in FIG. 15-17, according to some implementations.

FIG. 18 illustrates a Raman shift plot for one or more of the structured carbons and/or the like shown in FIGS. 16-18. Peaks are observed at (or around) approximately 2670 cm$^{-1}$, 1600 cm$^{-1}$, and 1380 cm$^{-1}$.

Figure 19:
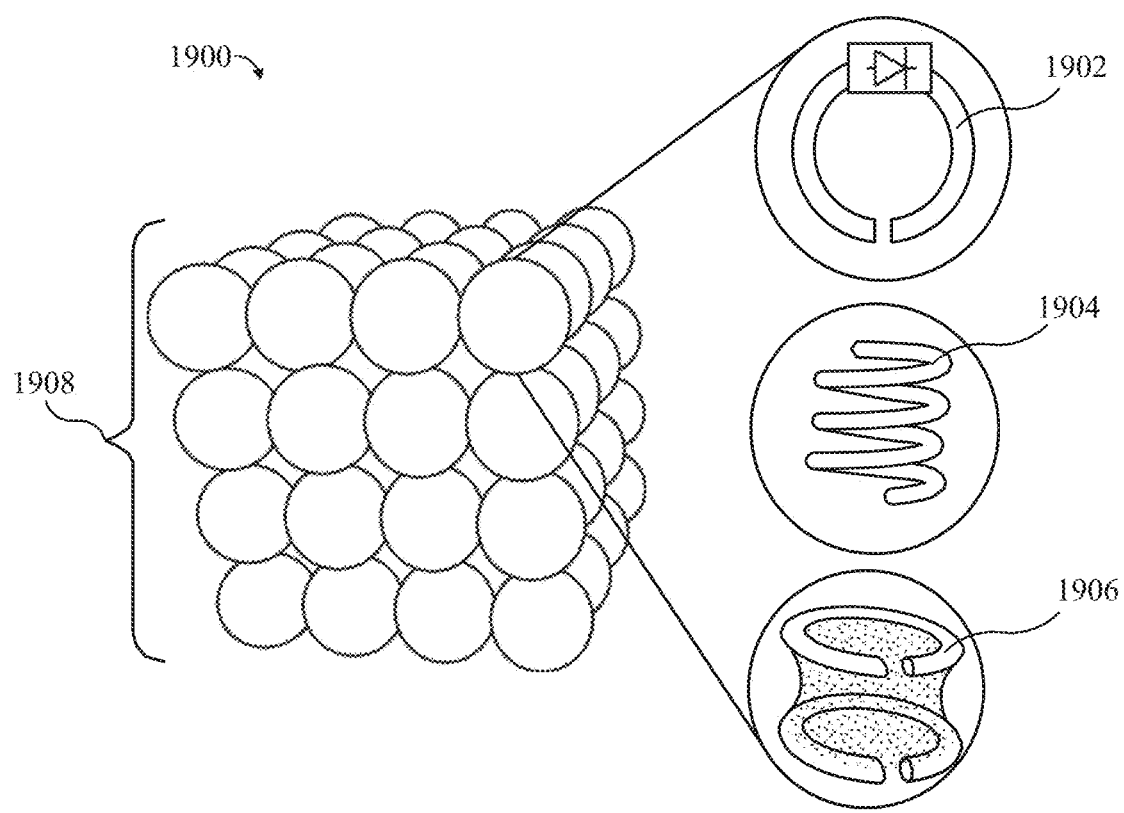
FIG. 19 illustrates a perspective view schematic diagram of an example lattice-style arrangement of constituent elements (such as rubber) in a tire tread layer and/or ply with resonant circuit components embedded within or in-between the elements, according to some implementations.

FIG. 19 illustrates a perspective view schematic diagram 1900 of an example lattice-style arrangement 1908 of constituent elements (such as rubber) in a tire body ply and/or tread layer with resonant circuit (also referred to herein as a "resonator") components, including an example resonant circuit configuration 1902, an example resonant circuit configuration 1904, and an example resonant circuit configuration 1906 embedded within or in-between the elements. Any conceivable configuration is possible for the resonant circuit components, where such configurations can have an impact on oscillation and/or resonation capabilities regarding further signal emission as may be relevant for ascertaining tire deterioration as presently disclosed herein.

Figure 20:
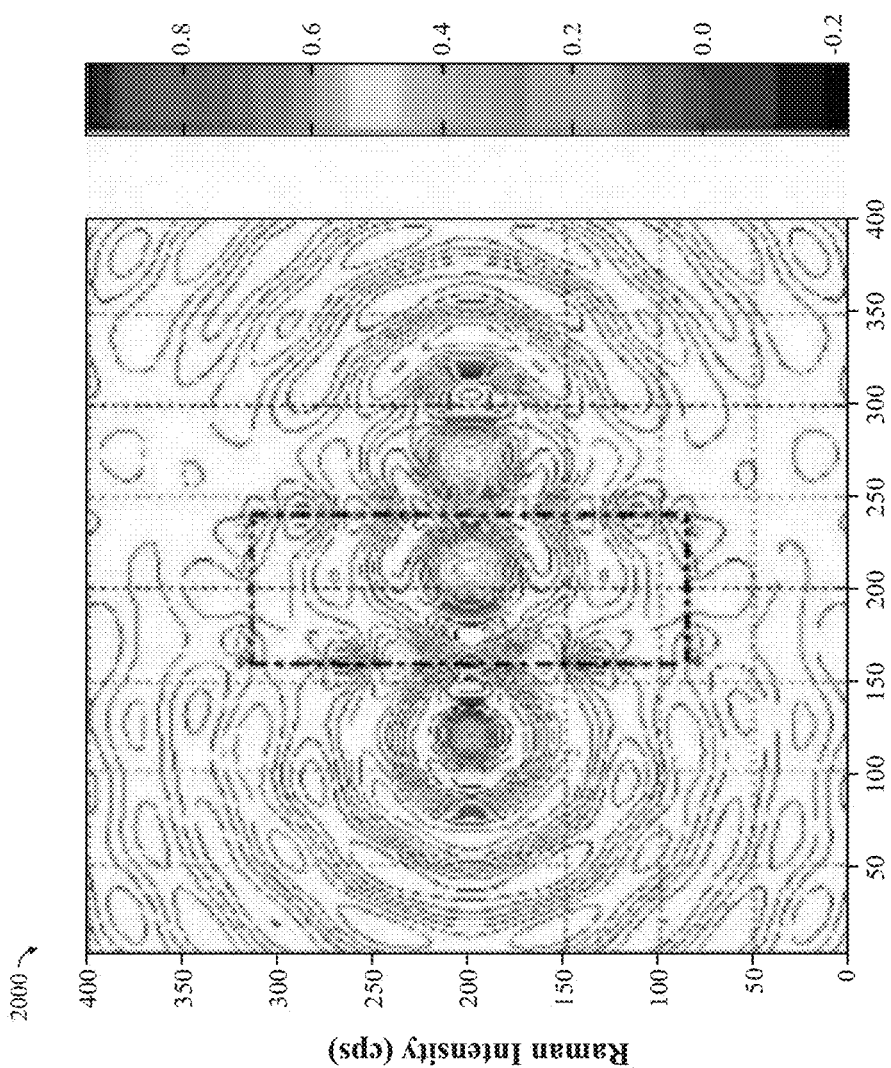
FIG. 20 is an example Raman intensity heat map or plot representative of signal attenuation associated with the resonant circuit shown in FIG. 21 when incorporated into a vehicle tire body ply and/or tread layer and in operation, according to some implementations.

FIG. 20 is an example Raman intensity heat map or plot representative of signal attenuation associated with the resonant circuit shown in FIG. 19 when incorporated into a vehicle tire body ply and/or tread layer and in operation.

Figure 21:
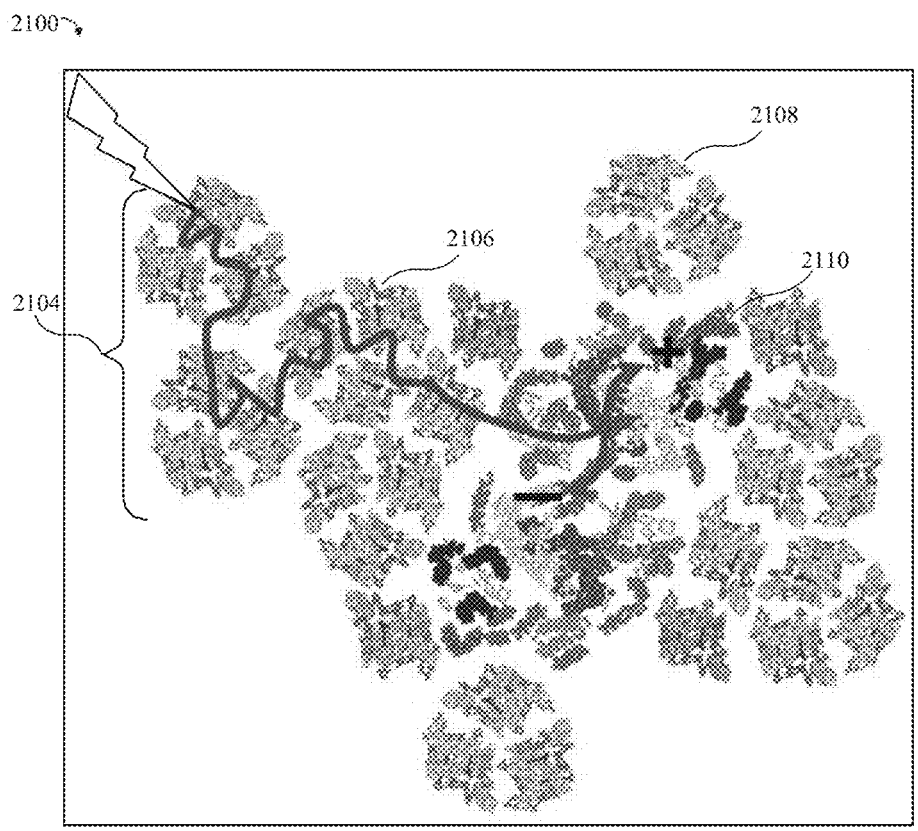
FIG. 21 is a schematic diagram showing an example configuration of self-assembled carbon-based particles, according to some implementations.

FIG. 21 is a schematic diagram showing an example configuration of self-assembled carbon-based particles having various agglomeration patterns 2106, 2108, and 2110 shown, any one or more of which can constitute a concentrated region 2104 that can impact the resonation performance of materials within which the carbon-based microstructures are incorporated.

Usage Overview
Deployment Examples

Any one or more of the foregoing techniques and materials may be combined into a manufacturing process for surface sensors intended to be embedded in vehicle-related materials and/or surfaces, such as tire ply. An automotive surface sensor can be manufactured by selecting a carbon allotrope based at least in part on a specified frequency, mixing the carbon allotrope with other ingredients of a composite material, and then forming the automotive surface sensor using the composite material. The automotive surface sensor will resonate at the specified frequency when stimulated by electromagnetic emissions (RF signals) of the specified frequency.

Further, any or all the foregoing techniques and materials may be combined into a manufacturing process for tires. An automotive tire can be manufactured by selecting a carbon allotrope based at least in part on a specified frequency, mixing the carbon allotrope with other ingredients that are used in one or more tire materials, and then combining the one or more tire materials with additional tire components to assemble the tire. The tire materials will resonate at a specified frequency when stimulated by electromagnetic emissions of the specified frequency. Moreover, such resonation can be caused by proximal electromagnetic radiation (such as, a ping) of the specified frequency. Strictly as one example, a tuned antenna that emits proximal electromagnetic radiation of the specified frequency can be in a wheel well of a vehicle.

Structured Carbon Overview
Additional Structured Carbon Examples

Figure 22D:
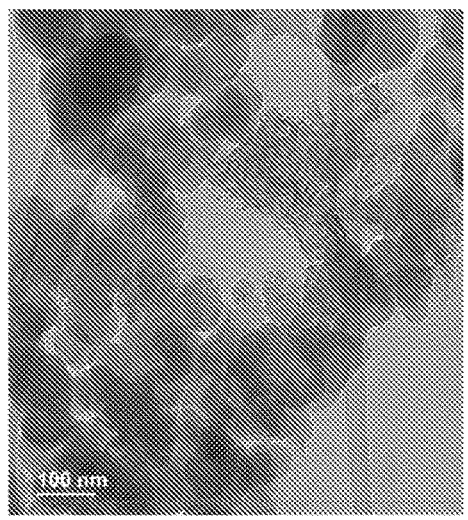
FIG. 22A through FIG. 22Y depict structured carbons, various carbon nanoparticles, various carbon-based aggregates, and various three-dimensional carbon-containing assemblies that are grown over other materials, according to some implementations.
Figure 22E:
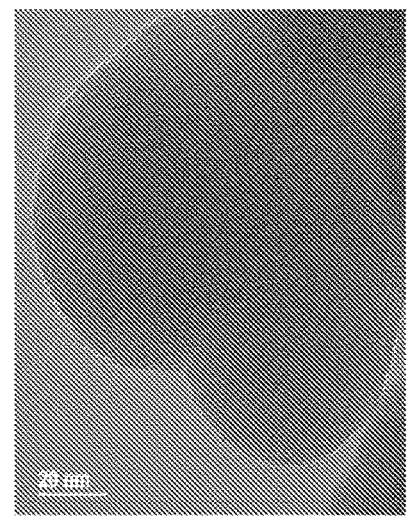
Figure 22F:
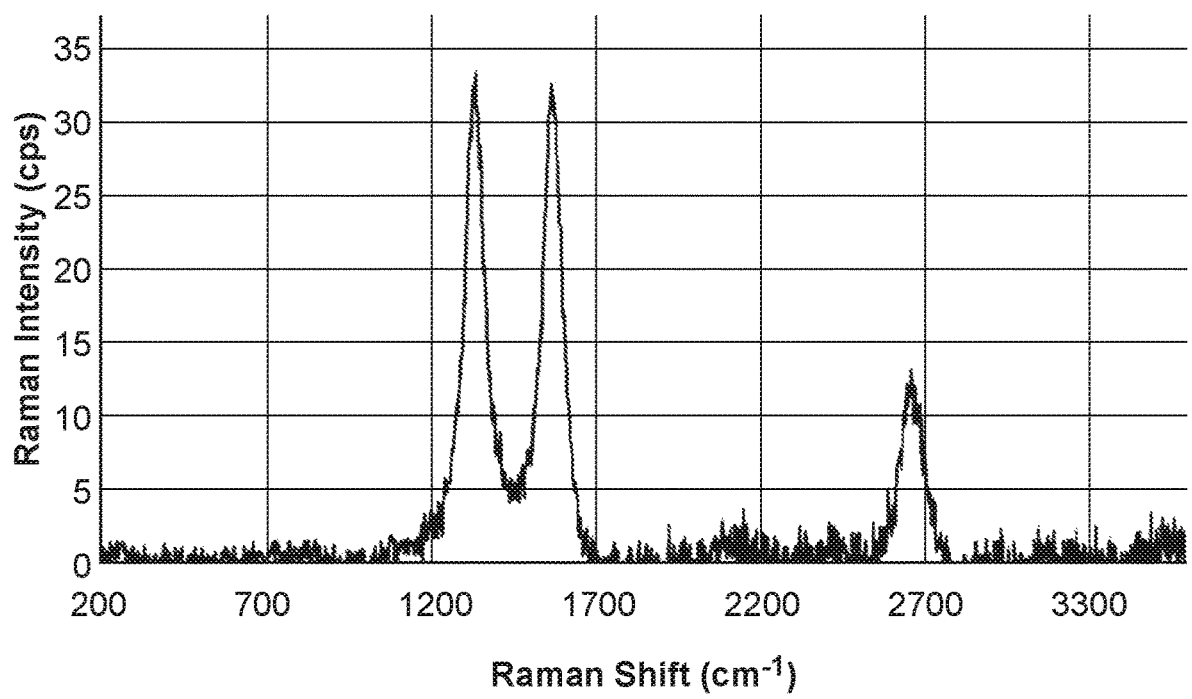
Figure 22G:
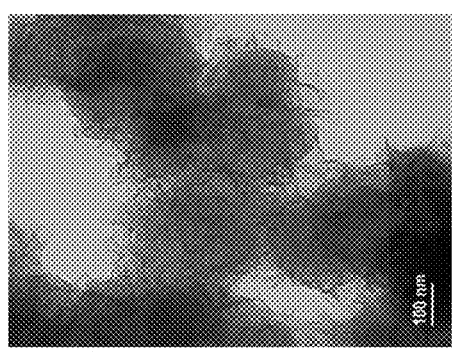
Figure 22H:
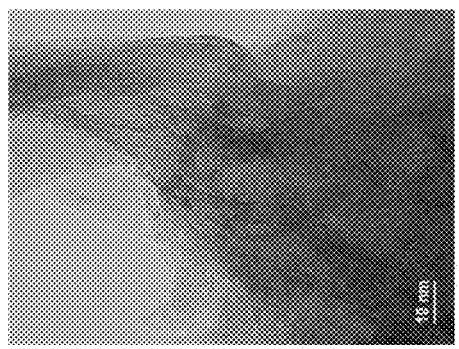
Figure 22I:
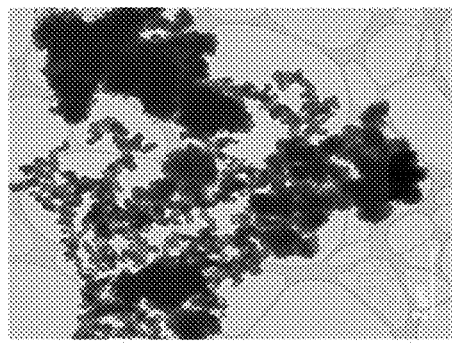
Figure 22J:
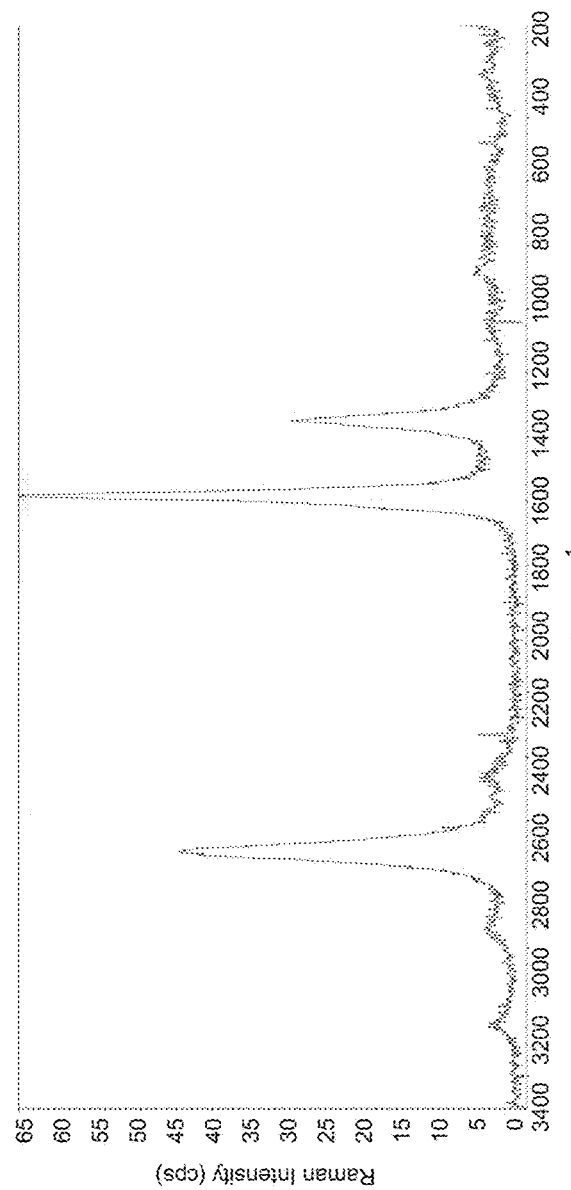
Figure 22K:
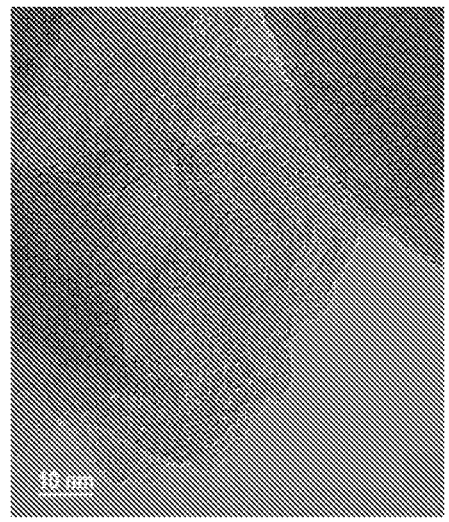
Figure 22L:
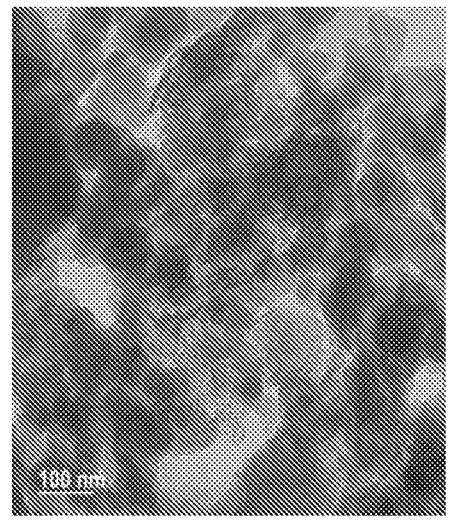
Figure 22M:
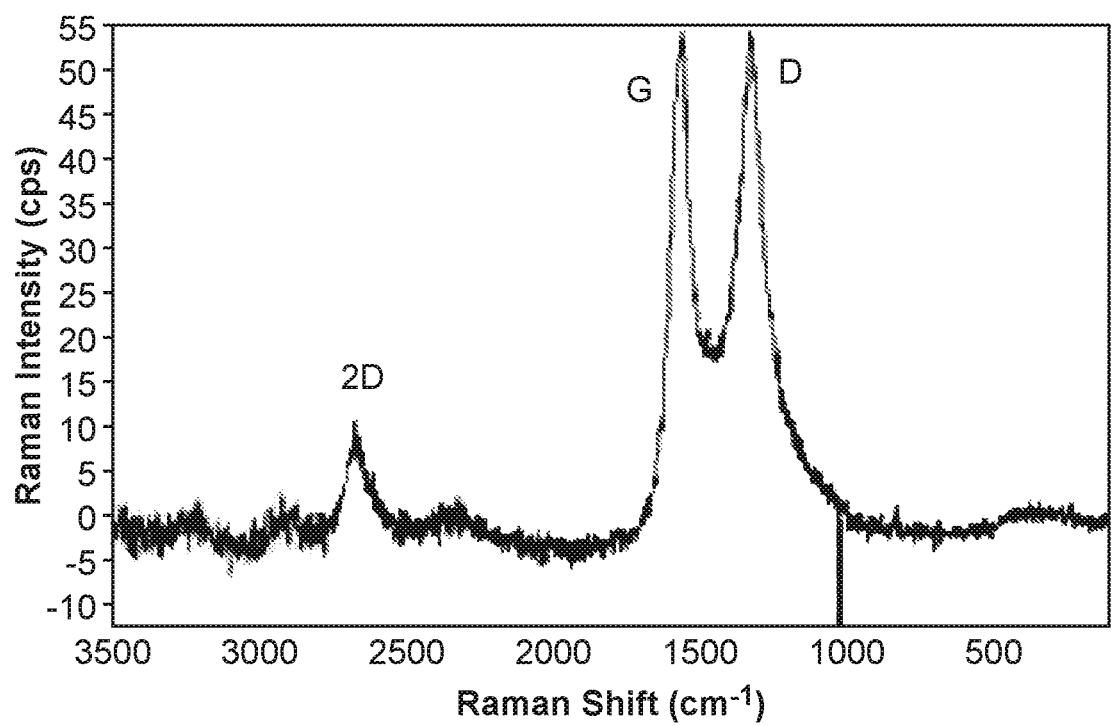
Figure 22N:
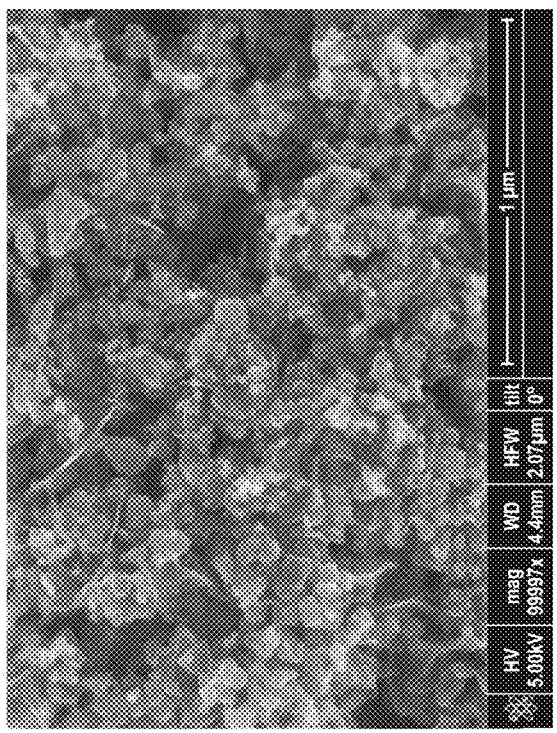
Figure 22O:
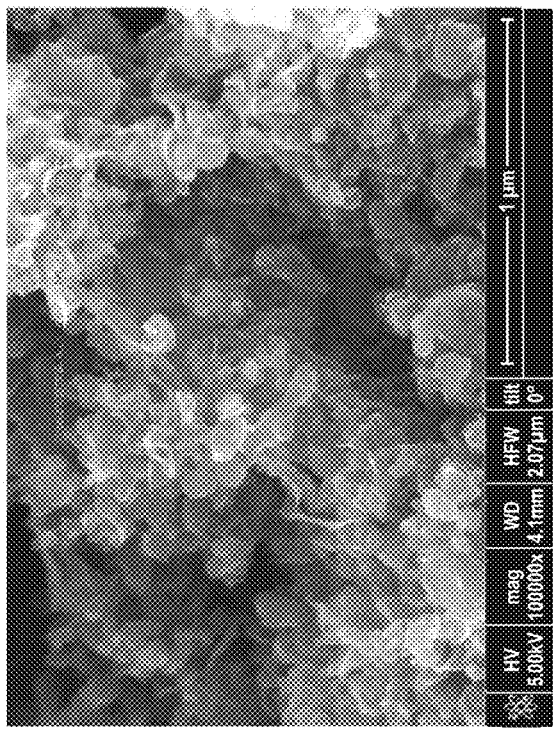
Figure 22P:
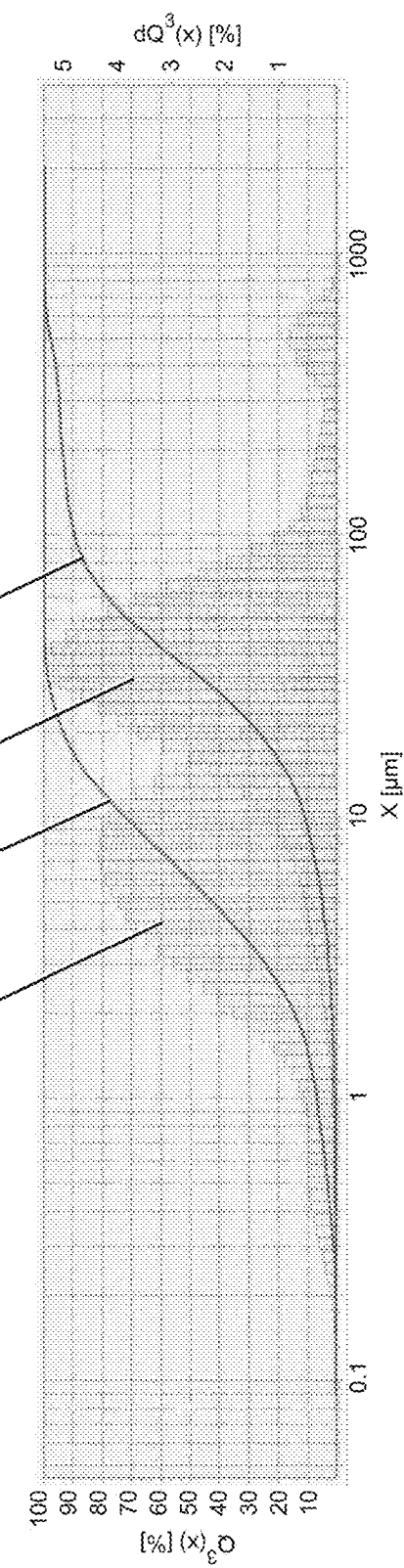
Figure 22Q:
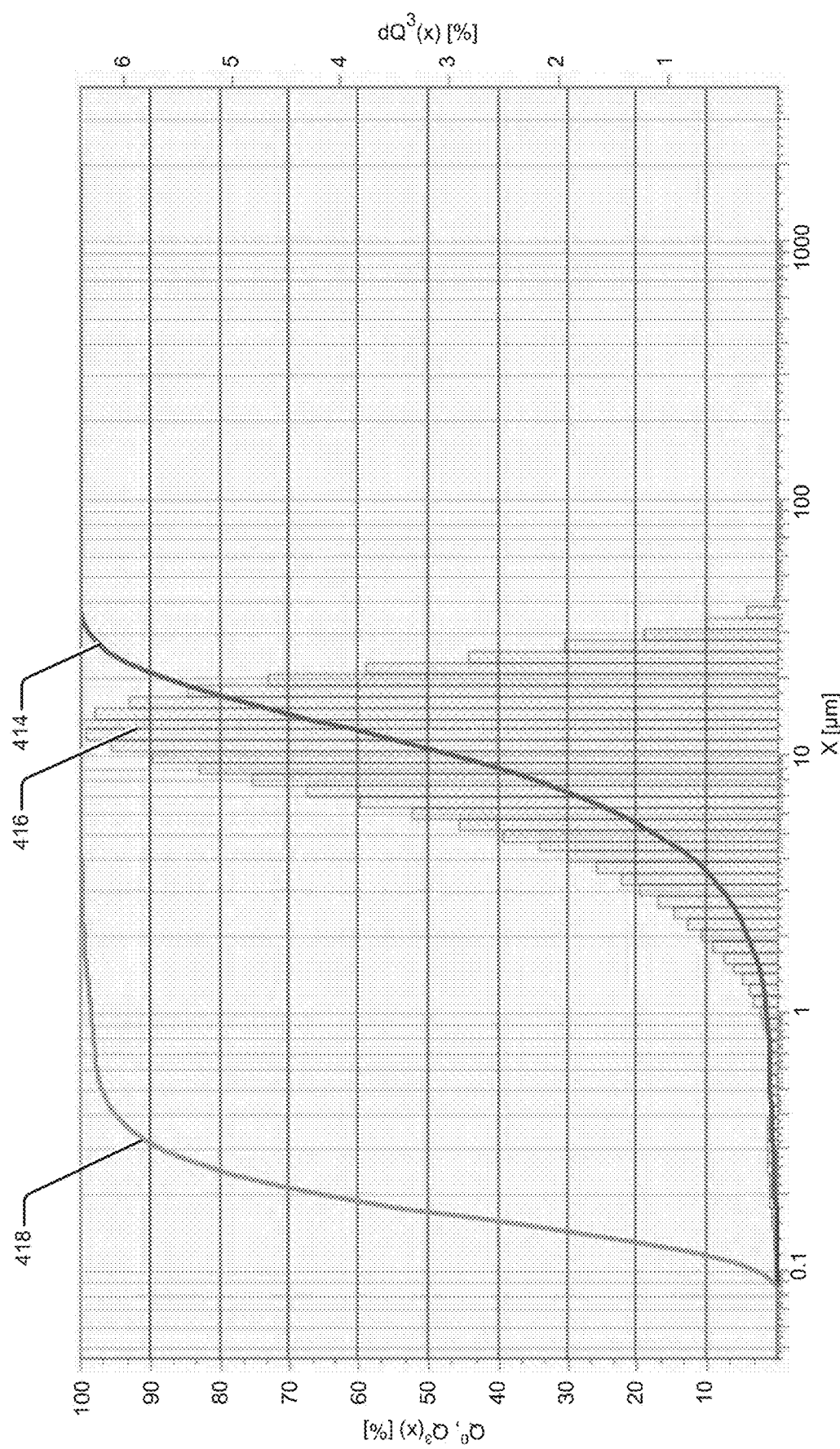
Figure 22T:
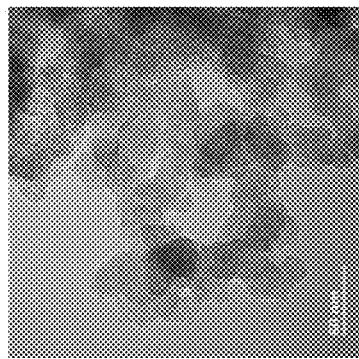
Figure 22S:
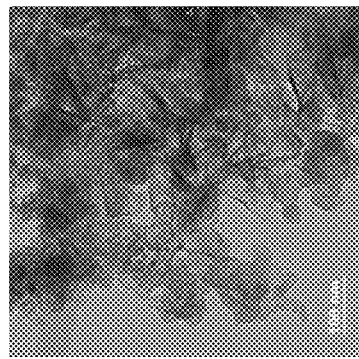
Figure 22R:
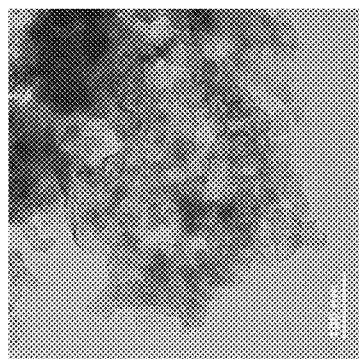
Figure 22U:
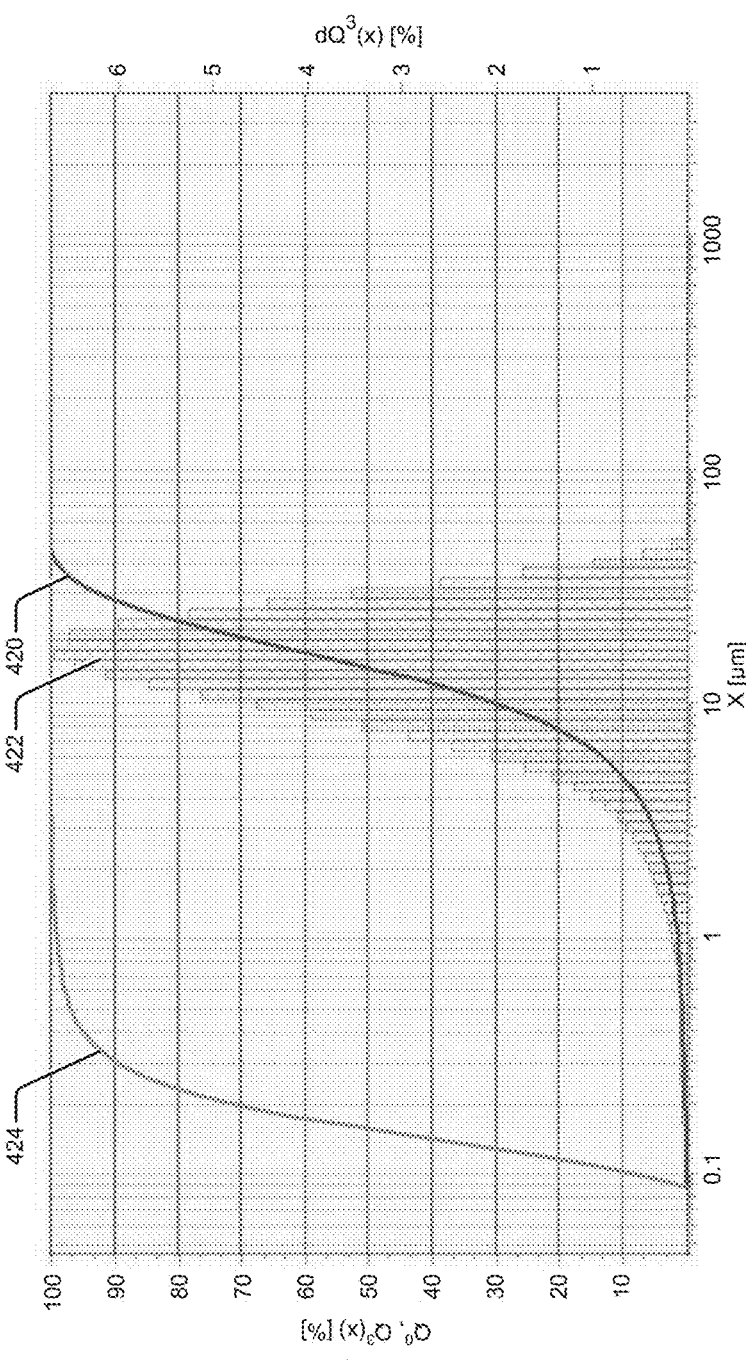
Figure 22V:
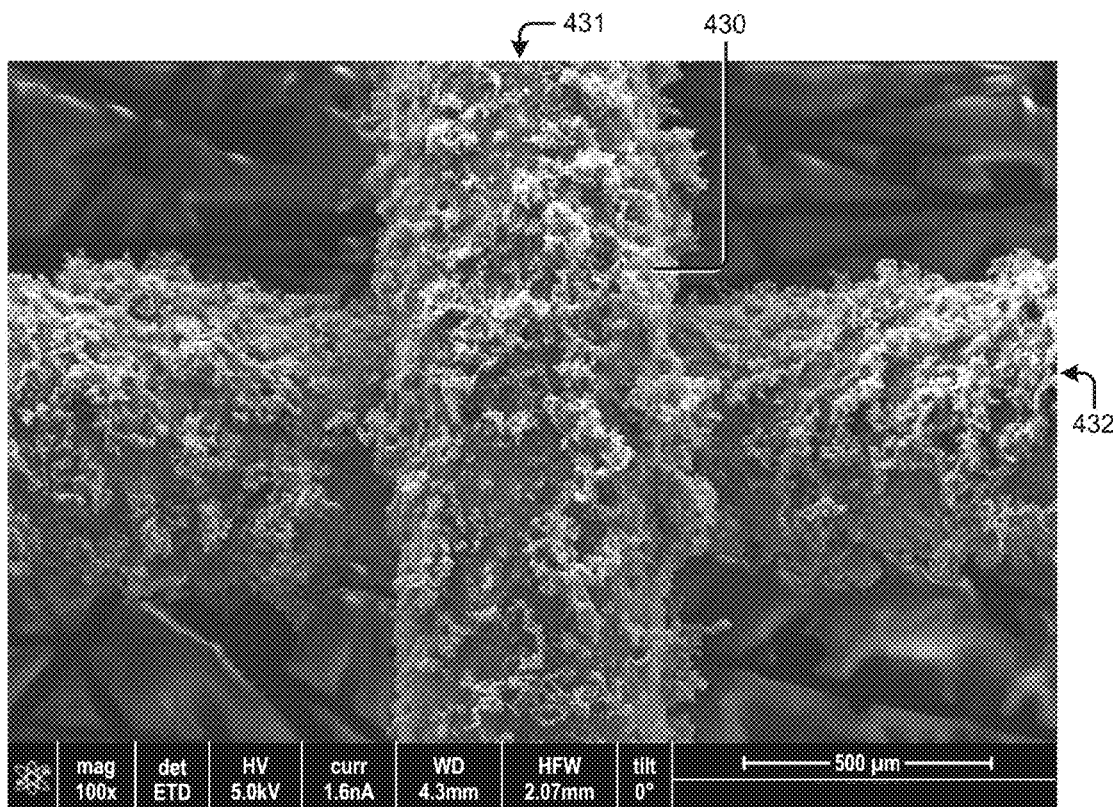
Figure 22W:
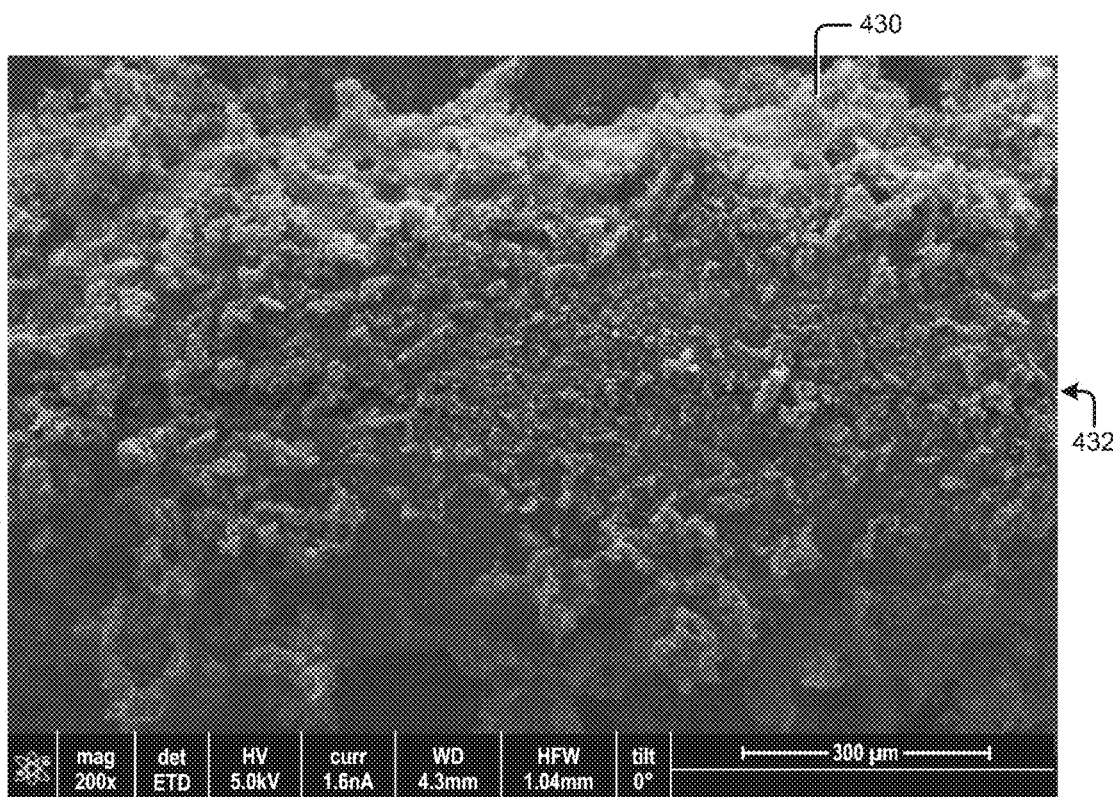
Figure 22X:
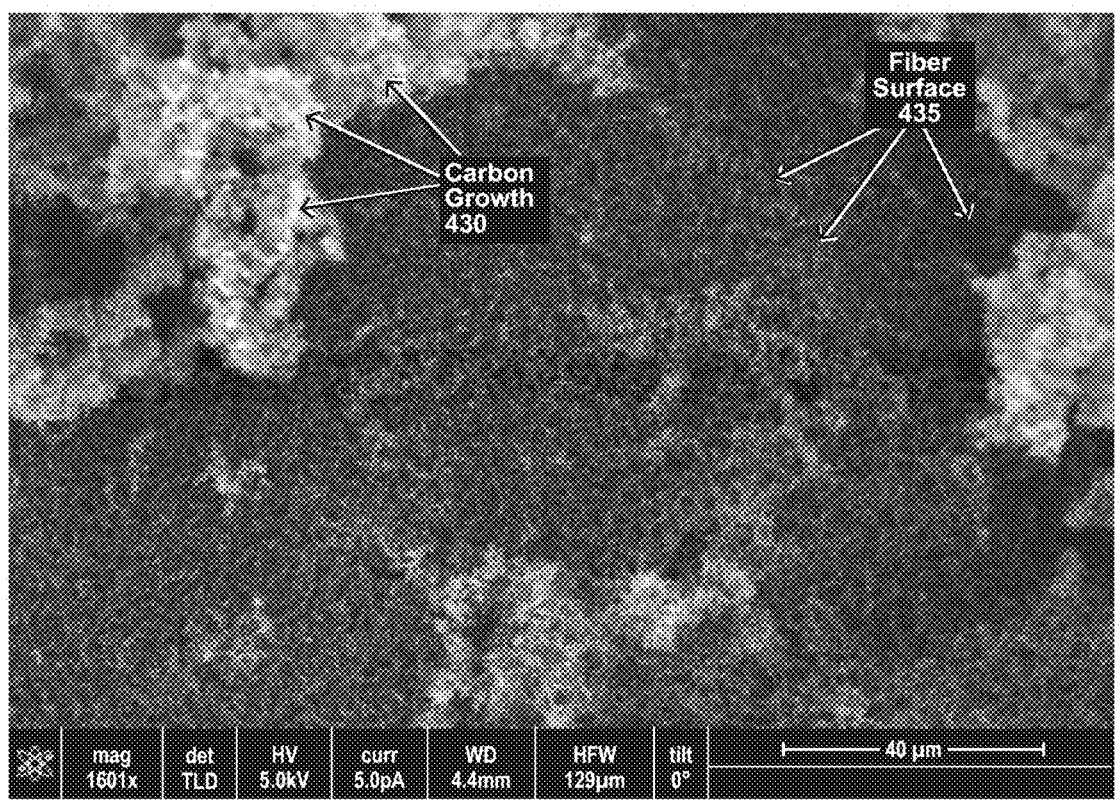
Figure 22Y:
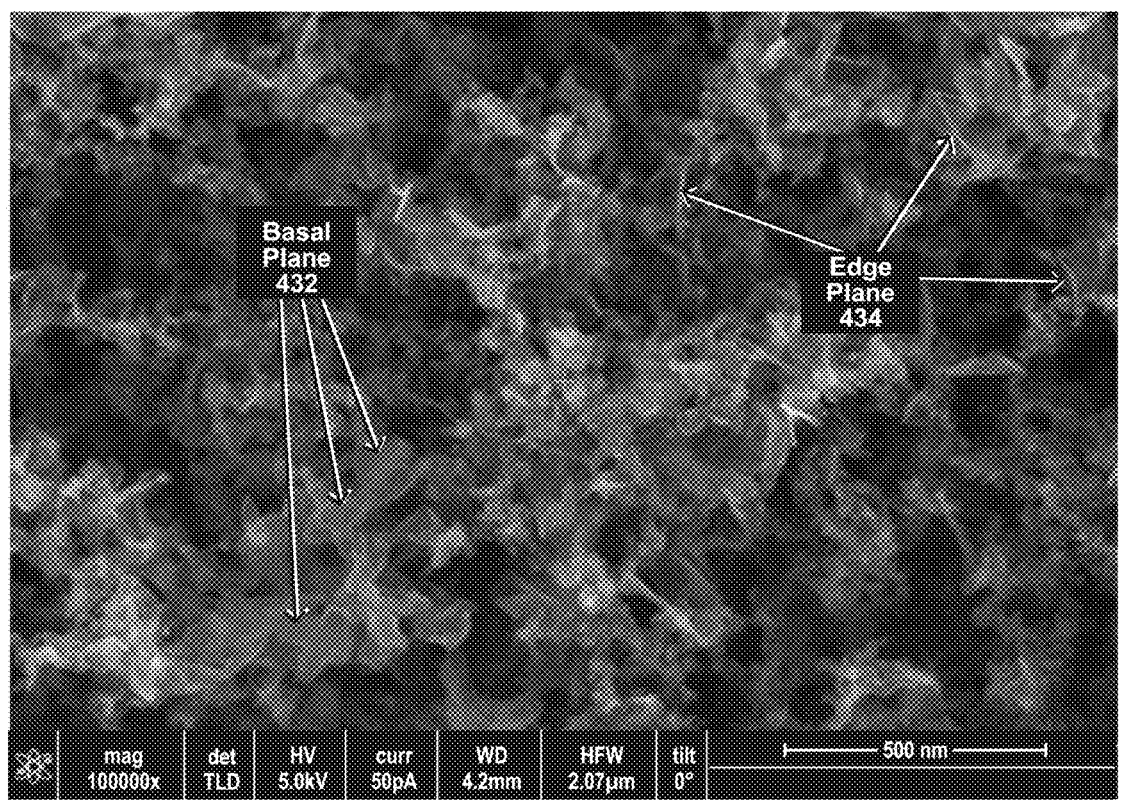

FIG. 22A through FIG. 22Y depict carbon-based materials, growths, agglomerates, aggregates, sheets, particles and/or the like, such as those self-nucleated in-flight in a reaction chamber or reactor from a carbon-containing gaseous species such as methane ($CH_4$), as disclosed by Stowell, et al., in U.S. patent application Ser. No. 16/785,020 entitled "3D Self-Assembled Multi-Modal Carbon-Based Particle" filed on Feb. 7, 2020.

The shown carbon-based nanoparticles and aggregates can be characterized by a high degree of "uniformity" (such as a high mass fraction of desired carbon allotropes), a high degree of "order" (such as a low concentration of defects), and/or a high degree of "purity" (such as a low concentration of elemental impurities), in contrast to the lower uniformity, less ordered, and lower purity particles achievable with conventional systems and methods.

The nanoparticles produced using the methods described herein can contain multi-walled spherical fullerenes (MWSFs) or connected MWSFs and have a high uniformity (such as, a ratio of graphene to MWSF from 20% to 80%), a high degree of order (such as, a Raman signature with an $I_D/I_G$ ratio from 0.95 to 1.05), and a high degree of purity (such as, the ratio of carbon to other elements (other than hydrogen) is greater than 99.9%). The nanoparticles produced using the methods described herein contain MWSFs or connected MWSFs, and the MWSFs do not contain a core composed of impurity elements other than carbon. The particles produced using the methods described herein can be aggregates containing the nanoparticles described above with large diameters (such as greater than 10 μm).

Conventional methods have been used to produce particles containing multi-walled spherical fullerenes with a high degree of order but can lead to end products with a variety of shortcomings. For example, high temperature synthesis techniques lead to particles with a mixture of many carbon allotropes and therefore low uniformity (such as less than 20% fullerenes relative to other carbon allotropes) and/or small particle sizes (such as less than 1 μm, or less than 100 nm in some cases). Methods using catalysts can lead to products that include the catalyst elements and therefore have relatively lower purity (referring to less than 95% carbon to other elements) as well. These undesirable properties also often lead to undesirable electrical properties of the resulting carbon particles (such as, electrical conductivity of less than 1,000 S/m).

The carbon nanoparticles and aggregates described herein can be characterized by Raman spectroscopy that is indicative of the high degree of order and uniformity of structure. The uniform ordered and/or pure carbon nanoparticles and aggregates described herein can be produced using relatively high speed, low cost improved thermal reactors and methods, as described below.

The term "graphene", as both commonly understood and as referred to herein, implies an allotrope of carbon in the form of a two-dimensional, atomic-scale, hexagonal lattice in which one atom forms each vertex. The carbon atoms in graphene are $sp^2$-bonded. Additionally, graphene has a Raman spectrum with two main peaks: a G-mode at approximately 1580 $cm^{-1}$ and a D-mode at approximately 1350 $cm^{-1}$ (when using a 532 nm excitation laser).

The term "fullerene", as both commonly understood and as referred to herein, implies a molecule of carbon in the form of a hollow sphere, ellipsoid, tube, or other shapes. Spherical fullerenes can also be referred to as Buckminsterfullerenes, or buckyballs. Cylindrical fullerenes can also be referred to as carbon nanotubes. Fullerenes are similar in structure to graphite, which is composed of stacked graphene sheets of linked hexagonal rings. Fullerenes may also contain pentagonal (or sometimes heptagonal) rings.

The term "multi-walled fullerene", as both commonly understood and as referred to herein, implies fullerenes with multiple concentric layers. For example, multi-walled nanotubes (MWNTs) contain multiple rolled layers (concentric tubes) of graphene. Multi-walled spherical fullerenes (MWSFs) contain multiple concentric spheres of fullerenes.

The term "nanoparticle", as both commonly understood and as referred to herein, implies a particle that measures from 1 nm to 989 nm. The nanoparticle can include one or more structural characteristics (such as, crystal structure, defect concentration, etc.), and one or more types of atoms. The nanoparticle can be any shape, including but not limited to spherical shapes, spheroidal shapes, dumbbell shapes, cylindrical shapes, elongated cylindrical type shapes, rectangular prism shapes, disk shapes, wire shapes, irregular shapes, dense shapes (such as, with few voids), porous shapes (such as, with many voids), etc.

The term "aggregate", as both commonly understood and as referred to herein, implies a plurality of nanoparticles that are connected together by Van der Waals forces, by covalent bonds, by ionic bonds, by metallic bonds, or by other physical or chemical interactions. Aggregates can vary in size considerably, but in general are larger than about 500 nm.

A carbon nanoparticle can include two (2) or more connected multi-walled spherical fullerenes (MWSFs) and layers of graphene coating the connected MWSFs and can be formed to be independent of a core composed of impurity elements other than carbon. A carbon nanoparticle, as described herein, can include two (2) or more connected multi-walled spherical fullerenes (MWSFs) and layers of graphene coating the connected MWSFs. In such a configuration, where the MWSFs do not contain a void (referring to a space with no carbon atoms greater than approximately 0.5 nm or greater than approximately 1 nm) at the center. The connected MWSFs can be formed of concentric, well-ordered spheres of $sp^2$-hybridized carbon atoms (which is in favorable contrast to conventional spheres of haphazardly-ordered, non-uniform, amorphous carbon particles, which can otherwise fail to achieve any one or more of the unexpected and favorable properties disclosed herein).

The nanoparticles containing the connected MWSFs have an average diameter in a range from 5 to 500 nm, or from 5 to 250 nm, or from 5 to 100 nm, or from 5 to 50 nm, or from 10 to 500 nm, or from 10 to 250 nm, or from 10 to 100 nm, or from 10 to 50 nm, or from 40 to 500 nm, or from 40 to 250 nm, or from 40 to 100 nm, or from 50 to 500 nm, or from 50 to 250 nm, or from 50 to 100 nm.

The carbon nanoparticles described herein form aggregates, wherein many nanoparticles aggregate together to form a larger unit. A carbon aggregate can a plurality of carbon nanoparticles. A diameter across the carbon aggregate can be a range from 10 to 500 μm, or from 50 to 500 μm, or from 100 to 500 μm, or from 250 to 500 μm, or from 10 to 250 μm, or from 10 to 100 μm, or from 10 to 50 μm. The aggregate can be formed from a plurality of carbon nanoparticles, as defined above. Aggregates can contain connected MWSFs, such as those with a high uniformity metric (such as a ratio of graphene to MWSF from 20% to 80%), a high degree of order (such as a Raman signature with an $I_D/I_G$ ratio from 0.95 to 1.05), and a high degree of purity (such as greater than 99.9% carbon).

Aggregates of carbon nanoparticles, referring primarily to those with diameters in the ranges described above, especially particles greater than 10 μm, are generally easier to collect than particles or aggregates of particles that are smaller than 500 nm. The ease of collection reduces the cost of manufacturing equipment used in the production of the carbon nanoparticles and increases the yield of the carbon nanoparticles. Particles greater than 10 μm in size also pose fewer safety concerns compared to the risks of handling smaller nanoparticles, such as, potential health and safety risks due to inhalation of the smaller nanoparticles. The lower health and safety risks, thus, further reduce the manufacturing cost.

A carbon nanoparticle, in reference to that disclosed herein, can have a ratio of graphene to MWSFs from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%. A carbon aggregate has a ratio of graphene to MWSFs is from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%. A carbon nanoparticle has a ratio of graphene to connected MWSFs from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%. A carbon aggregate has a ratio of graphene to connected MWSFs is from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%.

Raman spectroscopy can be used to characterize carbon allotropes to distinguish their molecular structures. For example, graphene can be characterized using Raman spectroscopy to determine information such as order/disorder, edge and grain boundaries, thickness, number of layers, doping, strain, and thermal conductivity. MWSFs have also been characterized using Raman spectroscopy to determine the degree of order of the MWSFs.

Raman spectroscopy is used to characterize the structure of MWSFs or connected MWSFs used in reference to that incorporated within the various tire-related plies of tires as discussed herein. The main peaks in the Raman spectra are the G-mode and the D-mode. The G-mode is attributed to the vibration of carbon atoms in $sp^2$-hybridized carbon networks, and the D-mode is related to the breathing of hexagonal carbon rings with defects. In some circumstances, defects may be present, yet may not be detectable in the Raman spectra. For example, if the presented crystalline structure is orthogonal with respect to the basal plane, the D-peak will show an increase. Alternatively, if presented with a perfectly planar surface that is parallel with respect to the basal plane, the D-peak will be zero.

When using 532 nm incident light, the Raman G-mode is typically at 1582 cm$^{-1}$ for planar graphite, however, can be downshifted for MWSFs or connected MWSFs (such as, down to 1565 cm$^{-1}$ or down to 1580 cm$^{-1}$). The D-mode is observed at approximately 1350 cm$^1$ in the Raman spectra of MWSFs or connected MWSFs. The ratio of the intensities of the D-mode peak to G-mode peak (such as, the $I_D/I_G$) is related to the degree of order of the MWSFs, where a lower $I_D/I_G$ indicates a higher degree of order. An $I_D/I_G$ near or below 1 indicates a relatively high degree of order, and an $I_D/I_G$ greater than 1.1 indicates a lower degree of order.

A carbon nanoparticle or a carbon aggregate containing MWSFs or connected MWSFs, as described herein, can have and/or demonstrate a Raman spectrum with a first Raman peak at about 1350 cm$^{-1}$ and a second Raman peak at about 1580 cm$^{-1}$ when using 532 nm incident light. The ratio of an intensity of the first Raman peak to an intensity of the second Raman peak (such as, the $I_D/I_G$) for the nanoparticles or the aggregates described herein can be in a range from 0.95 to 1.05, or from 0.9 to 1.1, or from 0.8 to 1.2, or from 0.9 to 1.2, or from 0.8 to 1.1, or from 0.5 to 1.5, or less than 1.5, or less than 1.2, or less than 1.1, or less than 1, or less than 0.95, or less than 0.9, or less than 0.8.

A carbon aggregate containing MWSFs or connected MWSFs, as defined above, has a high purity. The carbon aggregate containing MWSFs or connected MWSFs has a ratio of carbon to metals of greater than 99.99%, or greater than 99.95%, or greater than 99.9%, or greater than 99.8%, or greater than 99.5%, or greater than 99%. The carbon aggregate has a ratio of carbon to other elements of greater than 99.99%, or greater than 99.95%, or greater than 99.9%, or greater than 99.5%, or greater than 99%, or greater than 90%, or greater than 80%, or greater than 70%, or greater than 60%. The carbon aggregate has a ratio of carbon to other elements (except for hydrogen) of greater than 99.99%, or greater than 99.95%, or greater than 99.9%, or greater than 99.8%, or greater than 99.5%, or greater than 99%, or greater than 90%, or greater than 80%, or greater than 70%, or greater than 60%.

A carbon aggregate containing MWSFs or connected MWSFs, as defined above, has a high specific surface area. The carbon aggregate has a Brunauer, Emmett and Teller (BET) specific surface area from 10 to 200 m$^2$/g, or from 10 to 100 m$^2$/g, or from 10 to 50 m$^2$/g, or from 50 to 200 m$^2$/g, or from 50 to 100 m$^2$/g, or from 10 to 1000 m$^2$/g.

A carbon aggregate containing MWSFs or connected MWSFs, as defined above, has a high electrical conductivity. A carbon aggregate containing MWSFs or connected MWSFs, as defined above, is compressed into a pellet and the pellet has an electrical conductivity greater than 500 S/m, or greater than 1,000 S/m, or greater than 2,000 S/m, or greater than 3,000 S/m, or greater than 4,000 S/m, or greater than 5,000 S/m, or greater than 10,000 S/m, or greater than 20,000 S/m, or greater than 30,000 S/m, or greater than 40,000 S/m, or greater than 50,000 S/m, or greater than 60,000 S/m, or greater than 70,000 S/m, or from 500 S/m to 100,000 S/m, or from 500 S/m to 1,000 S/m, or from 500 S/m to 10,000 S/m, or from 500 S/m to 20,000 S/m, or from 500 S/m to 100,000 S/m, or from 1000 S/m to 10,000 S/m, or from 1,000 S/m to 20,000 S/m, or from 10,000 S/m to 100,000 S/m, or from 10,000 S/m to 80,000 S/m, or from 500 S/m to 10,000 S/m. In some cases, the density of the pellet is approximately 1 g/cm$^3$, or approximately 1.2 g/cm$^3$, or approximately 1.5 g/cm$^3$, or approximately 2 g/cm$^3$, or approximately 2.2 g/cm$^3$, or approximately 2.5 g/cm$^3$, or approximately 3 g/cm$^3$. Additionally, tests have been performed in which compressed pellets of the carbon aggregate materials have been formed with compressions of 2,000 psi and 12,000 psi and with annealing temperatures of 800° C. and 1,000° C. The higher compression and/or the higher annealing temperatures generally result in pellets with a higher degree of electrical conductivity, including in the range of 12,410.0 S/m to 13,173.3 S/m.

High Purity Carbon Allotropes Produced Using Thermal Processing Systems

The carbon nanoparticles and aggregates described herein can be produced using thermal reactors and methods. Further details pertaining to thermal reactors and/or methods of use can be found in U.S. Pat. No. 9,862,602, issued Jan. 9, 2018, entitled "CRACKING OF A PROCESS GAS", which is hereby incorporated by reference in its entirety. Additionally, carbon-containing and/or hydrocarbon precursors (referring to at least methane, ethane, propane, butane, and natural gas) can be used with the thermal reactors to produce the carbon nanoparticles and the carbon aggregates described herein.

The carbon nanoparticles and aggregates described herein are produced using the thermal reactors with gas flow rates from 1 slm to 10 slm, or from 0.1 slm to 20 slm, or from 1 slm to 5 slm, or from 5 slm to 10 slm, or greater than 1 slm, or greater than 5 slm. The carbon nanoparticles and aggregates described herein are produced using the thermal reactors with gas resonance times from 0.1 seconds (s) to 30 s, or from 0.1 s to 10 s, or from 1 s to 10 s, or from 1 s to 5 s, from 5 s to 10 s, or greater than 0.1 seconds, or greater than 1 s, or greater than 5 s, or less than 30 s.

The carbon nanoparticles and aggregates described herein can be produced using the thermal reactors with production rates from 10 g/hr to 200 g/hr, or from 30 g/hr to 200 g/hr, or from 30 g/hr to 100 g/hr, or from 30 g/hr to 60 g/hr, or from 10 g/hr to 100 g/hr, or greater than 10 g/hr, or greater than 30 g/hr, or greater than 100 g/hr.

Thermal reactors (or other cracking apparatuses) and thermal reactor methods (or other cracking methods) can be used for refining, pyrolizing, dissociating or cracking feedstock process gases into its constituents to produce the carbon nanoparticles and the carbon aggregates described herein, as well as other solid and/or gaseous products (such as, hydrogen gas and/or lower order hydrocarbon gases). The feedstock process gases generally include, for example, hydrogen gas ($H^2$), carbon dioxide ($CO^2$), $C^1$ to $C^{10}$ hydrocarbons, aromatic hydrocarbons, and/or other hydrocarbon gases such as natural gas, methane, ethane, propane, butane, isobutane, saturated/unsaturated hydrocarbon gases, ethene, propene, etc., and mixtures thereof. The carbon nanoparticles and the carbon aggregates can include, for example, multi-walled spherical fullerenes (MWSFs), connected MWSFs, carbon nanospheres, graphene, graphite, highly ordered pyrolytic graphite, single-walled nanotubes, multi-walled nanotubes, other solid carbon products, and/or the carbon nanoparticles and the carbon aggregates described herein.

Methods for producing the carbon nanoparticles and the carbon aggregates described herein can include thermal cracking methods that use, for example, an elongated longitudinal heating element optionally enclosed within an elongated casing, housing or body of a thermal cracking apparatus. The body can include, for example, one or more tubes or other appropriate enclosures made of stainless steel, titanium, graphite, quartz, or the like. The body of the thermal cracking apparatus is generally cylindrical in shape with a central elongate longitudinal axis arranged vertically and a feedstock process gas inlet at or near a top of the body. The feedstock process gas can flow longitudinally down through the body or a portion thereof. In the vertical configuration, both gas flow and gravity assist in the removal of the solid products from the body of the thermal cracking apparatus.

The heating element can include any one or more of a heating lamp, one or more resistive wires or filaments (or twisted wires), metal filaments, metallic strips or rods, and/or other appropriate thermal radical generators or elements that can be heated to a specific temperature (such a, a molecular cracking temperature) sufficient to thermally crack molecules of the feedstock process gas. The heating element can be disposed, located or arranged to extend centrally within the body of the thermal cracking apparatus along the central longitudinal axis thereof. In configurations having only one heating element can include it placed at or concentric with the central longitudinal axis; alternatively, for configurations having multiple heating elements can include them spaced or offset generally symmetrically or concentrically at locations near and around and parallel to the central longitudinal axis.

Thermal cracking to produce the carbon nanoparticles and aggregates described herein can be achieved by flowing the feedstock process gas over, or in contact with, or within the vicinity of, the heating element within a longitudinal elongated reaction zone generated by heat from the heating element and defined by and contained inside the body of the thermal cracking apparatus to heat the feedstock process gas to or at a specific molecular cracking temperature.

The reaction zone can be considered to be the region surrounding the heating element and close enough to the heating element for the feedstock process gas to receive sufficient heat to thermally crack the molecules thereof. The reaction zone is thus generally axially aligned or concentric with the central longitudinal axis of the body. The thermal cracking is performed under a specific pressure. The feedstock process gas is circulated around or across the outside surface of a container of the reaction zone or a heating chamber to cool the container or chamber and preheat the feedstock process gas before flowing the feedstock process gas into the reaction zone.

The carbon nanoparticles and aggregates described herein and/or hydrogen gas are produced without the use of catalysts. Accordingly, the process can be entirely catalyst free.

Disclosed methods and systems can advantageously be rapidly scaled up or scaled down for different production levels as may be desired, such as being scalable to provide a standalone hydrogen and/or carbon nanoparticle producing station, a hydrocarbon source, or a fuel cell station, to provide higher capacity systems, such as, for a refinery and/or the like.

A thermal cracking apparatus for cracking a feedstock process gas to produce the carbon nanoparticles and aggregates described herein include a body, a feedstock process gas inlet, and an elongated heating element. The body has an inner volume with a longitudinal axis. The inner volume has a reaction zone concentric with the longitudinal axis. A feedstock process gas can be flowed into the inner volume through the feedstock process gas inlet during thermal cracking operations. The elongated heating element can be disposed within the inner volume along the longitudinal axis and is surrounded by the reaction zone. During the thermal cracking operations, the elongated heating element is heated by electrical power to a molecular cracking temperature to generate the reaction zone, the feedstock process gas is heated by heat from the elongated heating element, and the heat thermally cracks molecules of the feedstock process gas that are within the reaction zone into constituents of the molecules.

A method for cracking a feedstock process gas to produce the carbon nanoparticles and aggregates described herein can include at least any one or more of the following: (1) providing a thermal cracking apparatus having an inner volume that has a longitudinal axis and an elongated heating element disposed within the inner volume along the longitudinal axis; (2) heating the elongated heating element by electrical power to a molecular cracking temperature to generate a longitudinal elongated reaction zone within the inner volume; (3) flowing a feedstock process gas into the inner volume and through the longitudinal elongated reaction zone (such as, wherein the feedstock process gas is heated by heat from the elongated heating element); and (4) thermally cracking molecules of the feedstock process gas within the longitudinal elongated reaction zone into constituents thereof (such as, hydrogen gas and one or more solid products) as the feedstock process gas flows through the longitudinal elongated reaction zone.

The feedstock process gas used to produce the carbon nanoparticles and aggregates described herein can include a hydrocarbon gas. The results of cracking can, in turn, further include hydrogen in gaseous form (such as, $H^2$) and various forms of the carbon nanoparticles and aggregates described herein. The carbon nanoparticles and aggregates include two or more MWSFs and layers of graphene coating the MWSFs, and/or connected MWSFs and layers of graphene coating the connected MWSFs. The feedstock process gas is preheated (such as, to 100° C. to 500° C.) by flowing the feedstock process gas through a gas preheating region between a heating chamber and a shell of the thermal cracking apparatus before flowing the feedstock process gas into the inner volume. A gas having nanoparticles therein is flowed into the inner volume and through the longitudinal elongated reaction zone to mix with the feedstock process gas, to form a coating of a solid product (such as, layers of graphene) around the nanoparticles.

Post-Processing High Purity Structured Carbons

The carbon nanoparticles and aggregates containing multi-walled spherical fullerenes (MWSFs) or connected MWSFs described herein can be produced and collected without requiring the completion of any post-processing treatments or operations. Alternatively, some post-processing can be performed on one or more of the presently disclosed MWSFs. Some examples of post-processing involved in making and using resonant materials include mechanical processing such as ball milling, grinding, attrition milling, micro fluidizing, and other techniques to reduce the particle size without damaging the MWSFs. Some further examples of post-processing include exfoliation processes (referring to the complete separation of layers of carbon-containing material, such as the creation or extraction of layers of graphene from graphite, etc.) including sheer mixing, chemical etching, oxidizing (such as the Hummer method), thermal annealing, doping by adding elements during annealing (such as sulfur and/or nitrogen), steaming, filtering, and lyophilization, among others. Some examples of post-processing include sintering processes such as spark plasma sintering (SPS), direct current sintering, microwave sintering, and ultraviolet (UV) sintering, which can be conducted at high pressure and temperature in an inert gas. Multiple post-processing methods can be used together or in a series. The post-processing produces functionalized carbon nanoparticles or aggregates containing multi-walled spherical fullerenes (MWSFs) or connected MWSFs.

Materials can be mixed together in different combinations, quantities and/or ratios. Different carbon nanoparticles and aggregates containing MWSFs or connected MWSFs described herein can be mixed together prior to one or more post-processing operations, if any at all. For example, different carbon nanoparticles and aggregates containing MWSFs or connected MWSFs with different properties (such as, different sizes, different compositions, different purities, from different processing runs, etc.) can be mixed together. The carbon nanoparticles and aggregates containing MWSFs or connected MWSFs described herein can be mixed with graphene to change the ratio of the connected MWSFs to graphene in the mixture. Different carbon nanoparticles and aggregates containing MWSFs or connected MWSFs described herein can be mixed together after post-processing. Different carbon nanoparticles and aggregates containing MWSFs or connected MWSFs with different properties and/or different post-processing methods (such as, different sizes, different compositions, different functionality, different surface properties, different surface areas) can be mixed together in any quantity, ratio and/or combination.

The carbon nanoparticles and aggregates described herein are produced and collected, and subsequently processed by mechanical grinding, milling, and/or exfoliating. The processing (such as, by mechanical grinding, milling, exfoliating, etc.) can reduce the average size of the particles. The processing (such as, by mechanical grinding, milling, exfoliating, etc.) increases the average surface area of the particles. The processing by mechanical grinding, milling and/or exfoliation shears off some fraction of the carbon layers, producing sheets of graphite mixed with the carbon nanoparticles.

The mechanical grinding or milling is performed using a ball mill, a planetary mill, a rod mill, a shear mixer, a high-shear granulator, an autogenous mill, or other types of machining used to break solid materials into smaller pieces by grinding, crushing or cutting. The mechanical grinding, milling and/or exfoliating is performed wet or dry. The mechanical grinding is performed by grinding for some period of time, then idling for some period of time, and repeating the grinding and idling for a number of cycles. The grinding period is from 1 minute (min) to 20 mins, or from 1 min to 10 mins, or from 3 mins to 8 mins, or approximately 3 mins, or approximately 8 mins. The idling period is from 1 min to 10 mins, or approximately 5 mins, or approximately 6 mins. The number of grinding and idling cycles is from 1 min to 100 mins, or from 5 mins to 100 mins, or from 10 mins to 100 mins, or from 5 mins to 10 mins, or from 5 mins to 20 mins. The total amount of time of grinding and idling is from 10 mins to 1,200 mins, or from 10 mins to 600 mins, or from 10 mins to 240 mins, or from 10 mins to 120 mins, or from 100 mins to 90 mins, or from 10 mins to 60 mins, or approximately 90 mins, or approximately mins minutes.

The grinding steps in the cycle are performed by rotating a mill in one direction for a first cycle (such as, clockwise), and then rotating a mill in the opposite direction (such as, counterclockwise) for the next cycle. The mechanical grinding or milling is performed using a ball mill, and the grinding steps are performed using a rotation speed from 100 to 1000 rpm, or from 100 to 500 rpm, or approximately 400 rpm. The mechanical grinding or milling is performed using a ball mill that uses a milling media with a diameter from 0.1 mm to 20 mm, or from 0.1 mm to 10 mm, or from 1 mm to 10 mm, or approximately 0.1 mm, or approximately 1 mm, or approximately 10 mm. The mechanical grinding or milling is performed using a ball mill that uses a milling media composed of metal such as steel, an oxide such as zirconium oxide (zirconia), yttria stabilized zirconium oxide, silica, alumina, magnesium oxide, or other hard materials such as silicon carbide or tungsten carbide.

The carbon nanoparticles and aggregates described herein are produced and collected, and subsequently processed using elevated temperatures such as thermal annealing or sintering. The processing using elevated temperatures is done in an inert environment such as nitrogen or argon. The processing using elevated temperatures is done at atmospheric pressure, or under vacuum, or at low pressure. The processing using elevated temperatures is done at a temperature from 500° C. to 2,500° C., or from 500° C. to 1,500° C., or from 800° C. to 1,500° C., or from 800° C. to 1,200° C., or from 800° C. to 1,000° C., or from 2,000° C. to 2,400° C., or approximately 8.00° C., or approximately 1,000° C., or approximately 1,500° C., or approximately 2,000° C., or approximately 2,400° C.

The carbon nanoparticles and aggregates described herein are produced and collected, and subsequently, in post processing operations, additional elements or compounds are added to the carbon nanoparticles, thereby incorporating the unique properties of the carbon nanoparticles and aggregates into other mixtures of materials.

Either before or after post-processing, the carbon nanoparticles and aggregates described herein are added to solids, liquids or slurries of other elements or compounds to form additional mixtures of materials incorporating the unique properties of the carbon nanoparticles and aggregates. The carbon nanoparticles and aggregates described herein are mixed with other solid particles, polymers or other materials.

Either before or after post-processing, the carbon nanoparticles and aggregates described herein are used in various applications beyond applications pertaining to making and using resonant materials. Such applications including but not limited to transportation applications (such as, automobile and truck tires, couplings, mounts, elastomeric "o"-rings, hoses, sealants, grommets, etc.) and industrial applications (such as, rubber additives, functionalized additives for polymeric materials, additives for epoxies, etc.).

FIGS. 22A and 22B show transmission electron microscope (TEM) images of as-synthesized carbon nanoparticles. The carbon nanoparticles of FIG. 22A (at a first magnification) and FIG. 22B (at a second magnification) contain connected multi-walled spherical fullerenes (MWSFs) with graphene layers that coat the connected MWSFs. The ratio of MWSF to graphene allotropes in this example is approximately 80% due to the relatively short resonance times. The MWSFs in FIG. 22B are approximately 5 nm to 10 nm in diameter, and the diameter can be from 5 nm to 500 nm using the conditions described above. The average diameter across the MWSFs is in a range from 5 nm to 500 nm, or from 5 nm to 250 nm, or from 5 nm to 100 nm, or from 5 nm to 50 nm, or from 10 nm to 500 nm, or from 10 nm to 250 nm, or from 10 nm to 100 nm, or from 10 nm to 50 nm, or from 40 nm to 500 nm, or from 40 nm to 250 nm, or from 40 nm to 100 nm, or from 50 nm to 500 nm, or from 50 nm to 250 nm, or from 50 nm to 100 nm. No catalyst was used in this process, and therefore, there is no central seed containing contaminants. The aggregate particles produced in this example had a particle size of approximately 10 µm to 100 µm, or approximately 10 µm to 500 µm.

FIG. 22C shows the Raman spectrum of the as-synthesized aggregates in this example taken with 532 nm incident light. The $I_D/I_G$ for the aggregates produced in this example is from approximately 0.99 to 1.03, indicating that the aggregates were composed of carbon allotropes with a high degree of order.

FIG. 22D and FIG. 22E show example TEM images of the carbon nanoparticles after size reduction by grinding in a ball mill. The ball milling was performed in cycles with a 3-minute (min) counter-clockwise grinding operation, followed by a 6 min idle operation, followed by a 3-min clockwise grinding operation, followed by a 6-min idle operation. The grinding operations were performed using a rotation speed of 400 rpm. The milling media was zirconia and ranged in size from 0.1 mm to 10 mm. The total size reduction processing time was from 60 mins to 120 mins. After size reduction, the aggregate particles produced in this example had a particle size of approximately 1 µm to 5 µm. The carbon nanoparticles after size reduction are connected MWSFs with layers of graphene coating the connected MWSFs.

FIG. 22F shows a Raman spectrum from these aggregates after size reduction taken with a 532 nm incident light. The $I_D/I_G$ for the aggregate particles in this example after size reduction is approximately 1.04. Additionally, the particles after size reduction had a Brunauer, Emmett and Teller (BET) specific surface area of approximately 40 m²/g to 50 m²/g.

The purity of the aggregates produced in this sample were measured using mass spectrometry and x-ray fluorescence (XRF) spectroscopy. The ratio of carbon to other elements, except for hydrogen, measured in 16 different batches was from 99.86% to 99.98%, with an average of 99.94% carbon.

In this example, carbon nanoparticles were generated using a thermal hot-wire processing system. The precursor material was methane, which was flowed from 1 slm to 5 slm. With these flow rates and the tool geometry, the resonance time of the gas in the reaction chamber was from approximately 20 second to 30 seconds, and the carbon particle production rate was from approximately 20 g/hr.

Further details pertaining to such a processing system can be found in the previously mentioned U.S. Pat. No. 9,862,602, titled "CRACKING OF A PROCESS GAS."

EXAMPLES

Example 1

FIG. 22G (shown enlarged as FIG. 15), FIG. 22H (shown enlarged as FIG. 16) and FIG. 22I (shown enlarged as FIG. 17) show TEM images of as-synthesized carbon nanoparticles of this example. The carbon nanoparticles contain connected multi-walled spherical fullerenes (MWSFs) with layers of graphene coating the connected MWSFs. The ratio of multi-walled fullerenes to graphene allotropes in this example is approximately 30% due to the relatively long resonance times allowing thicker, or more, layers of graphene to coat the MWSFs. No catalyst was used in this process, and therefore, there is no central seed containing contaminants. The as-synthesized aggregate particles produced in this example had particle sizes of approximately 10 µm to 500 µm. FIG. 22J shows a Raman spectrum from the aggregates of this example. The Raman signature of the as-synthesized particles in this example is indicative of the thicker graphene layers which coat the MWSFs in the as-synthesized material. Additionally, the as-synthesized particles had a Brunauer, Emmett and Teller (BET) specific surface area of approximately 90 m²/g to 100 m²/g.

Example 2

FIG. 22K and FIG. 22L show TEM images of the carbon nanoparticles of this example. Specifically, the images depict the carbon nanoparticles after performance of size reduction by grinding in a ball mill. The size reduction process conditions were the same as those described as pertains to the foregoing FIG. 22G through FIG. 22J. After size reduction, the aggregate particles produced in this example had a particle size of approximately 1 µm to 5 µm. The TEM images show that the connected MWSFs that were buried in the graphene coating can be observed after size reduction. FIG. 22M shows a Raman spectrum from the aggregates of this example after size reduction taken with 532 nm incident light. The $I_D/I_G$ for the aggregate particles in this example after size reduction is approximately 1, indicating that the connected MWSFs that were buried in the graphene coating as-synthesized had become detectable in Raman after size reduction, and were well ordered. The particles after size reduction had a Brunauer, Emmett and Teller (BET) specific surface area of approximately 90 m²/g to 100 m²/g.

Example 3

FIG. 22n is a scanning electron microscope (SEM) image of carbon aggregates showing the graphite and graphene allotropes at a first magnification. FIG. 22o is a SEM image of carbon aggregates showing the graphite and graphene allotropes at a second magnification. The layered graphene is clearly shown within the distortion (wrinkles) of the carbon. The 3D structure of the carbon allotropes is also visible.

The particle size distribution of the carbon particles of FIG. 22N and FIG. 22O is shown in FIG. 22P. The mass basis cumulative particle size distribution 406 corresponds to the left y-axis in the graph ($Q^3(x)$ [%]). The histogram of the mass particle size distribution 408 corresponds to the right axis in the graph ($dQ^3(x)$ [%]). The median particle size is approximately 33 µm. The 10th percentile particle size is approximately 9 µm, and the 90th percentile particle size is approximately 103 µm. The mass density of the particles is approximately 10 g/L.

Example 4

The particle size distribution of the carbon particles captured from a multiple-stage reactor is shown in FIG. 22Q. The mass basis cumulative particle size distribution 414 corresponds to the left y-axis in the graph ($Q^3(x)$ [%]). The histogram of the mass particle size distribution 416 corresponds to the right axis in the graph ($dQ^3(x)$ [%]). The median particle size captured is approximately 11 µm. The 10th percentile particle size is approximately 3.5 µm, and the 90th percentile particle size is approximately 21 µm. The graph in FIG. 22Q also shows the number basis cumulative particle size distribution 418 corresponding to the left y-axis in the graph ($Q^0(x)$ [%]). The median particle size by number basis is from approximately 0.1 µm to approximately 0.2 µm. The mass density of the particles collected is approximately 22 g/L.

Returning to the discussion of FIG. 22P, the graph also shows a second set of example results. Specifically, in this example, the particles were size-reduced by mechanical grinding, and then the size-reduced particles were processed using a cyclone separator. The mass basis cumulative particle size distribution 410 of the size-reduced carbon particles captured in this example corresponds to the left y-axis in the graph ($Q^3(x)$ [%]). The histogram of the mass basis particle size distribution 412 corresponds to the right axis in the graph ($dQ^3(x)$ [%]). The median particle size of the size-reduced carbon particles captured in this example is approximately 6 µm. The 10th percentile particle size is from 1 µm to 2 µm, and the 90th percentile particle size is from 10 µm to 20 µm.

Further details pertaining to making and using cyclone separators can be found in U.S. patent application Ser. No. 15/725,928, filed Oct. 5, 2017, titled "MICROWAVE REACTOR SYSTEM WITH GAS-SOLIDS SEPARATION", which is hereby incorporated by reference in its entirety.

High Purity Carbon Allotropes Produced Using Microwave Reactor Systems

In some cases, carbon particles and aggregates containing graphite, graphene and amorphous carbon can be generated using a microwave plasma reactor system using a precursor material that contains methane, or contains isopropyl alcohol (IPA), or contains ethanol, or contains a condensed hydrocarbon (such as, hexane). In some other examples, the carbon-containing precursors are optionally mixed with a supply gas (such as, argon). The particles produced in this example contained graphite, graphene, amorphous carbon and no seed particles. The particles in this example had a ratio of carbon to other elements (other than hydrogen) of approximately 99.5% or greater.

In one particular example, a hydrocarbon was the input material for the microwave plasma reactor, and the separated outputs of the reactor comprised hydrogen gas and carbon particles containing graphite, graphene and amorphous carbon. The carbon particles were separated from the hydrogen gas in a multi-stage gas-solid separation system. The solids loading of the separated outputs from the reactor was from 0.001 g/L to 2.5 g/L.

Example 5

FIG. 22R, FIG. 22S, and FIG. 22T are TEM images of as-synthesized carbon nanoparticles. The images show examples of graphite, graphene and amorphous carbon allotropes. The layers of graphene and other carbon materials can be clearly seen in the images.

The particle size distribution of the carbon particles captured is shown in FIG. 22U. The mass basis cumulative particle size distribution 420 corresponds to the left y-axis in the graph ($Q^3(x)$ [%]). The histogram of the mass particle size distribution 422 corresponds to the right axis in the graph ($dQ^3(x)$ [%]). The median particle size captured in the cyclone separator in this example was approximately 14 µm. The 10th percentile particle size was approximately 5 µm, and the 90th percentile particle size was approximately 28 µm. The graph in FIG. 22U also shows the number basis cumulative particle size distribution 424 corresponding to the left y-axis in the graph ($Q^0(x)$ [%]). The median particle size by number basis in this example was from approximately 0.1 µm to approximately 0.2 µm.

Example 6

FIG. 22V, FIG. 22W, and FIGS. 22X, and 22X are images that show three-dimensional carbon-containing structures that are grown onto other three-dimensional structures. FIG. 22V is a 100× magnification of three-dimensional carbon structures grown onto carbon fibers, whereas FIG. 22W is a 200× magnification of three-dimensional carbon structures grown onto carbon fibers. FIG. 22X is a 1601× magnification of three-dimensional carbon structures grown onto carbon fibers. The three-dimensional carbon growth over the fiber surface is shown. FIG. 22Y is a 10000× magnification of three-dimensional carbon structures grown onto carbon fibers. The image depicts growth onto the basal plane as well as onto edge planes.

More specifically, FIGS. 22V-22Y show example SEM images of 3D carbon materials grown onto fibers using plasma energy from a microwave plasma reactor as well as thermal energy from a thermal reactor. FIG. 22V shows an SEM image of intersecting fiber 431 and fiber 432 with 3D carbon material 430 grown on the surface of the fibers. FIG. 22W is a higher magnification image (the scale bar is 300 µm compared to 500 µm for FIG. 22V) showing the 3D carbon material 430 on the fiber 432. FIG. 22X is a further magnified view (scale bar is 40 µm) showing the 3D carbon material 430 on fiber surface 435, where the 3D nature of the carbon material 430 can be clearly seen. FIG. 22Y shows a close-up view (scale bar is 500 nm) of the carbon alone, showing interconnection between basal planes of the fiber 432 and edge planes 434 of numerous sub-particles of the 3D carbon material grown on the fiber. FIGS. 22V-22Y demonstrate the ability to grow 3D carbon on a 3D fiber structure, such as 3D carbon growth grown on a 3D carbon fiber.

3D carbon growth on fibers can be achieved by introducing a plurality of fibers into the microwave plasma reactor and using plasma in the microwave reactor to etch the fibers. The etching creates nucleation sites such that when carbon particles and sub-particles are created by hydrocarbon disassociation in the reactor, growth of 3D carbon structures is initiated at these nucleation sites. The direct growth of the 3D carbon structures on the fibers, which themselves are three-dimensional in nature, provides a highly integrated, 3D structure with pores into which resin can permeate. This 3D reinforcement matrix (including the 3D carbon structures integrated with high aspect ratio reinforcing fibers) for a resin composite results in enhanced material properties, such as tensile strength and shear, compared to composites with conventional fibers that have smooth surfaces and which smooth surfaces typically delaminate from the resin matrix.

Functionalization of Exposed Carbon Surfaces

Carbon materials, such as any one or more of the 3D carbon materials described herein, can have one or more exposed surfaces prepared for functionalization, such as that to promote adhesion and/or add elements such as oxygen, nitrogen, carbon, silicon, or hardening agents. Functionalization refers to the addition of functional groups to a compound by chemical synthesis. In materials science, functionalization can be employed to achieve desired surface properties; for instance, functional groups can also be used to covalently link functional molecules to the surfaces of chemical devices. The carbon materials can be functionalized in-situ—that is, on site within the same reactor in which the carbon materials are produced. The carbon materials can be functionalized in post-processing. For example, the surfaces of fullerenes or graphene can be functionalized with oxygen- or nitrogen-containing species which form bonds with polymers of the resin matrix, thus improving adhesion and providing strong binding to enhance the strength of composites.

Functionalizing surface treatments can be performed on any one or more of the disclosed carbon-based materials (such as, CNTs, CNO, graphene, 3D carbon materials such as 3D graphene) utilizing plasma reactors (such as, microwave plasma reactors) described herein. Such treatments can include in-situ surface treatment during creation of carbon materials that can be combined with a binder or polymer in a composite material, or surface treatment after creation of the carbon materials while the carbon materials are still within the reactor.

In the foregoing specification, the disclosure has been described with reference to specific implementations thereof. It will however be evident that various modifications and changes may be made thereto without departing from the broader spirit and scope of the disclosure. For example, the above-described process flows are described with reference to an ordering of process actions. However, the ordering of many of the described process actions may be changed without affecting the scope or operation of the disclosure. The specification and drawings are to be regarded in an illustrative sense rather than in a restrictive sense.

What is claimed is:

1. A tire formed of at least a body including a plurality of plies, at least one ply of the plurality of plies comprising:
a resonator configured to generate a resonant signal in response to a signal; and
a carbon-containing material distributed in one or more portions of the ply and configured to alter at least one characteristic of the resonant signal, wherein an oscillation of the resonator is initiated upon receiving a charge from a charge generation device.

2. The tire of claim 1, wherein altering the at least one characteristic includes one or more of shifting a frequency of the resonant signal or attenuating the resonant signal proportionately to an amount of wear of one or more of the plurality of plies.

3. The tire of claim 1, wherein one or more plies of the plurality of plies is configured to attenuate the resonant signal by shielding.

4. The tire of claim 3, wherein an amount of attenuation is based on a thickness of one or more plies of the plurality of plies.

5. The tire of claim 3, wherein an amplitude of the attenuated resonant signal is indicative of tire wear.

6. The tire of claim 1, wherein degradation of one or more plies of the plurality of plies is indicated by a change in the at least one characteristic of the resonant signal.

7. The tire of claim 1, wherein the resonator is configured to resonate at a first frequency when a structural characteristic of a respective ply of the plurality of plies is greater than a level, and is configured to resonate at a second frequency different than the first frequency when the structural characteristic of the respective ply is not greater than the level.

8. The tire of claim 1, wherein the resonator is configured to oscillate at a frequency based on a rotational speed of the tire.

9. The tire of claim 1, wherein the charge generation device is embedded within a respective ply of the plurality of plies.

10. The tire of claim 9, wherein the charge generation device comprises a tribological component.

11. The tire of claim 9, wherein the charge generation device comprises a carbon-hexagonal triboelectric energy generator (CH-TENG).

12. The tire of claim 1, wherein the resonator comprises a plurality of three-dimensional (3D) aggregates formed of graphene sheets.

13. The tire of claim 12, wherein the graphene sheets are coupled together to create a 3D hierarchical open porous structure.

14. The tire of claim 1, further comprising a sensor formed by the carbon-containing material.

15. The tire of claim 14, wherein the sensor is embedded within an inner liner of the tire.

16. A tire formed of at least a body including a plurality of piles, at least one ply of the plurality of piles comprising:
a resonator configured to generate a resonant signal in response to a signal; and
a carbon-containing material distributed in one or more portions of the ply and configured to alter at least one characteristic of the resonant signal, wherein the plurality of plies comprises at least:
a first ply comprising a first resonator configured to resonate at a first frequency;
a second ply comprising a second resonator configured to resonate at a second frequency different than the first frequency; and
a third ply comprising a third resonator configured to resonate at a third frequency different than the first and second frequencies.

17. The tire of claim 16, wherein the first ply forms an outer layer of the tire.

18. The tire of claim 16, wherein an attenuation of the first frequency is indicative of wear or degradation of the first ply.

19. The tire of claim 16, wherein:
the second ply is disposed on the first ply, and
the third ply is disposed on the second ply.

20. The tire of claim 16, wherein any one or more of the first ply, the second ply, and the third ply are in contact with each other.

21. A tire comprising:
a body including a plurality of plies, wherein each ply of the plurality of plies comprises:
a charge generation device, and
a resonator electrically coupled to the charge generation device within at least one of the plurality of plies and configured to generate a resonant signal in response to a charge generated by the charge generation device; and
a tread surrounding the body.

22. The tire of claim 21, wherein at least a portion of each ply of the plurality of plies is configured to attenuate the resonant signal generated by a corresponding resonator.

23. The tire of claim 22, wherein an amount of attenuation is indicative of wear or deterioration of the respective ply.

24. The tire of claim 22, wherein at least one ply of the plurality of plies is configured to attenuate a corresponding resonant signal by shielding.

25. The tire of claim 22, wherein at least one ply of the plurality of plies is configured to change a frequency of a corresponding resonant signal based on degradation of the at least one ply.

\* \* \* \* \*